(12) United States Patent
Nakatomi et al.

(10) Patent No.: US 8,533,795 B2
(45) Date of Patent: Sep. 10, 2013

(54) INFORMATION PROCESSING APPARATUS, INFORMATION PROCESSING METHOD, INFORMATION PROCESSING PROGRAM, AND COMPUTER-READABLE MEDIUM

(75) Inventors: Masashi Nakatomi, Kanagawa (JP); Tetsuro Nagatsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1246 days.

(21) Appl. No.: 12/050,548

(22) Filed: Mar. 18, 2008

(65) Prior Publication Data

US 2008/0235776 A1 Sep. 25, 2008

(30) Foreign Application Priority Data

Mar. 19, 2007 (JP) .................................. 2007-071663
Mar. 19, 2007 (JP) .................................. 2007-071664

(51) Int. Cl.
*G06F 7/04* (2006.01)

(52) U.S. Cl.
USPC ............................................................ 726/6

(58) Field of Classification Search
USPC ........................... 726/7, 6; 707/694, 736, 783
See application file for complete search history.

(56) References Cited

U.S. PATENT DOCUMENTS

| 7,733,512 B2 * | 6/2010 | Kimura ........................ 358/1.15 |
| 2006/0095503 A1 * | 5/2006 | Kanza ........................... 709/203 |
| 2006/0122976 A1 * | 6/2006 | Baluja et al. ....................... 707/3 |
| 2006/0129539 A1 | 6/2006 | Nakatomi |
| 2007/0050325 A1 | 3/2007 | Nakatomi et al. |
| 2007/0136288 A1 | 6/2007 | Shimada et al. |
| 2007/0233465 A1 | 10/2007 | Sato et al. |
| 2009/0141895 A1 * | 6/2009 | Anderson et al. ............. 380/252 |
| 2010/0290085 A1 * | 11/2010 | Okada et al. ................. 358/1.15 |

FOREIGN PATENT DOCUMENTS

| JP | 10-27089 | 1/1998 |
| JP | 2004-206549 | 7/2004 |
| JP | 2007-48240 | 2/2007 |

* cited by examiner

*Primary Examiner* — Beemnet Dada
(74) *Attorney, Agent, or Firm* — Cooper & Dunham LLP

(57) ABSTRACT

An information processing apparatus is disclosed that includes a user authentication unit that identifies a current user, a task acquiring unit that acquires task information of a relevant task associated with a file to be processed by the current user, and a file information storage unit that stores file information of the file to be processed in association with the task information of the relevant task.

16 Claims, 54 Drawing Sheets

FIG.5

| TASK ID | TIME/DATE | PERSON | LOCATION | TASK NAME |
|---|---|---|---|---|
| 00001 | 2006/4/10 10:00 | USER A, USER B, USER C, USER D | MEETING ROOM A | PROJECT MEETING |
| 00002 | 2006/4/10 15:00 | USER B, USER C, USER E | HALL B | SOLUTION FAIR |
| 00003 | 2006/4/11 11:00 | USER A, USER B, USER C | MEETING ROOM B | PROJECT A BRIEFING |
| 00004 | 2006/4/12 13:00 | USER A, USER B, USER C, USER D | MEETING ROOM A | PROJECT MEETING |
| ... | ... | ... | ... | ... |

| OPERATION DESCRIPTION | TIME/DATE | USER ID | TASK ID |
|---|---|---|---|
| PRINT: DOUBLE SIDE, TWO SETS | 2005/10/09 10:10 | 00004 | 00001 |
| MAIL TRANSMISSION : abc@ricoh.co.jp | 2005/10/09 17:10 | 00246 | 00004 |
| FAX TRANSMISSION : 03-×××× - ×××× | 2005/10/10 09:21 | 00012 | 00001 |
| EDITING USING WORD | 2005/10/10 09:31 | 00455 | 00003 |
| ... | ... | ... | ... |

| DOCUMENT ID | DOCUMENT NAME | USER ID | TASK ID | REGISTRATION TIME/DATE |
|---|---|---|---|---|
| 00001 | MINUTES OF SECOND MEETING | 00004 | 00001 | 2006/4/5 16:10 |
| 00002 | HANDOUT | 00246 | 00004 | 2006/4/5 17:00 |
| 00003 | CATALOGUE | 00012 | 00002 | 2006/4/5 17:20 |
| 00004 | SALES DATA | 00455 | 00003 | 2006/4/6 10:00 |
| 00005 | PRODUCT A PAMPHLET | 00004 | 00001 | 2006/4/6 11:00 |
| 00006 | PROJECT BOOK | 00001 | 00001 | 2006/4/6 13:00 |
| ... | | | | ... |

| | | | | | 420 |
|---|---|---|---|---|---|
| SCHEDULE | SCHEDULE NAME | TASK ID | TIME/DATE | PERSON | LOCATION |
| TO DO | TO DO NAME | TASK ID | TIME/DATE | PERSON | LOCATION |
| PROJECT | PROJECT NAME | TASK ID | TIME/DATE | PERSON | LOCATION |
| USER GROUP | USER GROUP NAME | TASK ID | TIME/DATE | PERSON | LOCATION |

FIG.17

TO DO DETAIL

| | |
|---|---|
| TIME/DATE | 2005/02/02 15:00 |
| NAME | TURN IN PROJECT REPORT |
| USER | USER A, USER B |
| LOCATION | TOKYO HEADQUARTERS |

RETURN

FIG.33

| TASK ID | TIME/DATE | PERSON | LOCATION | TASK NAME |
|---|---|---|---|---|
| 00001 | 2006/4/10 10:00 | USER A, USER B, USER C, USER D | MEETING ROOM A | PROJECT MEETING |
| 00002 | 2006/4/10 15:00 | USER B, USER C, USER E | HALL B | SOLUTION FAIR |
| 00003 | 2006/4/11 11:00 | USER A, USER B, USER C | MEETING ROOM B | PROJECT A BRIEFING |
| 00004 | 2006/4/12 13:00 | USER A, USER B, USER C, USER D | MEETING ROOM A | PROJECT MEETING |
| ⋮ | ⋮ | ⋮ | ⋮ | ⋮ |

| OPERATION DESCRIPTION | TIME/DATE | USER ID | TASK ID |
|---|---|---|---|
| COPY : DOUBLE SIDE, TWO SETS | 2005/10/09 10:10 | 00004 | 00001 |
| MAIL TRANSMISSION : abc@ricoh.co.jp | 2005/10/09 17:10 | 00246 | 00004 |
| FAX TRANSMISSION : 03-××××-×××× | 2005/10/10 09:21 | 00012 | 00001 |
| SCAN : DOCUMENT NAME "HANDOUT" | 2005/10/10 09:31 | 00455 | 00003 |
| ... | ... | ... | ... |

| DOCUMENT ID | DOCUMENT NAME | USER ID | TASK ID | REGISTRATION TIME/DATE |
|---|---|---|---|---|
| 00001 | MINUTES OF SECOND MEETING | 00004 | 00001 | 2006/4/5 16:10 |
| 00002 | HANDOUT | 00246 | 00004 | 2006/4/5 17:00 |
| 00003 | CATALOGUE | 00012 | 00002 | 2006/4/5 17:20 |
| 00004 | SALES DATA | 00455 | 00003 | 2006/4/6 10:00 |
| 00005 | PRODUCT A PAMPHLET | 00004 | 00001 | 2006/4/6 11:00 |
| 00006 | PROJECT BOOK | 00001 | 00001 | 2006/4/6 13:00 |
| ... | ... | ... | ... | ... |

FIG.41

| | | | | | 420a |
|---|---|---|---|---|---|
| SCHEDULE | SCHEDULE NAME | TASK ID | TIME/DATE | PERSON | LOCATION |
| TO DO | TO DO NAME | TASK ID | TIME/DATE | PERSON | LOCATION |
| PROJECT | PROJECT NAME | TASK ID | TIME/DATE | PERSON | LOCATION |
| USER GROUP | USER GROUP NAME | TASK ID | TIME/DATE | PERSON | LOCATION |

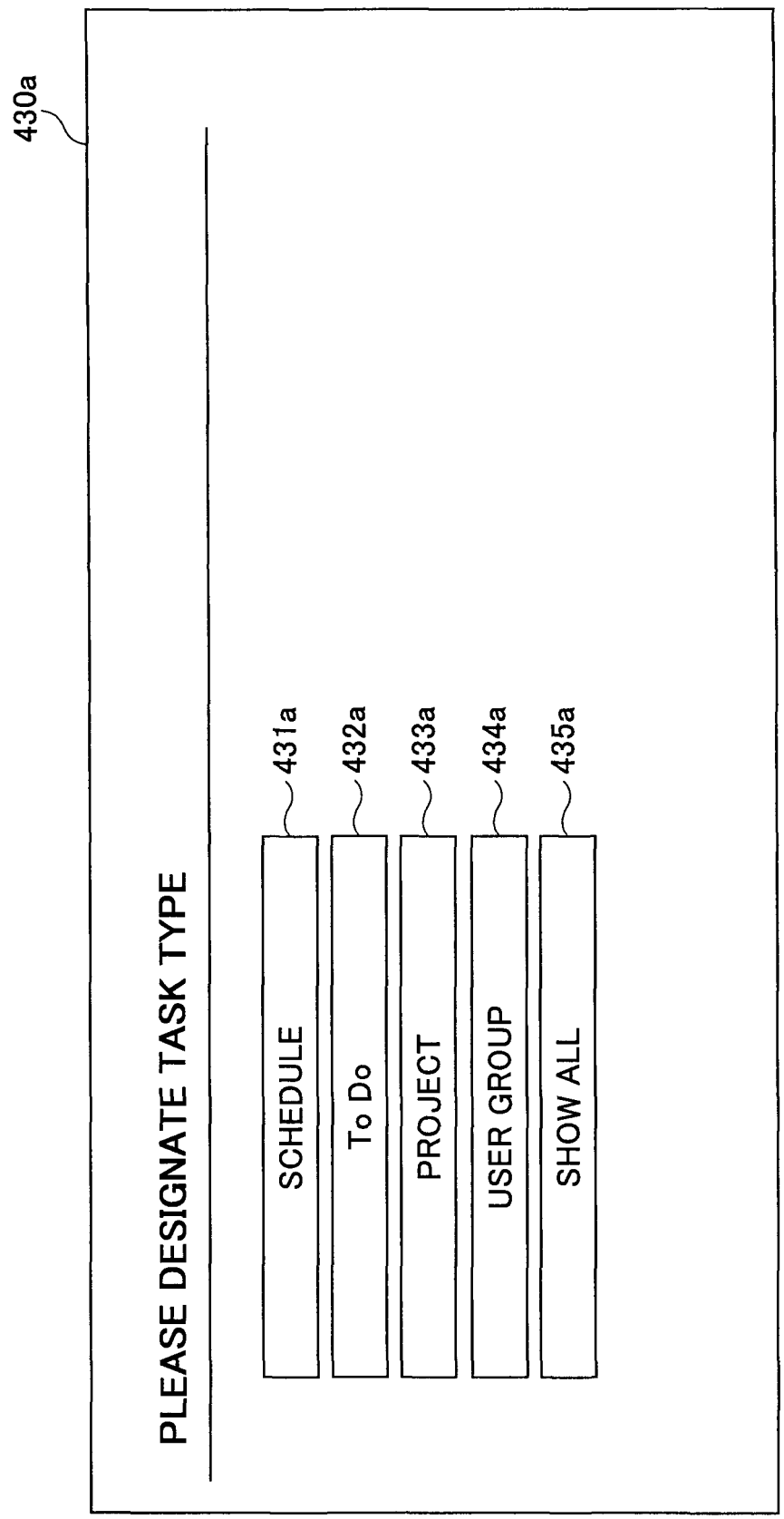

FIG.43

PLEASE DESIGNATE SCHEDULE — 440a

△ PREVIOUS — 446a

| | | NAME | USER | LOCATION |
|---|---|---|---|---|
| 441a SELECT | 2005/02/02/ 13:00-15:00 | PROJECT MEETING | (USER A,USER B,USER C,USER D) | MEETING ROOM A |
| 442a SELECT | 2005/02/03/ 9:00-17:00 | SOLUTION FAIR | (USER B,USER C,USER E) | HALL B |
| 443a SELECT | 2005/02/04/ 10:00-12:00 | PROJECT A BRIEFING | (USER A,USER B,USER C) | MEETING ROOM B |
| 444a SELECT | 2005/02/04/ 13:00 | VISIT COMPANY A | (USER E,USER F) | ××STREET, ○○CITY |
| 445a SELECT | 2005/02/05/ 13:00-15:00 | VISIT COMPANY B | (USER C,USER E) | △△STREET, ○○CITY |

▽ NEXT — 447a

FIG.44

PLEASE DESIGNATE TO DO ENTRY                                    450a

456a — △ PREVIOUS

| | | NAME | USER | LOCATION |
|---|---|---|---|---|
| 451a | SELECT 2005/02/02/ 15:00 | TURN IN PROJECT REPORT | (USER A, USER B) | TOKYO HEADQUARTERS |
| 452a | SELECT 2005/02/02/ 17:00 | PREPARE SOLUTION FAIR PLAN | (USER E) | |
| 453a | SELECT 2005/02/03/ 14:00-17:00 | PREPARE MATERIALS FOR PROJECT A MEETING | (USER A, USER C) | |
| 454a | SELECT 2005/02/04/ 12:00 | PREPARE MATERIALS FOR COMPANY A VISIT | | |
| 455a | SELECT 2005/02/05/ 12:00 | PREPARE MATERIALS FOR COMPANY B VISIT | (USER E) | |

457a — ▽ NEXT

FIG.45

PLEASE DESIGNATE PROJECT

466a △ PREVIOUS

| | | NAME | USER | LOCATION |
|---|---|---|---|---|
| 461a SELECT | 2005/02/02~2005/03/31 | PROJECT A | (USER A,USER B) | |
| 462a SELECT | 2005/02/04~2005/02/14 | SOLUTION FAIR | (USER E) | |
| 463a SELECT | 2005/02/04~2005/03/08 | PROJECT B | (USER A,USER C) | |
| 464a SELECT | 2005/02/05~2005/03/10 | SOLUTION FOR COMPANY A | | BRANCH OFFICE A, BRANCH OFFICE B |
| 465a SELECT | 2005/02/07~2005/03/02 | SERVICE PLAN FOR NEXT TERM | (USER E) | |

447a ▽ NEXT

PLEASE DESIGNATE USER GROUP

476a △ PREVIOUS

| | | NAME | USER | LOCATION |
|---|---|---|---|---|
| 471a SELECT | 2005/02/02~2005/03/31 | GROUP A | (USER A,USER B, USER C,USER D) | |
| 472a SELECT | 2005/02/04~2005/02/14 | GROUP B | (USER B,USER C, USER E) | |
| 473a SELECT | 2005/02/04~2005/03/08 | GROUP C | (USER A,USER B, USER C) | |
| 474a SELECT | 2005/02/05~2005/02/10 | GROUP D | (USER B,USER E, USER F) | |
| 475a SELECT | 2005/02/07~2005/03/02 | GROUP E | (USER B,USER C, USER E) | BRANCH OFFICE C |

477a ▽ NEXT

PLEASE DESIGNATE TASK

486a — △ PREVIOUS

| | | TYPE | NAME | USER | LOCATION |
|---|---|---|---|---|---|
| 481a | SELECT 2005/02/02~2005/03/31 | USER GROUP | GROUP A | (USER A, USER B, USER C, USER D) | |
| 482a | SELECT 2005/02/02~2005/03/31 | PROJECT | PROJECT A | (USER A, USER B) | |
| 483a | SELECT 2005/02/02 13:00-15:00 | SCHEDULE | PROJECT MEETING | (USER A, USER B, USER C, USER D) | MEETING ROOM A |
| 484a | SELECT 2005/02/02 15:00 | To Do | TURN IN PROJECT REPORT | (USER A, USER B) | TOKYO HEADQUARTERS |
| 485a | SELECT 2005/02/03 9:00-17:00 | SCHEDULE | SOLUTION FAIR | (USER B, USER C, USER E) | HALL B |

487a — ▽ NEXT

480a

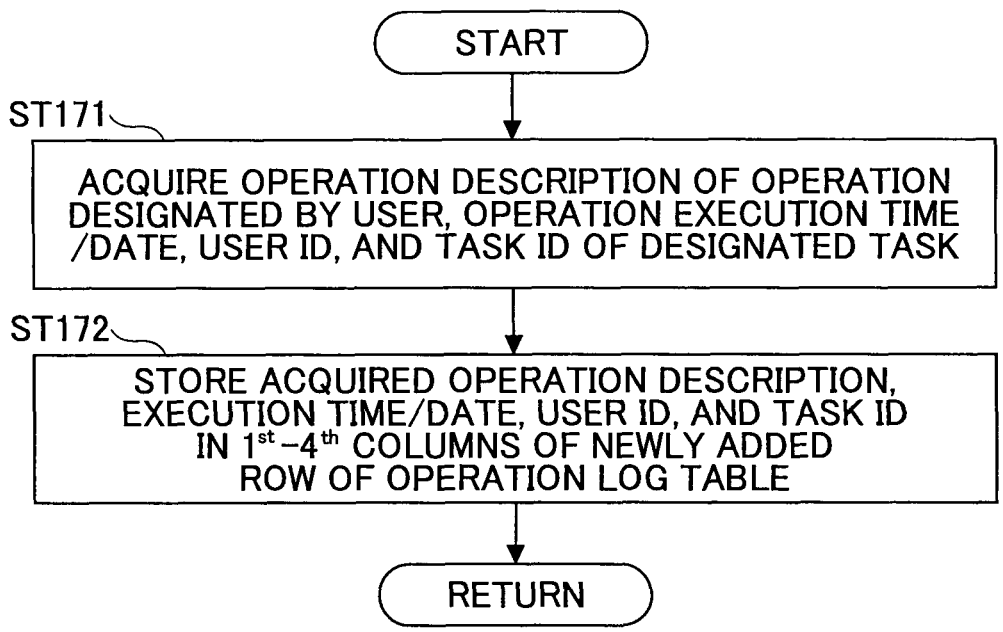
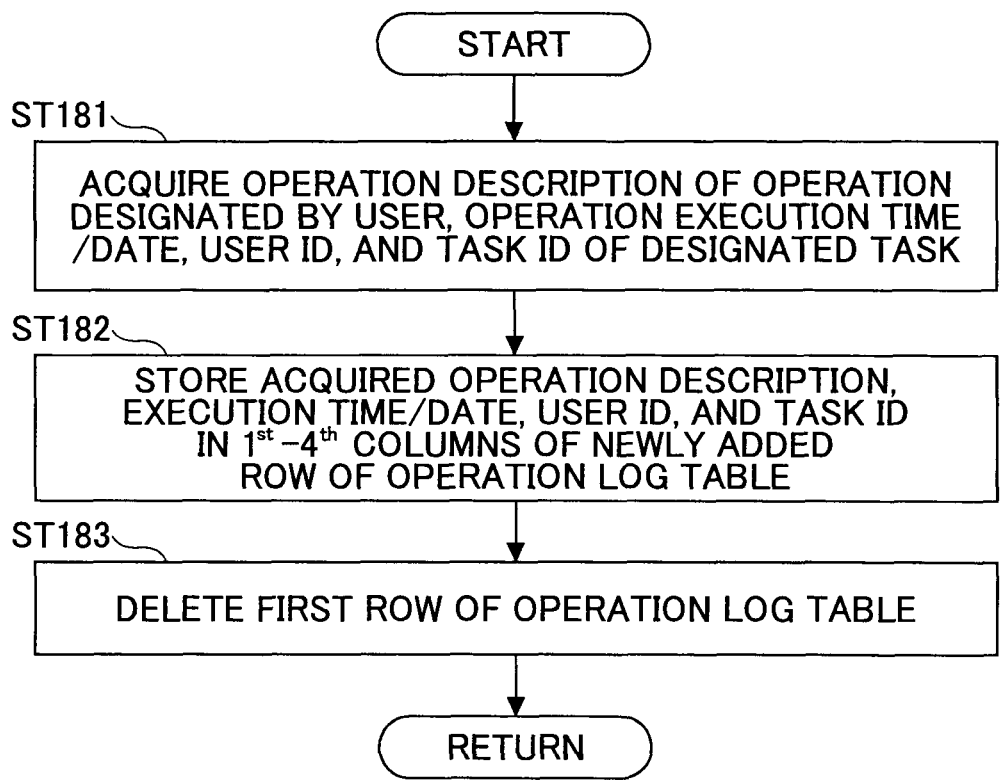

INFORMATION PROCESSING APPARATUS, INFORMATION PROCESSING METHOD, INFORMATION PROCESSING PROGRAM, AND COMPUTER-READABLE MEDIUM

BACKGROUND

1. Technical Field

This disclosure relates to an information processing apparatus, an information processing method, an information processing program, and a computer-readable medium storing the information processing program for enabling a user to easily reach an operation command area through which the user may execute a desired operation on an electronic file, particularly an image file.

2. Description of the Related Art

Various operations can be executed on electronic files stored in a hard disk of an information processing apparatus such as a personal computer or an image processing apparatus (particularly, a multifunction image processing apparatus having multiple functions including printer functions, scanning functions, and networking functions). For example, these operations may include printing a file, attaching a file to an electronic mail and sending the electronic mail with the attached file, editing a file using a document editor, or compressing a file.

As the types of operations and processes that can be executed by the information processing apparatus increases, procedures for selecting a desired function for executing a desired operation may become complicated. For example, the number of times an operations input device such as a mouse or operations input buttons have to be operated to reach an operation area for directing execution of the desired operation may increase.

It is noted that various measures have been proposed for facilitating execution of a desired operation, examples of such measures including indicating frequently used functions or indicating operations that have been executed most recently.

As another example, Japanese Laid-Open Patent Publication No. 10-27089 discloses a method implemented in a computer that involves estimating an operation that is likely to be executed and indicating the estimated operation. Specifically, the disclosed method involves estimating a next operation to be executed based on time series transition of applications, operating objects, and operation commands; and indicating the estimated next operation. For example, by implementing this method, an operation that has been frequently executed by a user may be indicated to the user, or a dedicated screen for a manager may be indicated when a manager operates the computer. In this way, the burden involved in selecting a desired function may be reduced.

Also, Japanese Laid-Open Patent Publication No. 2004-72563 discloses a method implemented in an image processing apparatus that involves estimating an operation to be performed by the apparatus and indicating the same. Specifically, the disclosed method involves estimating an operation to be performed based on usage frequency of functions of the apparatus and user information such as whether the current user is a manager, for example. In other words, this method is directed to reducing the load involved in selecting a function selection of an image processing apparatus by indicating an operation most frequently used by a user or displaying a dedicated screen for a manager when the user corresponds to a manager.

Also, Japanese Laid-Open Patent Publication No. 2004-206549 discloses a method that involves indicating operations according to a usage status. Specifically, the disclosed method involves acquiring a current 'status' such as the location, time, environmental conditions, work of the user, mental state of the user, and connection mode/type of connection devices; comparing the current status with log information; and indicating operations relevant to the current status.

However, when the above-described method of Japanese Laid-Open Patent Publication No. 10-27089 is implemented, the burden involved in selecting functions that are less frequently used may not change or may even increase in some cases. It is noted that oftentimes, users are less accustomed to functions that are less frequently used so that the burden of selecting such functions are desirably reduced; however, the above method does not address such concerns. Also, it is noted that although implementing the above method may be advantageous in the case of successively performing operations in time series, the method does not address a case in which an operation is individually performed.

Also, in the case of implementing the method disclosed in Japanese Laid-Open Patent Publication No. 2004-72563, rules have to be established beforehand with respect to the correspondence between functions and users. In this case, once a given set of rules are established, it may not be easy to change these rules so that this method may not be suitably implemented in a case where functions to be used change depending on circumstances.

As for the above-described method of Japanese Laid-Open Patent Publication No. 2004-206549, although this method may be advantageously implemented in a case where an operation to be performed is dependent on the current status, a suitable operation may not always be indicated in the case of performing an operation that is not heavily dependent on the current status such as a standard operation with respect to a business activity or some other process operation within a workflow for achieving a particular processing intent. Therefore, in the case of indicating an operation based on log information, information on the intent of the user through executing the relevant operation is desired.

BRIEF SUMMARY

In an aspect of this disclosure, there is provided a technique for improving operability of an information processing apparatus by enabling indication of functions that are likely to be selected and enabling a user to easily execute a desired operation without having to go through complicated operation procedures.

In another aspect of this disclosure, an information processing apparatus is provided that includes:

a user authentication unit that identifies a current user;

a task acquiring unit that acquires task information of a relevant task associated with a file to be processed by the current user; and a file information storage unit that stores file information of the file to be processed in association with the task information of the relevant task.

In another aspect, the information processing apparatus further includes:

an operation log storage unit that stores operation log information in association with the task information, the operation log information pertaining to an operation executed in connection with the relevant task; and a candidate operation indicating unit that refers to the file information storage unit and the operation log storage unit, acquires operation information of one or more operations associated with the relevant task based on the association between the file information, the task information, and the operation log information, and indicates the one or more operations as candidate operations to be executed on the file to be processed.

In another aspect of this disclosure, an image processing method is provided that includes:

a user authenticating step of identifying a current user;

a task information acquiring step of acquiring task information of a relevant task associated with a file to be processed by the current user; and a file information storing step of storing file information of the file to be processed in association with the task information of the relevant task.

In another aspect, the image processing method further includes:

an operation log storing step of storing operation log information in association with the task information, the operation log information pertaining to an operation executed in connection with the relevant task; and a candidate operation indicating step of acquiring operation information of one or more operations associated with the relevant task based on the association between the file information, the task information, and the operation log information, and indicating the one or more operations as candidate operations to be executed on the file to be processed.

In another aspect of this disclosure, an image processing program embodied in a computer-readable medium is provided, which image processing program is executed by a computer to perform the aforementioned image processing method.

The aforementioned and other aspects, features and advantages will become more apparent from the following detailed description when read in conjunction with the accompanying drawings.

Other objects, features and advantages of the present invention will become more apparent from the following detailed description when read in conjunction with the accompanying drawings.

BRIEF DESCRIPTION OF THE DRAWINGS

FIG. 5 is a table showing an exemplary configuration of information stored in a task list table of the information processing apparatus according to the first embodiment;

FIG. 7 is a table showing an exemplary configuration of information stored in an operation log table of the information processing apparatus according to the first embodiment;

FIG. 8 is a table showing an exemplary configuration of information stored in a file information storage table of the information processing apparatus according to the first embodiment;

FIG. 12 is a table showing an exemplary configuration of a task table stored in the task information managing server of the information processing system according to the first embodiment;

FIG. 17 is a diagram showing an exemplary detail screen indicating details of a To Do entry designated via the To Do entry designation screen of FIG. 16;

FIG. 33 is a table showing an exemplary configuration of information stored in a task list table of the image processing apparatus according to the third embodiment;

FIG. 35 is a table showing an exemplary configuration of information stored in an operation log table of the image processing apparatus according to the third embodiment;

FIG. 36 is a table showing an exemplary configuration of information stored in an image information storage table of the image processing apparatus according to the third embodiment;

FIG. 41 is a table showing an exemplary configuration of a task table stored in the task information managing server of the image processing apparatus system according to the third embodiment;

FIG. 42 is a diagram showing an exemplary task type designation screen displayed by the image processing apparatus according to the third embodiment;

FIG. 43 is a diagram showing an exemplary schedule designation screen displayed by the image processing apparatus according to the third embodiment;

FIG. 44 is a diagram showing an exemplary To Do entry designation screen displayed by the image processing apparatus according to the third embodiment;

FIG. 45 is a diagram showing an exemplary project designation screen displayed by the image processing apparatus according to the third embodiment;

FIG. 46 is a diagram showing an exemplary user group designation screen displayed by the image processing apparatus according to the third embodiment;

FIG. 47 is a diagram showing an exemplary task designation screen displayed by the image processing apparatus according to the third embodiment when a particular task type is not designated;

FIG. 54 is a flowchart illustrating a log addition process executed by a log managing unit of the image processing apparatus according to the third embodiment;

FIG. 55 is a flowchart illustrating a log updating process executed by the log managing unit of the image processing apparatus according to the third embodiment;

DETAILED DESCRIPTION OF THE PREFERRED EMBODIMENTS

In the following, preferred embodiments of the present invention are described with respect to the accompanying drawings.

A first embodiment of the present invention is described below with reference to FIGS. 1-27.

Figure 1:
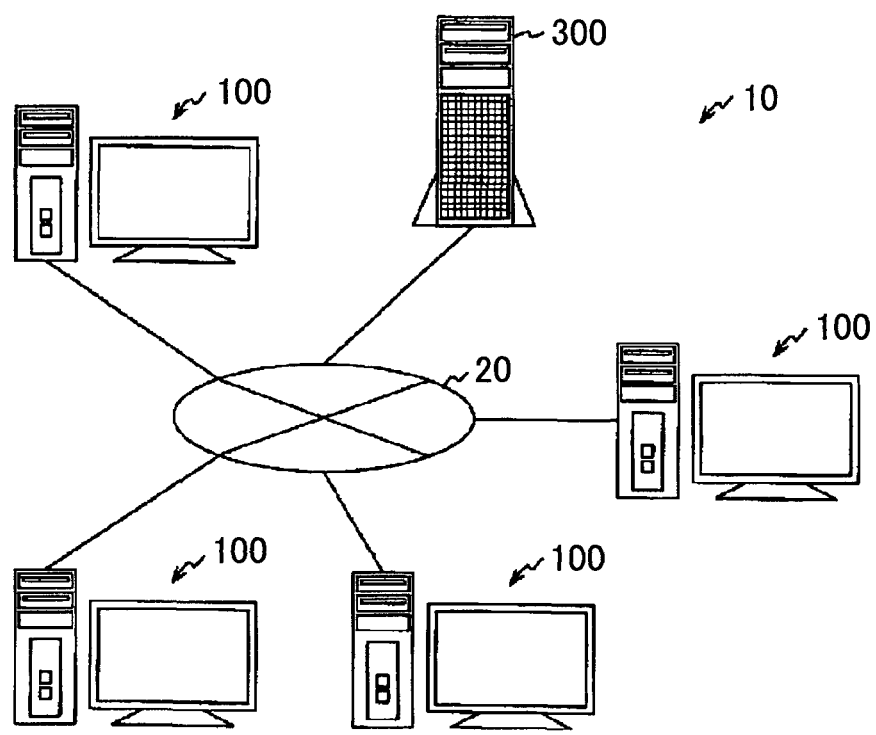
FIG. 1 is a diagram showing a configuration of an information processing system according to a first embodiment of the present invention.
Figure 2:
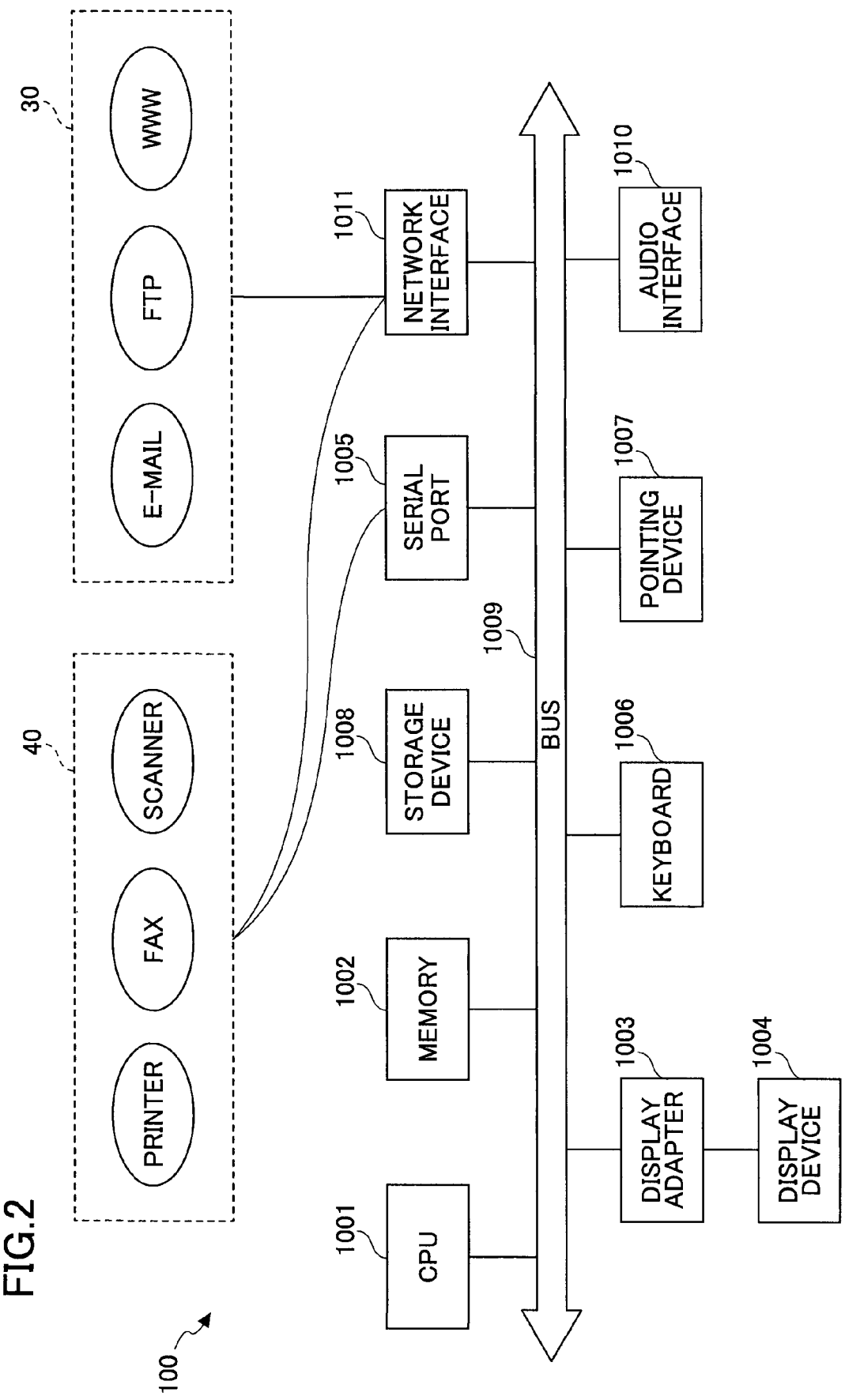
FIG. 2 is a diagram showing a hardware configuration of an information processing apparatus according to the first embodiment.
Figure 3:
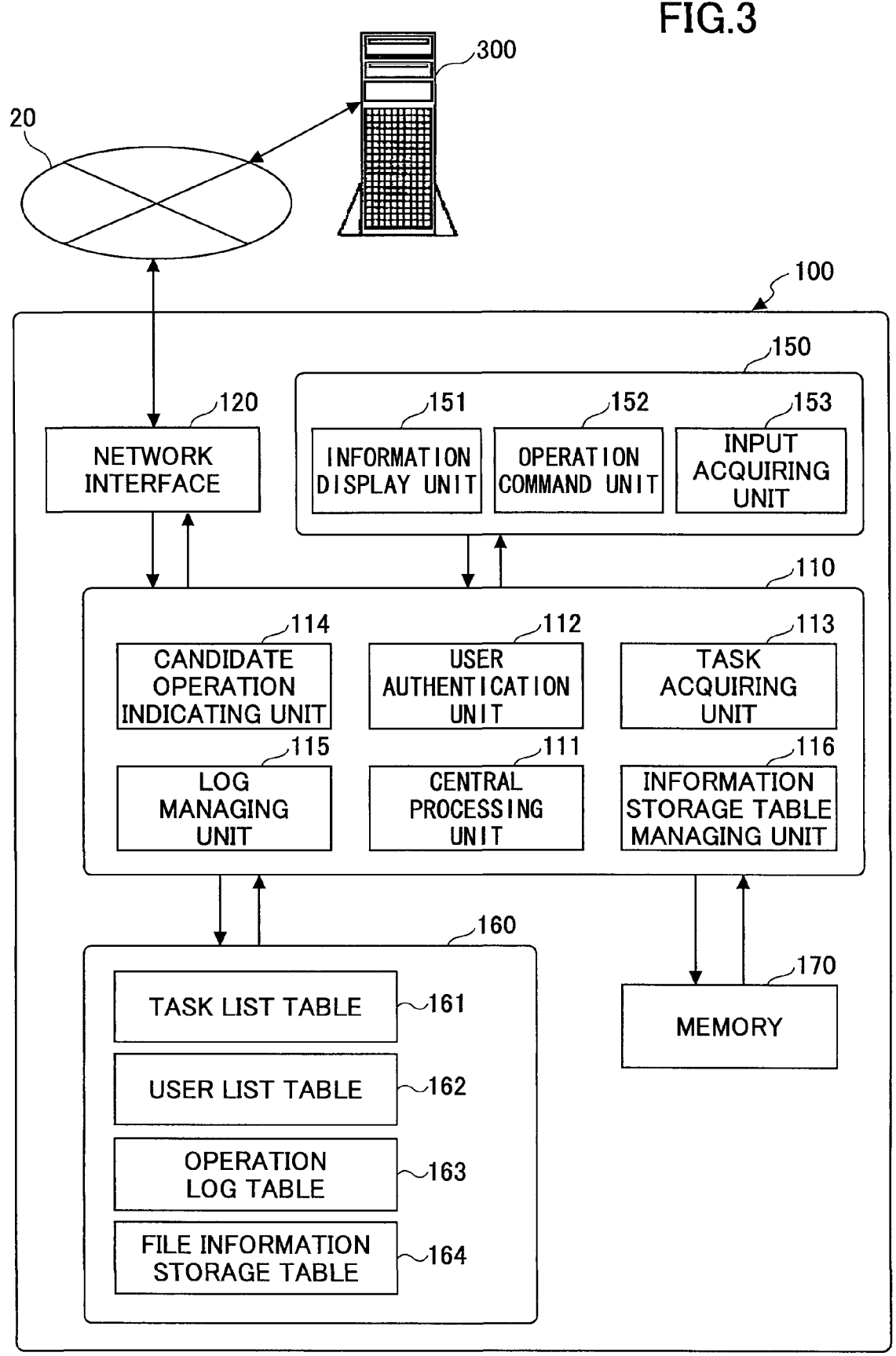
FIG. 3 is a diagram showing a functional configuration of the information processing apparatus according to the first embodiment.

FIG. 1 is a diagram showing an information processing system according to the first embodiment of the present invention, FIG. 2 is a block diagram showing an electrical configuration of an information processing apparatus main frame, and FIG. 3 is a diagram showing a functional configuration of the information processing apparatus main frame. It is noted that the information processing apparatus according to the present embodiment may be a personal computer or an embedded computer, for example.

As is shown in FIG. 1, information processing apparatuses 100 according to the present embodiment make up an information processing system 10. Specifically, the information processing system 10 has plural personal computers 100 as information processing apparatus main frames including task operation control units that are connected via a network 20 to a task information managing server 300 having a task database unit. The task information managing server 300 is configured to manage task information of each of the personal computers 100 connected thereto.

According to the present embodiment, a file stored in the present system that has task information associated therewith may be selected so that an operation associated with this task information may be called upon executing an operation on the file.

In a typical example, a user may execute a process on a particular file using the personal computer 100. In executing this process, a list of operations associated with task information that is associated with the particular file may be presented so that the user may select a relevant task from the list to execute a desired operation with relative ease.

As is shown in FIG. 2, the personal computer 100 includes a CPU 1001, a memory 1002, a display adapter 1003, a display device 1004, a serial board 1005, a keyboard 1006, a pointing device 1007 such as a mouse, a storage device 1008, and a bus 1009 that interconnects the above components. Further, other additional devices such as an audio interface 1010 and a network interface 1011 may also be connected to the bus 1009.

The personal computer 100 may be able to use network services 30 such as electronic mail, file transfer (e.g., FTP), or WWW via the network interface 1011. Also, the personal computer 100 may be able to use external input/output apparatuses 40 such as a printer, a scanner, or a facsimile machine via the bus 1009, the serial port 1005, and the network interface 1011.

Further, the personal computer 100 having the above-described structure is configured to execute programs to realize functional units including a processing unit 110 for performing overall control of the personal computer 100 and task operation control, a network interface 120, a man-machine interface unit 150, a database unit 160, and a memory 170.

In the present embodiment, task management is performed at the personal computer 100. Accordingly, the processing unit 110 includes a central processing unit 111 that is realized by the CPU 1001, a user authentication unit 112 that identifies a user ID, a task acquiring unit 113 that acquires task information stored by a user from the task information managing server 300 via the network interface 120, a candidate operation indicating unit 114 that indicates candidate operations based on the acquired task information, a log managing unit 115 that stores information on executed operations along with relevant task information in the storage device 1008, and an information storage table managing unit 116 that associates information on a file with a task information relevant to this file and stores the associated information in a file information storage table 164 of the database unit 160.

The network interface 120 connects the personal computer 100 to the task information managing server 300 via the network 20 to enable data transmission and reception between the personal computer 100 and the task information managing server 300. The man-machine interface unit 150 includes an information display unit 151 such as a display for presenting information to a user, an operation command unit 152 such as a touch panel or a button for enabling a user to input commands to the personal computer 100, and an input acquiring unit 153 that senses the input made by the user via the operation command unit 152.

The database unit 160 includes a task list table 161 that stores task information pertaining to tasks of a user, a user list table 162 that stores information on a user of the personal computer 100, an operation log table 163 that stores information on the association between executed operations and task information relevant to the executed operations, and a file information storage table 164 as a file information storage unit that stores information on the association between document files and task information relevant to the document files.

In the information processing apparatus system 10 as is described above, the personal computer 100 acquires task information from the task information managing server 300 that is connected thereto via the network 20.

Figure 4:
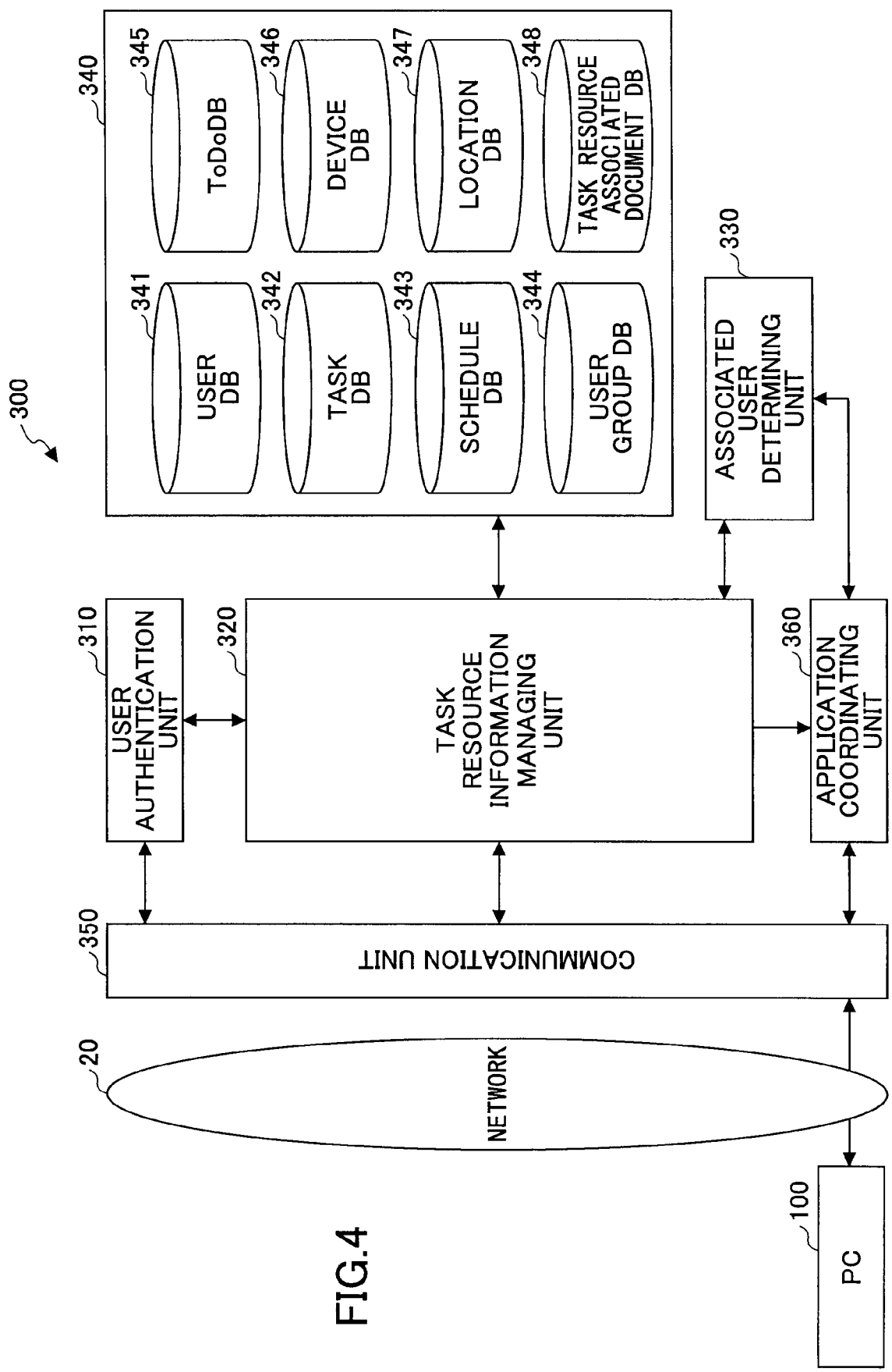
FIG. 4 is a diagram showing a configuration of a task information managing server included in the information processing system according to the first embodiment.

In the following, the task information managing server 300 is described. FIG. 4 is a block diagram showing a configuration of the information managing server 300. As is shown in this drawing, the task information managing server 300 includes a user authentication unit 310, a task resource information managing unit 320, an associated user determining unit 330, an information managing database unit 340, a communications unit 350, and an application coordinating unit 360.

The user authentication unit 310 performs user authentication on a user attempting to gain access to the task information managing server 300. The task resource information managing unit 320 manages task resource information and task resource associated document information. The associated user determining unit 330 determines a user associated with a task resource. The information managing database unit 340 stores task information managing information, and includes a user database 341 corresponding to a user storage unit, a task database 342, a schedule database 343, a user group database 344, a To Do database 345, a device database 346, a location database 347, and a task resource associated document database 348 in the illustrated example. Also, the communications unit 350 enables data transmission and reception to/from plural information processing apparatuses connected thereto via the network 20.

It is noted that in the present embodiment, 'task' refers to a resource related to work or a business activity of a user and may be directed to a user group, a schedule, To Do information, or a project, for example. Also, in the present embodiment, 'information on a task' refers to additional information pertaining to a task such as information on a location, device, user, or time/date associated with the relevant task. Such 'task' and 'information on a task' are collectively referred to as 'task information'.

For example, in the case of addressing a user group as a task, information on the task may include the location of the user group, the device belonging to the user group, members of the user group, and the term or duration of the user group, for example.

In the case of addressing a schedule as a task, information on the task may include the location at which the schedule is to take place, the device used in executing the schedule, the person(s) executing the schedule, and the time/date at which the schedule is to be executed, for example.

In the case of addressing To Do information as a task, information on the task may include the location at which the To Do job item is to be performed, the device used in performing the To Do job item, the person(s) performing the To Do job item, and the term or duration over which the To Do job item is to be performed, for example.

In the case of addressing a project as a task, information on the task may include the location at which the project is to take place, the person(s) involved in the project, the device to be used in the project, and the term or duration of the project, for example.

In the following, the tables stored in the database unit 160 of the storage device 1008 of the personal computer 100 are described.

FIG. 5 is a table illustrating an exemplary configuration of information stored in the task list table 161.

The illustrated task list table 161 is used for storing task information and has rows of task information entries each pertaining to a particular task. Also, the illustrated task list table 161 has columns of information items representing different categories of information associated with each task. Specifically, the first column stores a task ID assigned to each task which may correspond to a reference number unique to each task information entry, for example. The second column stores information on a time/date associated with each task. For example, the time/date information may represent the date on which a schedule or a project is to take place and the time at which the schedule or project is to start. It is noted that the time/date information may represent a certain point in time or a certain period of time, for example.

The third column stores information on one or more users associated with each task. For example, the user information may include the user ID of one or more users involved in a relevant schedule or project.

The fourth column stores information on a location associated with each task. For example, the location information may include the name of the location at which a relevant schedule or project is to take place.

The fifth column stores a description (name) of each task. For example, the task description may include the user group name or the names of each member of the user group in the case where the task is directed to a user group, the name of the event that is to take place in the case where the task id directed to a schedule, or the name of a the job to be executed in the case where the task is directed to a To Do list.

Figure 6:
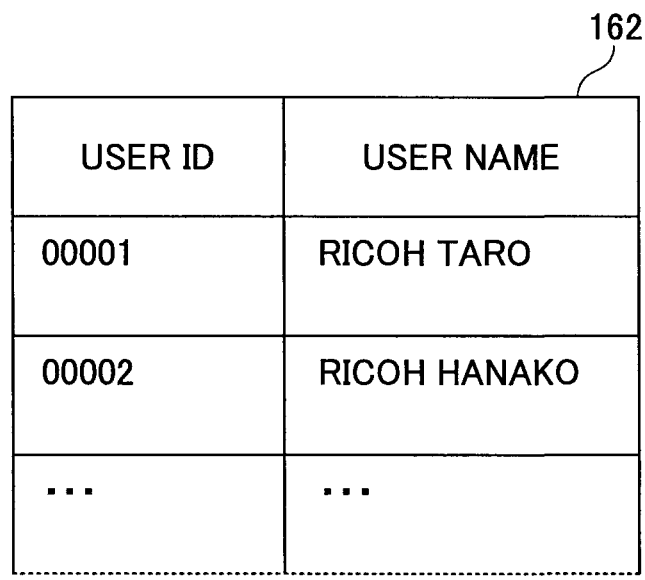
FIG. 6 is a table showing an exemplary configuration of information stored in a user list table of the information processing apparatus according to the first embodiment.

FIG. 6 is a table showing an exemplary configuration of information stored in the user list table 162.

The illustrated user list table 162 stores a user name of a user in association with a unique reference number assigned to the relevant user. Specifically, the first column of the user list table 162 stores a user ID corresponding to a unique reference number assigned to each user, and the second column of the user list table 162 stores the name of each user.

FIG. 7 is a table showing an exemplary configuration of information stored in the operation log table 163.

The illustrated operation log table 163 stores log information describing operations that have been executed at the information processing apparatus 100.

Specifically, the first column of the operation log table 163 stores a description of each operation. For example, the operation description may include a function and execution specification of the function.

The second column of the operation log table 163 stores information on the time/data at which each operation has been executed.

The third column of the operation log table 163 stores the user ID of the user that has executed each operation. It is noted that the user ID stored in the present operation log table 163 corresponds to the user ID stored in the first column of the user list table 162 of FIG. 6.

The fourth column of the operation log table 163 stores a task ID assigned to the task associated with each operation. It is noted that the task ID stored in the present operation log table 163 corresponds to the task ID stored in the first column of the task list table 161 of FIG. 5.

FIG. 8 is a table showing an exemplary configuration of information stored in the file information storage table 164.

The illustrated file information storage table 164 is used to store information pertaining to document files (e.g., scanned images) stored in the present system.

Specifically, the first column of the file information storage table 164 stores a document ID corresponding to a reference number that is unique to each document file.

The second column of the file information storage table 164 stores a document name corresponding to a user designated name assigned to each document file.

The third column of the file information storage table 164 stores the user ID of a user that has stored each document file. It is noted that the user ID stored in the present file information storage table 164 corresponds to the user ID stored in the first column of the user list table 162 of FIG. 6.

The fourth column of the file information storage table 164 stores the task ID of task information associated with each document file. It is noted that in the present embodiment, the associated task information for each document file is designated by a user.

The fifth column of the file information storage table 164 stores information on the time/date at which each document file has been stored.

In the following, process operations of the information processing apparatus 100 according to the present embodiment are described.

Figure 9:
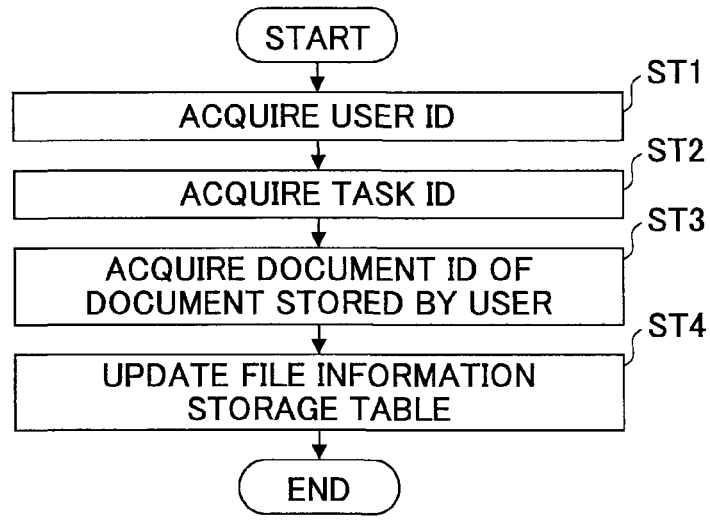
FIG. 9 is a flowchart illustrating process steps for storing a file in the information processing apparatus according to the first embodiment.

FIG. 9 is a flowchart illustrating process steps for storing a file in the information processing apparatus 100. The illustrated process may be implemented in a case where a user edits a particular document and stores the edited file as a document file in the present information processing apparatus 100, for example.

In storing a document as a file, first, the user authentication unit 112 acquires a user ID of the user (ST1). Then, the task acquiring unit 113 acquires a task ID of a task designated by the user by referring to the task list table 161 (ST2). In the case where information on the task designated by the user is not stored in the task list table 161, a new set of task information including a new task ID for the designated task, the task name, and other additional information such as the time/date, location, and/or user associated with the task is stored in the last row of the task list table 161. It is noted that detailed operations of the task acquiring unit 113 for acquiring a task ID of a designated task are described below with reference to FIG. 11.

When the user stores a document as a file, a document ID for the stored document file is generated as a file identifier (ST3). The information storage table managing unit 116 stores the document ID generated in the above step along with a document name, a user ID, and a task ID in the file information storage table 164 (ST4). Specifically, the information storage table managing unit 116 associates the document ID generated for the stored document file with the document name of the document file, the user ID of the user that has stored the document file, the task ID of the task associated with the document file, and the time/date at which the document file has been stored, for example, and stores the document ID and the associated information in the file information storage table 164. In the present example, a new row is generated as the last row of the file information storage table 164, and the acquired document ID, document name, user ID, task ID, file, and file storage time/date are respectively stored in the first column, second column, third column, fourth column, and fifth column of the generated row.

Figure 10:
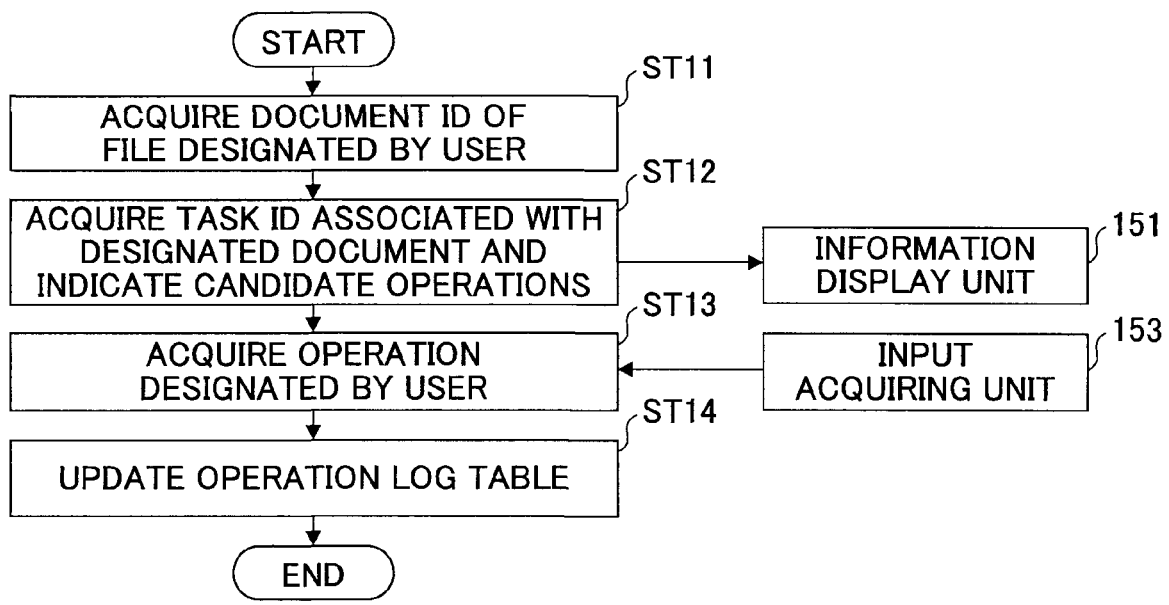
FIG. 10 is a flowchart illustrating process steps for executing an operation on a file with the information processing apparatus according to the first embodiment.

FIG. 10 is a flowchart illustrating process steps for executing an operation on a file.

According to the illustrated process, when a user inputs a request to have operations indicated via an input device, the input acquiring unit 153 detects the input request and acquires the document ID of the relevant document file selected for processing (ST1).

To request for the indication of operations, for example, when using application software for viewing and searching data/information (e.g., Windows Explorer; registered trademark), the user may click a file icon with a right-hand mouse button to display a context menu and select a menu for requesting indication of operations from the displayed context menu; or the user may perform drag and drop a file icon into an icon for indicating operations that is displayed on the desktop. Also, in another example, operations may be automatically indicated upon moving a mouse cursor onto a file icon. In the case where indication of operations are requested with respect to a document file that is not stored in the file information storage table 164, the input acquiring unit 153 does not acquire a document ID of the relevant document file.

In response to the request to have operations indicated, the candidate operation indicating unit 114 refers to the file information storage table 164 based on the document ID acquired in the previous step, acquires a corresponding task ID associated with this document ID, and indicates candidate operations on the information display unit 151 based on the acquired task ID (ST12).

Specifically, in the case of using the file information storage table 164 shown in FIG. 8, the candidate operation indicating unit 114 acquires a corresponding task ID by referring to the acquired document ID of the document file selected for processing, the document IDs stored in the first column of the file information storage table 164, and the task IDs stored in the fourth column of the file information storage table 164. It is noted that in acquiring a corresponding task ID for the acquired document ID from the file information storage table 164, if the acquired document ID does not have a task ID associated therewith, a similar document may be searched from the file information storage table 164 and a corresponding task ID of the similar document may be acquired as the corresponding task ID of the acquired document ID. The process of searching a similar document may be performed in the manner described below, for example.

A similar document file may be searched by referring to the document names registered in the second column of the file information storage table 164 and selecting a document file having a similar document name, for example. A document file with a similar document name may be a document file with a document name that has many character strings in common with the document name of the subject document file, a document file having a common user ID stored in the third column of the file information storage table 164, or if plural document files with a common user ID exist, a document file with the closest registered time/date information stored in the fifth column of the file information storage table, for example.

Figure 24:
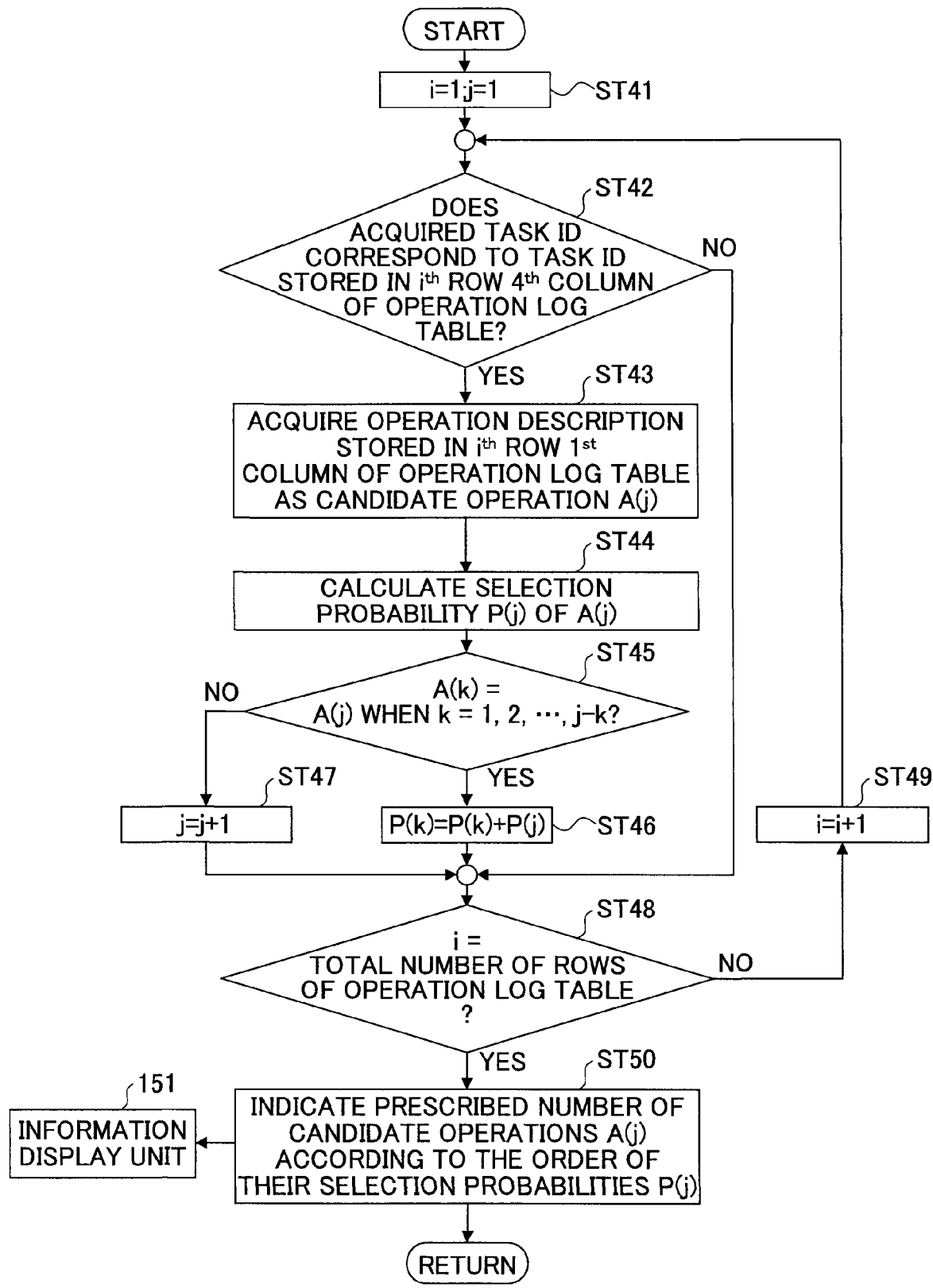
FIG. 24 is a flowchart illustrating a process executed by an operation candidate indicating unit of the information processing apparatus according to the first embodiment.

It is noted that detailed operations of the candidate operation indicating unit 114 for indicating candidate operations on the information display unit 151 are described below with reference to FIG. 24.

Then, the input acquiring unit 153 acquires an operation selected by the user (ST13).

Then, the selected operation is executed after which the log managing unit 115 adds information or updates the operation log table 163 (ST14). It is noted that detailed operations of the log managing unit 115 for updating or adding information to the operation log table 163 are described below with reference to FIGS. 26 and 27. In this way, the present process sequence may be ended.

Figure 11:
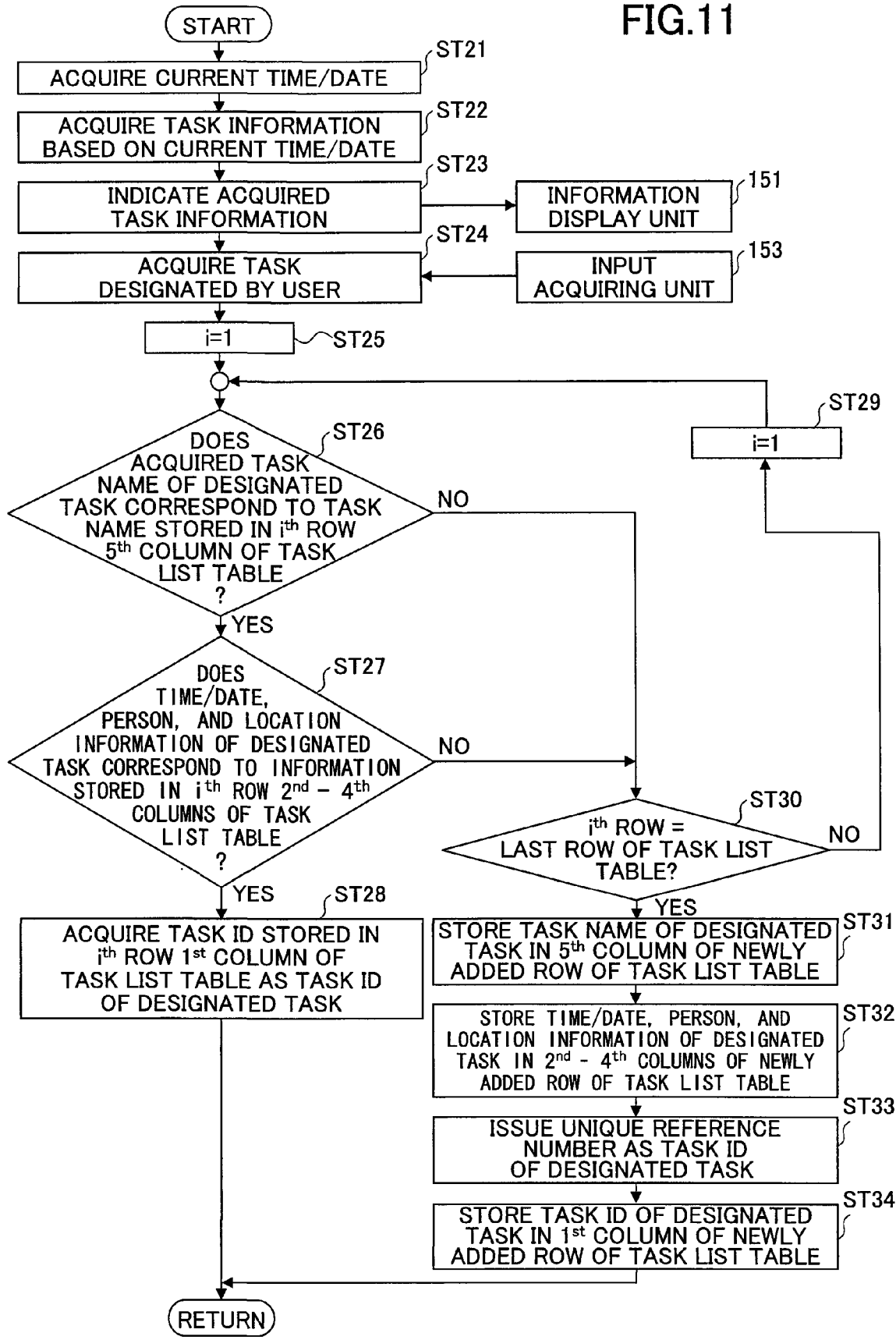
FIG. 11 is a flowchart illustrating a process executed by a task acquiring unit of the information processing apparatus according to the first embodiment.

FIG. 11 is a flowchart illustrating process steps of operations performed by the task acquiring unit 113.

The task acquiring unit 113 refers to a system clock that is managed by the operating system of the information processing apparatus to acquire the current time/date (ST21). Then, the task acquiring unit 113 accesses the information managing database unit 340 of the task information managing server 300, acquires tasks and their corresponding time/dates based on the current date, and stores the acquired tasks (ST22). The task acquiring unit 113 may acquire a predetermined number (e.g., five) of tasks with times/dates that are closest to the current time/date. It is noted that the number of tasks to be acquired by the task acquiring unit 113 at one time may be determined by the number of tasks that may be displayed on a display screen at one time, for example. FIG. 12 shows an exemplary task table 420 stored in the task information managing server 300 that may be used for acquiring tasks of a certain type. Then, the acquired tasks are indicated on the information display unit 151 (ST23), and the input acquiring unit 153 acquires a task designated by the user (ST24).

In the following, procedures for acquiring task information from the task information managing server 300 are described in detail. To acquire task information, the information processing apparatus (personal computer) 100 transmits a user ID, time/date information, and the type of the task to be acquired to the communications unit 350 via the network 20 using HTTP. In turn, the communications unit 350 of the task information managing server 300 acquires corresponding task information from the information managing database unit 340 that can be determined based on the user ID, the time/date information, and the type of task transmitted from the information processing apparatus 100.

In this case, the following operations are performed within the task information managing server 300.

First, the task table 420 shown in FIG. 12 that is stored in the task information managing server 300 is referenced, and the type of task to be acquired is determined (first step).

Then, the time/date range of the tasks to be acquired is determined based on the time/date information acquired from the information processing apparatus 100. For example, the time/date range of the tasks to be acquired may be within one month before or after the acquired time/date (second step).

Then, the information managing database unit 340 of the task information managing server 300 is accessed to acquire a list of tasks associated with the acquired user ID that are within the time/date range determined in the second step and correspond to the items determined in the first step.

Then, the communications unit 350 transmits the acquired list to the information processing apparatus 100 in XML format using HTTP. In turn, the list is received by the network interface 120 of the information processing apparatus 100. In this way, the process of transmitting a list from the task information managing server 300 to the information processing apparatus 100 is completed.

Figure 13:
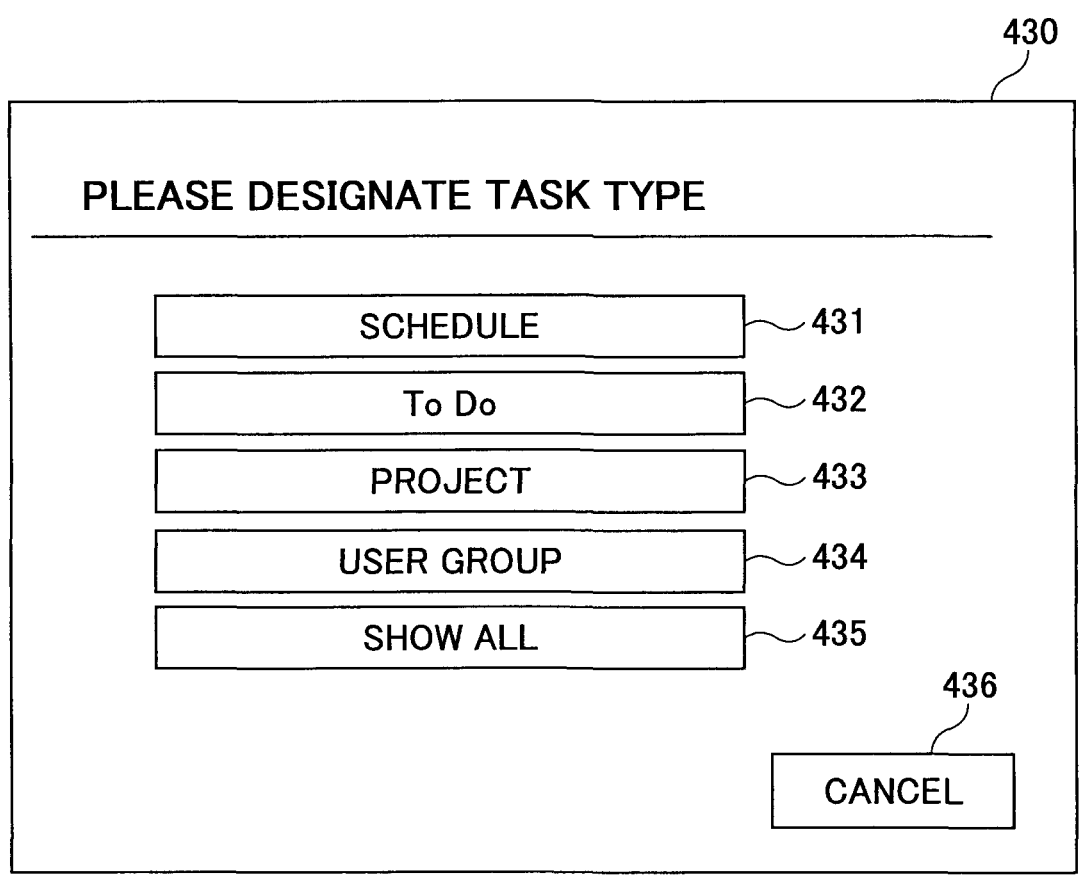
FIG. 13 is a diagram showing an exemplary task type designation screen displayed by the information processing apparatus according to the first embodiment.

At the information processing apparatus 100, the task acquiring unit 113 displays a designation screen on the information display unit 151 based on the task table 420. FIG. 13 shows an exemplary task type designation screen 430. The user may designate the type of task to be acquired via this task type designation screen 430. Specifically, the task type designation may be performed by selecting one of selection buttons 431-435 displayed on the task type designation screen 430. Also, the present process may be canceled by pressing a cancel button 436. In response to a task type designation by the user, the information processing unit (personal computer) 100 acquires the designated type of task and displays a corresponding screen on the information display unit 151 according to the type of the designated task. FIGS. 14-23 are diagrams showing exemplary screens displayed on the information display unit 151 in response to a task designation.

Figure 14:
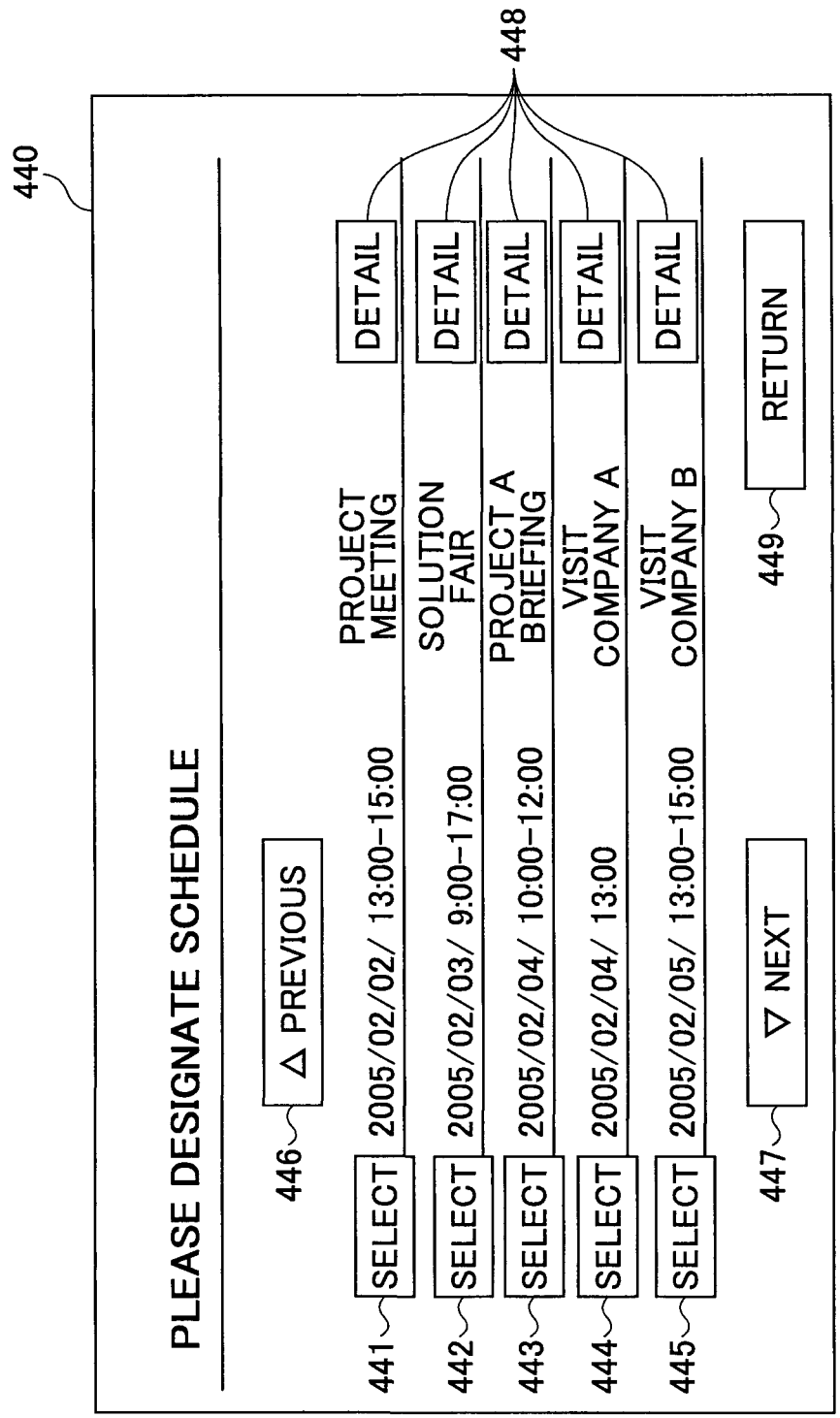
FIG. 14 is a diagram showing an exemplary schedule designation screen displayed by the information processing apparatus according to the first embodiment.

When 'schedule' is designated as the type of task to be acquired, a schedule designation screen 440 shown in FIG. 14 may be displayed on the information display unit 151, for example. Specifically, a predetermined number of schedule information entries set at times/dates after the acquired time/date are listed in chronological order with the schedule closest to the acquired time/date being indicated at the top, for example. It is noted that the number of schedule information entries to be displayed may be determined based on the size of the screen, for example.

The schedule information may include the time/date of the schedule, the name of the schedule, the person(s) involved in the schedule, and the location of the schedule, for example. It is noted that the time/date of the schedule may represent one point in time or a certain time period.

In the present example, individual schedules may be designated by selecting corresponding selection buttons 441-445. Also, schedules preceding the schedules currently being displayed may be indicated by selecting a 'previous' button 446, and schedules coming after the schedules currently being displayed may be indicated by selecting a 'next' button 447. Further, details of the individual schedules being displayed may be indicated by selecting corresponding detail buttons 448, and the display screen may be switched back to a previously displayed screen by selecting a return button 449.

Figure 15:
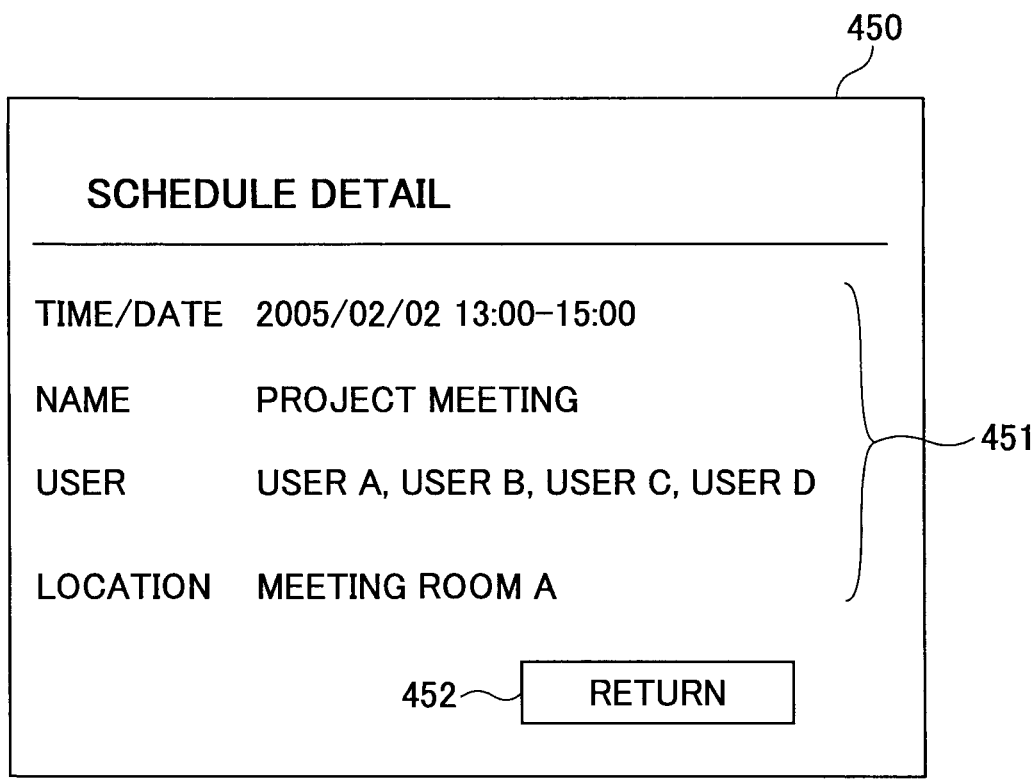
FIG. 15 is a diagram showing an exemplary detail screen indicating details of a schedule designated via the schedule designation screen of FIG. 14.

When the detail button 448 is selected, a detail screen 450 such as that shown in FIG. 15 may be indicated. The detail screen 450 includes detailed descriptions 451 of the schedule and a return button 452 for switching the display screen back to the schedule designation screen 440.

Figure 16:
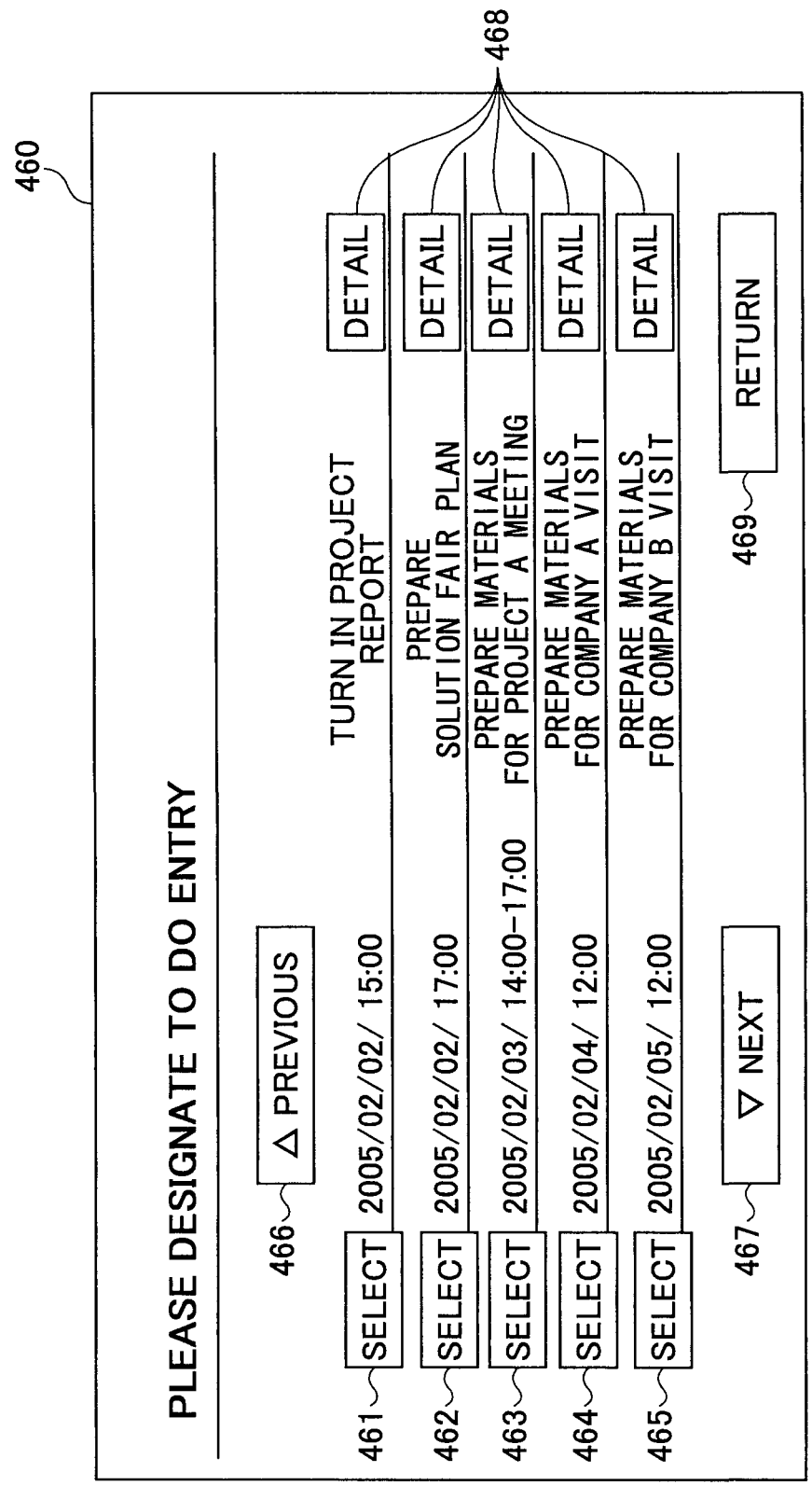
FIG. 16 is a diagram showing an exemplary To Do entry designation screen displayed by the information processing apparatus according to the first embodiment.

When 'To Do' is designated as the type of task to be acquired, a 'To Do' designation screen 460 such as that shown in FIG. 16 may be displayed on the information display unit 151. Specifically, a predetermined number of To Do information entries set at times/dates after the acquired time/date may be listed in chronological order with the To Do information entry set at a time/date closest to the acquired time/date being indicated at the top, for example. It is noted that the number of To Do information entries to be displayed may be determined according to the size of the screen, for example.

The To Do information may include the time/date related to the To Do entry, the name of the To Do entry, the person(s) involved in the To Do entry, and the location related to the To Do entry, for example. It is noted that the time/date related to the To Do entry may represent a point in time or a time period.

In the present example, individual To Do entries may be designated by selecting corresponding selection buttons 461-465. Also, To Do entries set at times/dates before those of the currently displayed To Do entries may be displayed by selecting a 'previous' button 466, and To Do entries set at times/dates after those of the currently displayed To Do entries may be displayed by selecting a 'next' button 467. Further, details of the individual To Do entries may be indicated by selecting corresponding detail buttons 468, and the display screen may be switched back to a previously displayed screen by selecting a return button 469.

When the detail button 468 is selected, a detail screen 470 such as that shown in FIG. 17 may be displayed. The illustrated detail screen 470 includes detailed descriptions 471 of the To Do entry and a return button 472 for switching the display screen back to the To Do designation screen 460.

Figure 18:
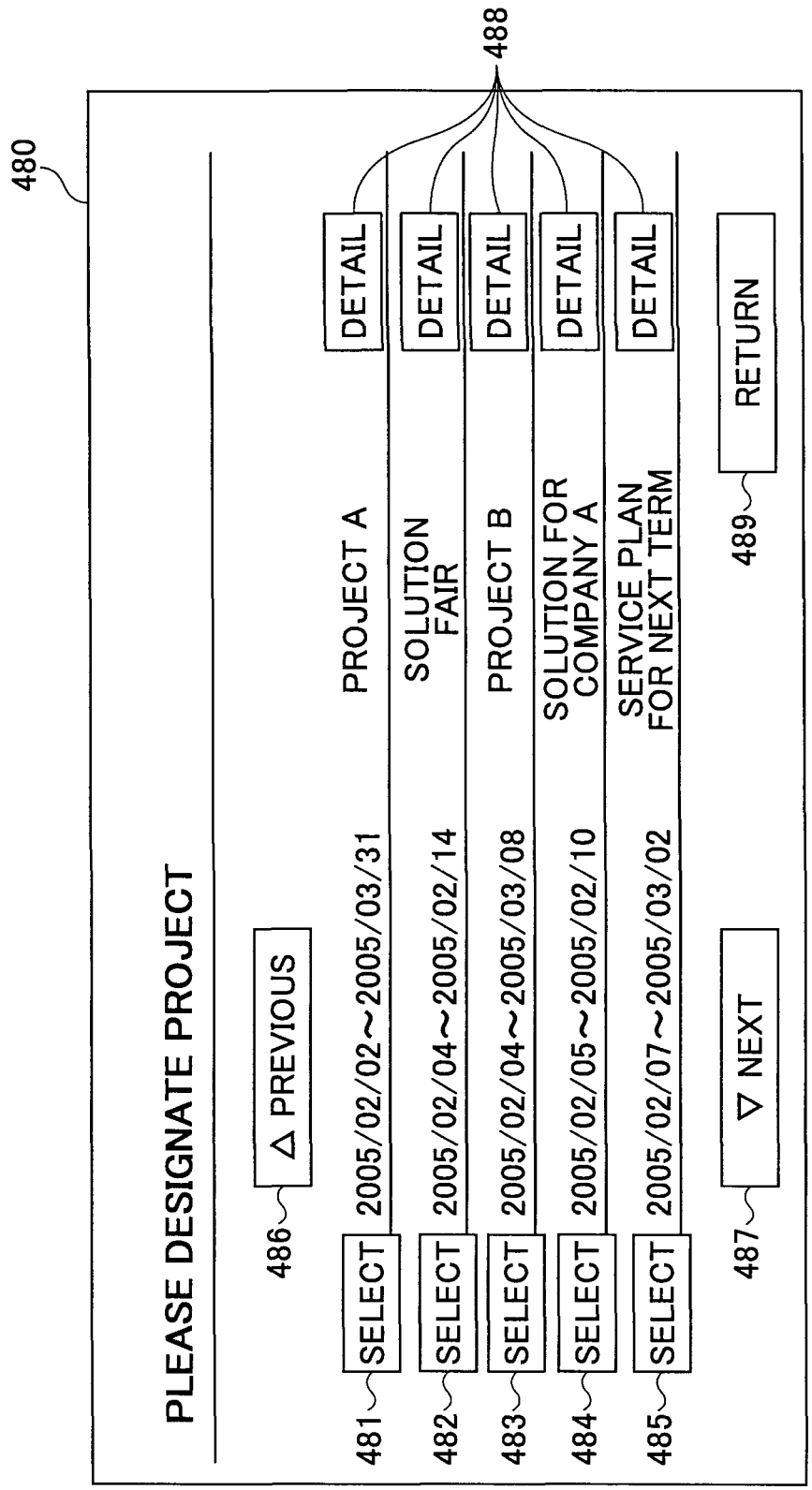
FIG. 18 is a diagram showing an exemplary project designation screen displayed by the information processing apparatus according to the first embodiment.

When 'project' is designated as the type of task to be acquired, a project designation screen 480 such as that shown in FIG. 18 may be displayed on the information display unit 151. Specifically, a predetermined number of project information entries set at dates/times after the acquired time/date may be listed in chronological order with the project set at a time/date closest to the acquired time/date being indicated at the top, for example. It is noted that the number of project information entries to be displayed may be determined according to the size of the screen, for example.

The project information may include the time/date of the relevant project, the name of the project, the person(s) involved in the project, and the location of the project, for example. It is noted that the time/date of the project may represent a point in time or a time period.

In the present example, individual projects may be designated by selecting corresponding selection buttons 481-485. Also, project information entries set at times/dates before those of the currently displayed project information entries may be displayed by selecting a 'previous' button 486, and project information entries set at times/dates after those of the currently displayed project information entries may be displayed by selecting a 'next' button 487. Further, details on the individual projects may be indicated by selecting corresponding detail buttons 488, and the display screen may be switched back to a previously displayed screen by selecting a return button 489.

Figure 19:
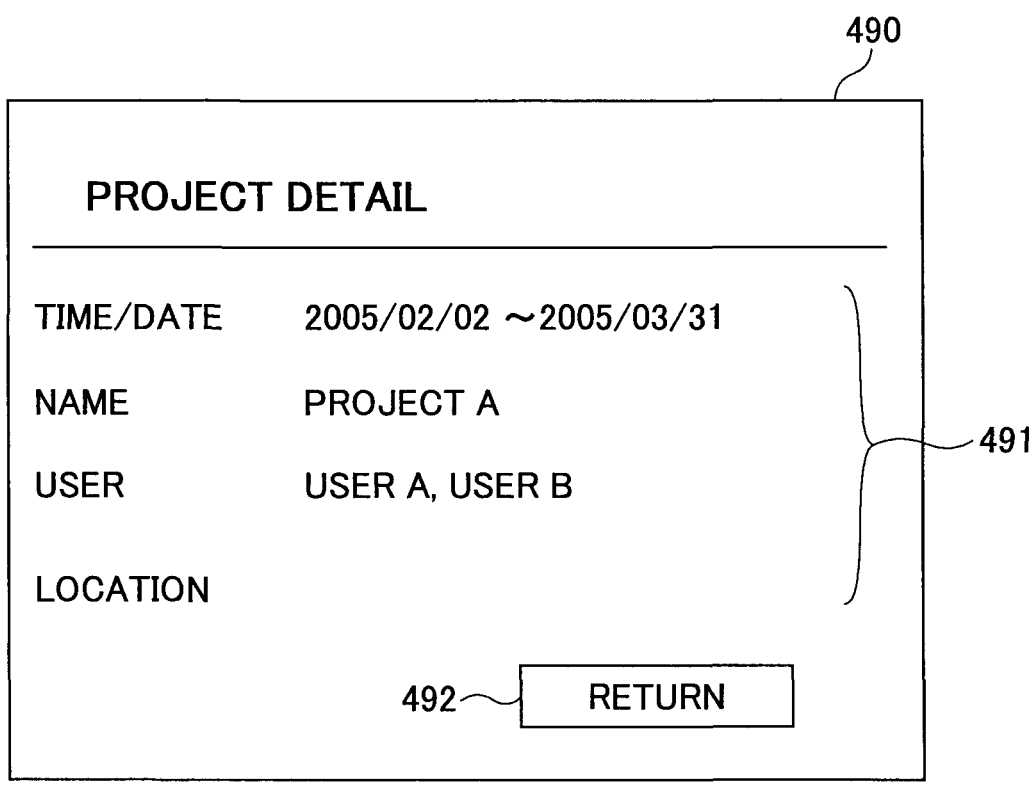
FIG. 19 is a diagram showing an exemplary detail screen indicating details of a project designated via the project designation screen of FIG. 18.

When the detail button 488 is selected, a detail screen 490 such as that shown in FIG. 19 may be displayed. The illustrated detail screen 490 includes detailed descriptions 491 of the project and a return button 492 for switching the display screen back to the project designation screen 480.

Figure 20:
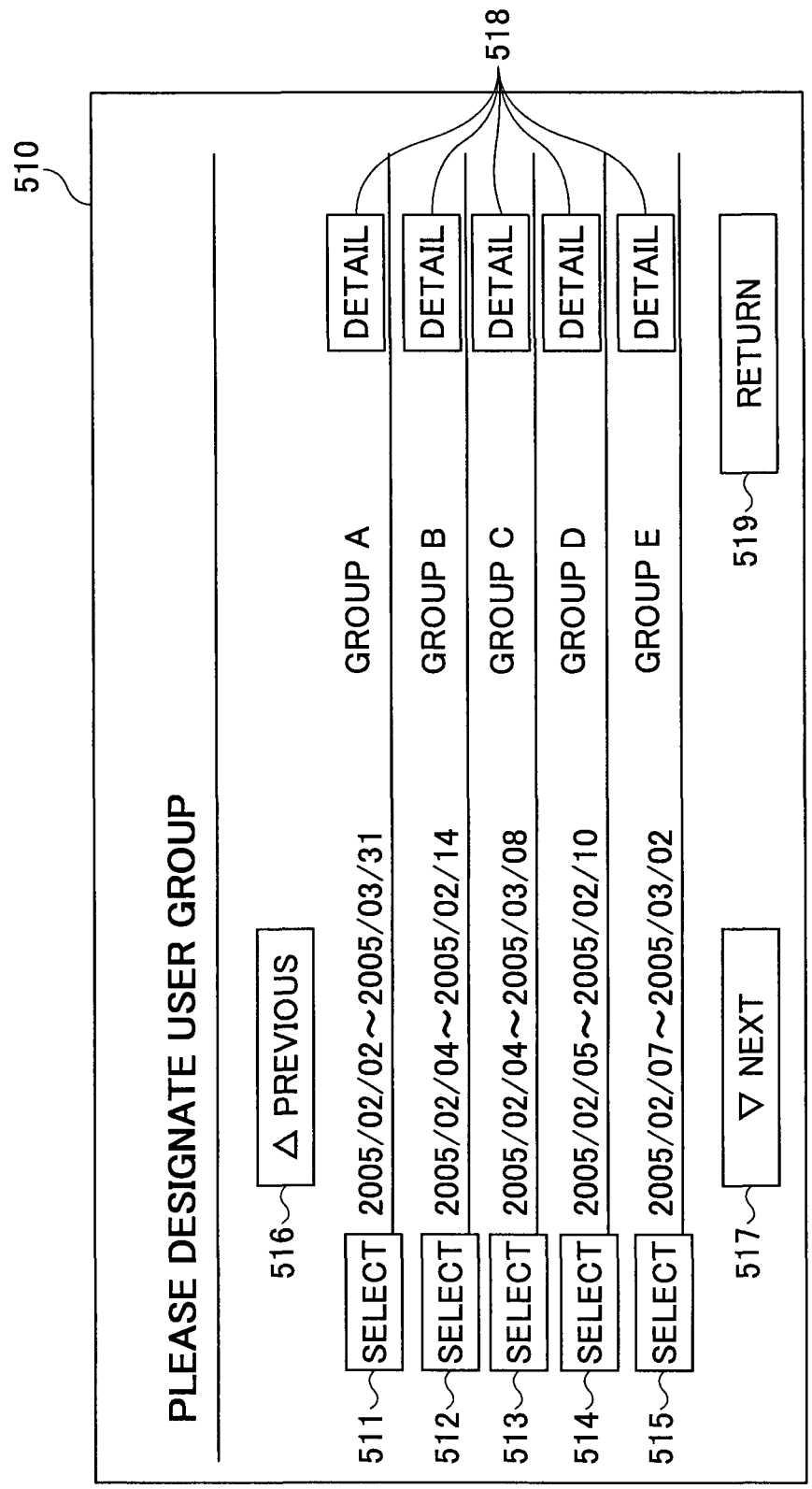
FIG. 20 is a diagram showing an exemplary user group designation screen displayed by the information processing apparatus according to the first embodiment.

When 'user group' is designated as the type of task to be acquired, a user group designation screen 510 such as that shown in FIG. 20 is displayed on the information display unit 151. Specifically, a predetermined number of user group information entries set to times/dates after the acquired time/date are listed in chronological order with the user group information entry set to a time/date closest to the acquired time/date being indicated at the top, for example. It is noted that the number of user group information entries to be displayed may be determined according to the size of the screen, for example.

The user group information may include a time/date related to the user group, the name of the user group, the members of the user group, and a location related to the user group, for example. It is noted that the time/date related to the user group may represent a point in time or a time period.

In the present example, individual user groups may be designated by selecting corresponding selection buttons 511-515. Also, user group information entries set at times/dates before those of the currently displayed user group information entries may be indicated by selecting a 'previous' button 516, and user group information entries set at times/dates after those of the currently displayed user group information entries may be indicated by selecting a 'next' button 517. Further, details of the individual user groups may be indicated by selecting corresponding detail buttons 518, and the display screen may be switched back to a previously displayed screen by selecting a return button 519.

Figure 21:
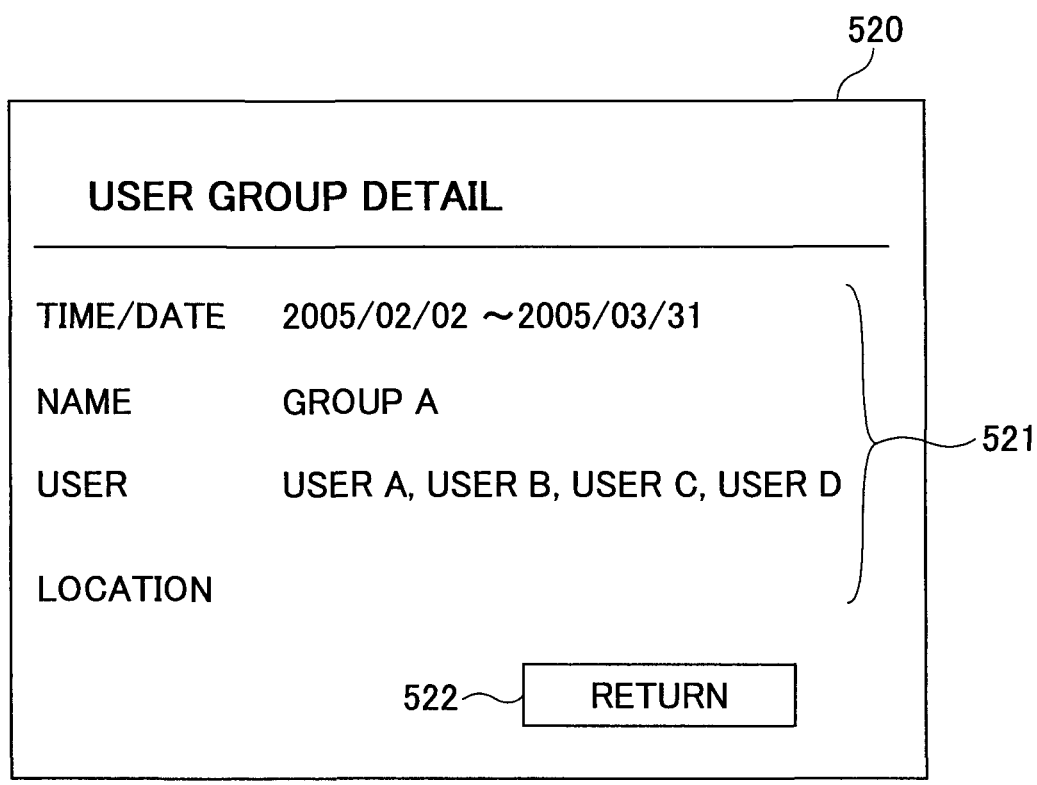
FIG. 21 is a diagram showing an exemplary detail screen indicating details of a user group designated via the user group designation screen of FIG. 20.

When the detail button 518 is selected, a detail screen 520 such as that shown in FIG. 21 may be displayed. The illustrated detail screen 520 includes detailed descriptions 521 of the user group and a return button 522 for switching the display screen back to the user group designation screen 510.

Figure 22:
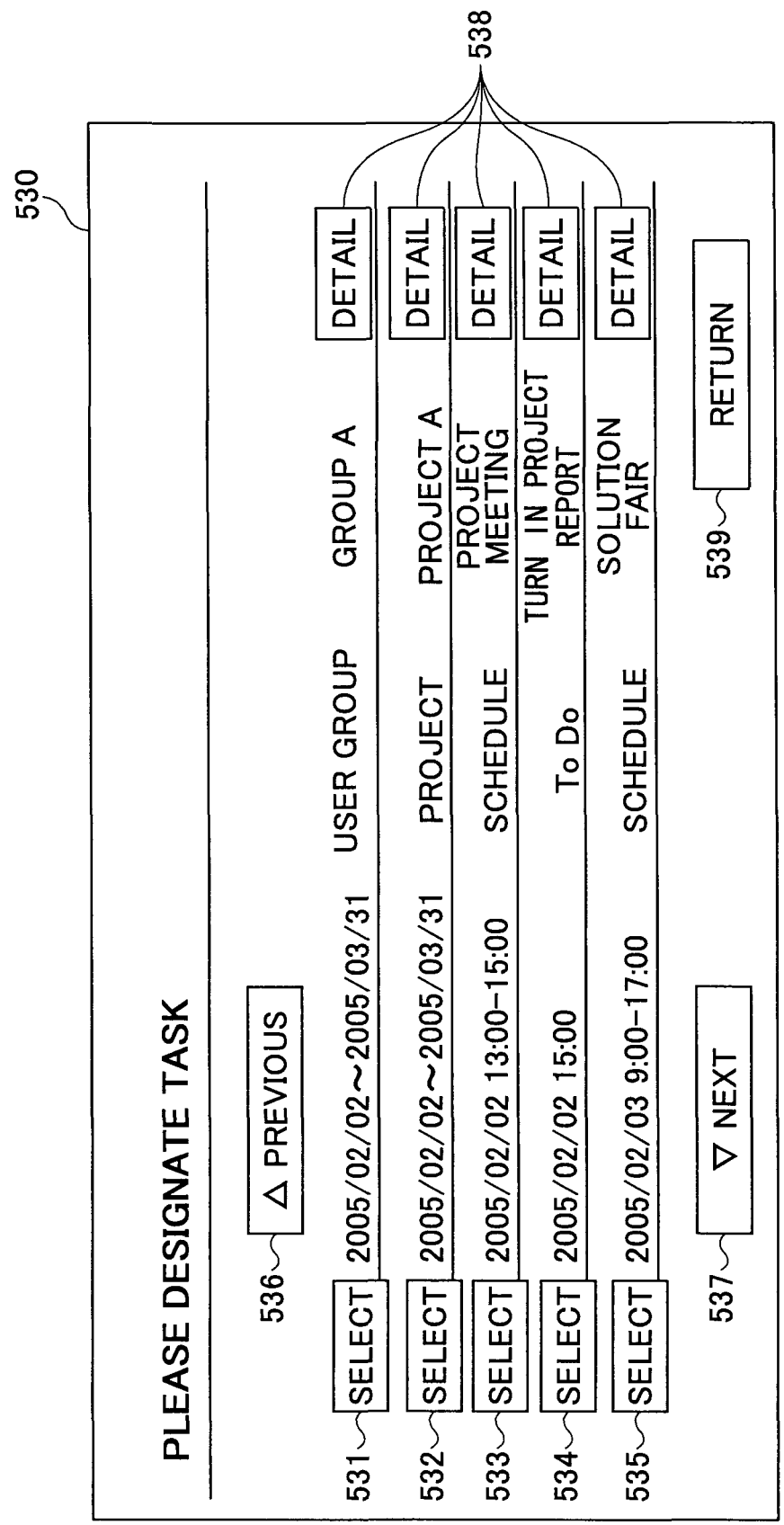
FIG. 22 is a diagram showing an exemplary task designation screen that is displayed by the information processing apparatus according to the first embodiment when a particular task type is not designated.
Figure 23:
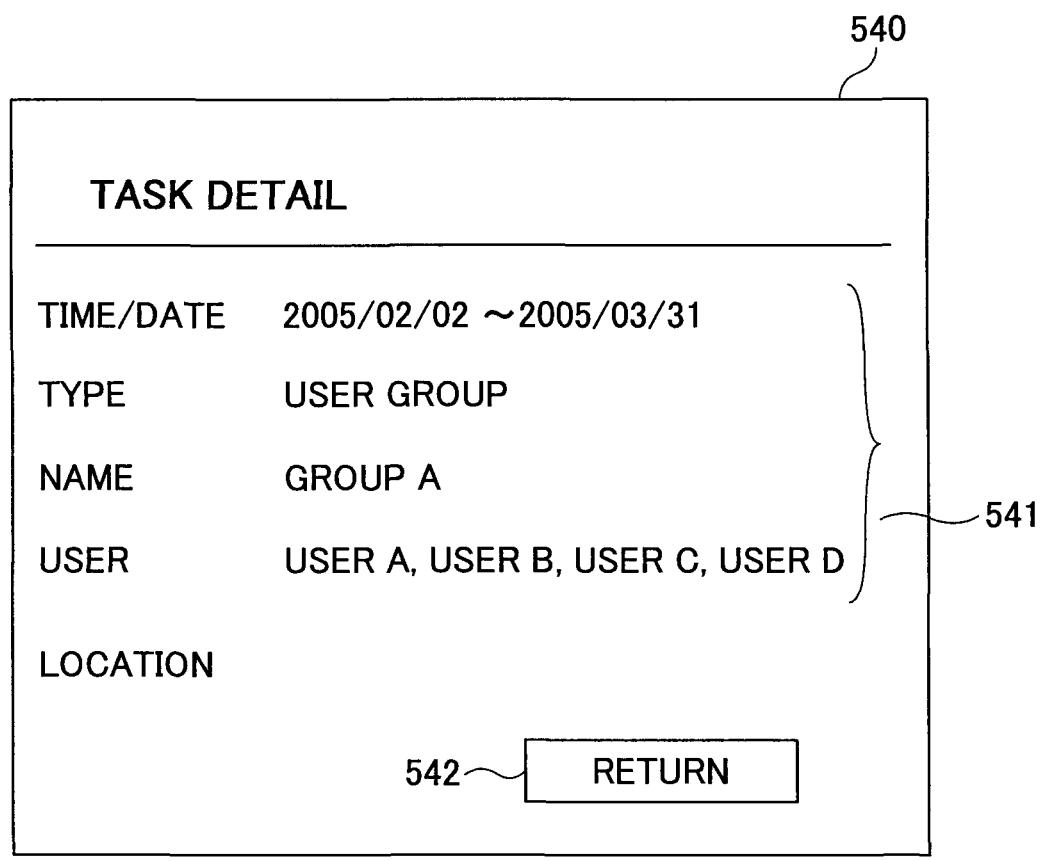
FIG. 23 is a diagram showing an exemplary detail screen indicating details of a task designated via the task designation screen of FIG. 22.

Also, the information display unit 151 may display a task designation screen 530 such as that shown in FIG. 22 that indicates tasks regardless of their type. The illustrated task selection screen 530 indicates information on the type of task of each task entry in addition to the display items included in the above-described designation screens 440-510.

The individual tasks displayed on the task designation screen 530 may be designated by selecting corresponding selection buttons 531-535. Also, tasks set at times/dates before those of the currently displayed tasks may be indicated by selecting a 'previous' button 536, and tasks set at times/dates after those of the currently displayed tasks may be indicated by selecting a 'next' button 537. Further, details of the individual tasks may be indicated by selecting corresponding detail buttons 538, and the display screen may be switched back to a previously displayed screen by selecting a return button 539.

When the detail button 538 is selected, a detail screen 520 such as that shown in FIG. 21 is displayed. The illustrated detail screen 520 includes detailed descriptions 521 of the task and a return button 522 for switching the display screen back to the task selection screen 530.

Referring back to FIG. 11, the user designates one of the task information entries displayed on the above-described designation screens via the operation command unit 152, the input acquiring unit 153 acquires the name of the designated task and other relevant information pertaining to the designated task, and the task acquiring unit 113 acquires the task name and relevant information from the input acquiring unit 153 (ST24). The task acquiring unit 113 determines whether the acquired task name and relevant information are stored in the task list table 161 and acquires a corresponding task ID of the designated task if the acquired task name and relevant information are stored in the task list table 161. If the acquired task name and relevant information are not stored in the task list table 161, the acquired task name and relevant information are stored in a newly added last row of the task list table 161, a task ID that is different from any of the task IDs already stored in the task list table 161 is acquired as a new task ID, and this new task ID is also stored in the newly added last line of the task list table 161.

In the following, the above process is described in greater detail.

First, an initial value is set to i=1 (ST25), and a determination is made as to whether the task name stored in the $i^{th}$ row fifth column of the task list table 161 corresponds to the acquired task name of the designated task (ST26). If the task names correspond, a determination is made as to whether information stored in the $i^{th}$ row second through fourth columns of the task list table 161 corresponds to the time/date, person, and location information of the designated task (ST27). If the information items correspond, the task ID stored in the $i^{th}$ row first column of the task list table 161 is acquired as the task ID of the designated task (ST28).

On the other hand, if the task name and relevant information of the designated task do not correspond to the task information stored in the $i^{th}$ row of the task list table 161 (ST26 No, or ST27 No), a determination is made as to whether the $i^{th}$ row corresponds to the last row of information stored in the task list table 161 (ST30), and if the $i^{th}$ row is not the last row, the value of 'i' is incremented by one (ST29) and the process goes back to step ST26. If the $i^{th}$ row corresponds to the last row of the task list table 161, a new row is added at the end of the task list table 161 after the $i^{th}$ row, and the task name of the designated task is stored in the fifth column of this newly added row (ST31). Then, the time/date, person, location information of the designated task is stored in the second through fourth columns of this newly added row (ST32), a reference number that does not correspond to any of the reference numbers stored in the first column of the task list table 161 is issued as the task ID of the designated task (ST33), and the newly issued task ID of the designated task is stored in the first column of the newly added row of the task list table 161 (ST34). In this way, a new task ID may be created for a task that is not stored in the task list table 161, the new task ID and other information associated with the task may be stored in a newly added row attached at the end of the task list table 161, and the task acquiring unit 113 may acquire this new task ID as the task ID of the designated task.

It is noted that in the above-described example, a determination is made as to whether a requested task corresponds to a task stored in the task list table 161 based on whether the combination of the task name and relevant information (i.e., time/date, person, and location information) of a designated task correspond to that of a task entry of the task list table 161. However, other combinations of information items may be used to as well including the combinations indicated below:
person and time/date information
location and time/date information In the following, an exemplary user authentication process performed by the user authentication unit 112 is described. In the present example, an ID of the user operating the present apparatus is acquired. Specifically, the login ID used for logging into the computer operating system may be acquired. In the present user authentication process, a list of users that are expected to use the present apparatus is displayed on the information display unit 151 so that the user may select a corresponding item from the list. In turn, the input acquiring unit 153 acquires a user name designated by the user and may request the user to input a corresponding password for user authentication as is necessary. In another example, a magnetic card may be used to acquire information pertaining to the user such as the user name, the user ID, and password. In this case, information such as the user name, the user ID, and password may be registered in the magnetic card, and the information registered in the magnetic card may be read by an information reading device when the magnetic card is presented thereto in the specified manner.

Next, a process of indicating candidate operations is described. FIG. 24 is a flowchart illustrating process steps of an exemplary candidate operations indicating process.

In the present example, operations stored in the operation log table 163 that are associated with the task ID acquired in the above-described task acquiring process are referenced, their probabilities of being selected by the user are calculated, and the operations are listed in order according to their calculated probabilities.

Specifically, initial values are set to i=1 and j=1 (ST41). Then, the task ID stored in the $i^{th}$ row fourth column of the operation log table 163 is compared with the acquired task ID (ST42). If the task IDs correspond (ST42 Yes), the following process steps are performed.

The operation described in the $i^{th}$ row first column of the operation log table 163 is regarded as candidate operation A(j) (ST43). It is noted that in one embodiment, the above determination step ST42 may involve determining whether the user ID acquired by the user authentication unit 112 corresponds to the user ID stored in the $i^{th}$ row third column of the operation log table 163 in addition to determining whether the task IDs correspond as is described above.

Then, the selection probability P(j) of the candidate operation A(j) is calculated (ST44). It is noted that although the selection probability P(j) may be a given constant number, in the present example, the current time/date and the time/date stored in the $i^{th}$ row second column of the operation log table 163 are compared to calculate P(j)=exp(−difference in time/date). If a selection probability is already calculated for an operation, identical to the candidate operation A(j), the selection probability P(j) is added to the previously calculated selection probability. Specifically, with respect to each of the cases where k=1, 2, . . . , and j−1, a determination is made as to whether A(j)=A(k) (ST45), and if it is determined that A(j)=A(k) when k corresponds to one of the above values (ST45 Yes), the selection probability of the relevant operation is calculated as P(k)=P(k)+P(j) (ST46). If there is no case where A(j)=A(k) with respect to any of the values of k (ST45 No), the value of j is incremented by one (i.e., j=j+1) (ST47). Then, the value of i is incremented by one (i.e., i=i+1) (ST49). The process steps ST43-ST47 are repeated until the value of i reaches the total number of rows included in the operation log table (ST48 Yes). Then, a predetermined number of the candidate operations A(j) are indicated in order according to their calculated selection probabilities P(j) in an operation designation screen 550 that is displayed on the information display unit 151 (ST50).

Figure 25:
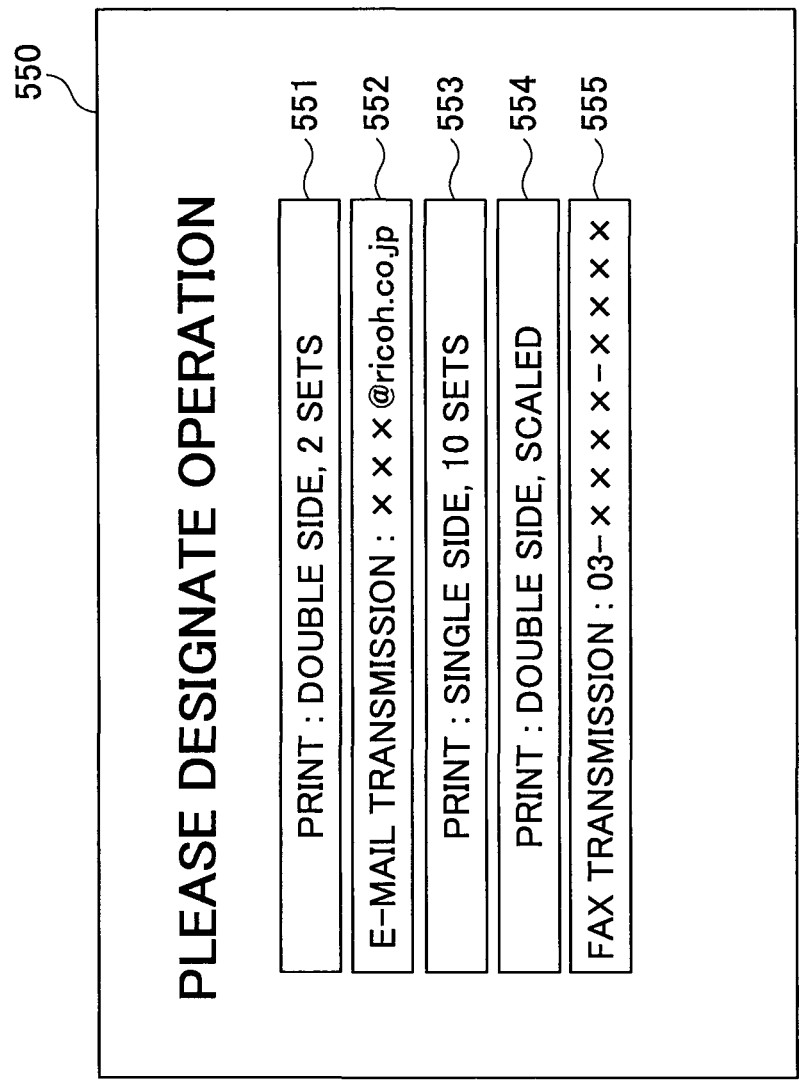
FIG. 25 is a diagram showing an exemplary operation designation screen displayed by the information processing apparatus according to the first embodiment.

FIG. 25 is a diagram showing an example of the operation designation screen 550. In the illustrated example, the operation designation screen 550 includes buttons 551-555 for selecting candidate operations 'print: double side, 2 sets', 'e-mail transmission' and 'print: single side, 10 sets', 'print: double side, scaled', and 'fax transmission', respectively. In this way, the user may select a desired operation from the displayed candidate operations, for example.

In the following, processes performed by the log managing unit 115 are described.

The log managing unit 115 may perform two types of processes, namely, 'log addition' and 'log updating'.

Specifically, in response to designation or execution of an operation, the log managing unit 115 is configured to perform log updating in a case where the operation log table 163 already includes a prescribed number of rows (log entries), and the log managing unit 115 is configured to perform log addition in a case where the number of rows of the operation log table 163 is still less than the prescribed number (ST14).

Figure 26:
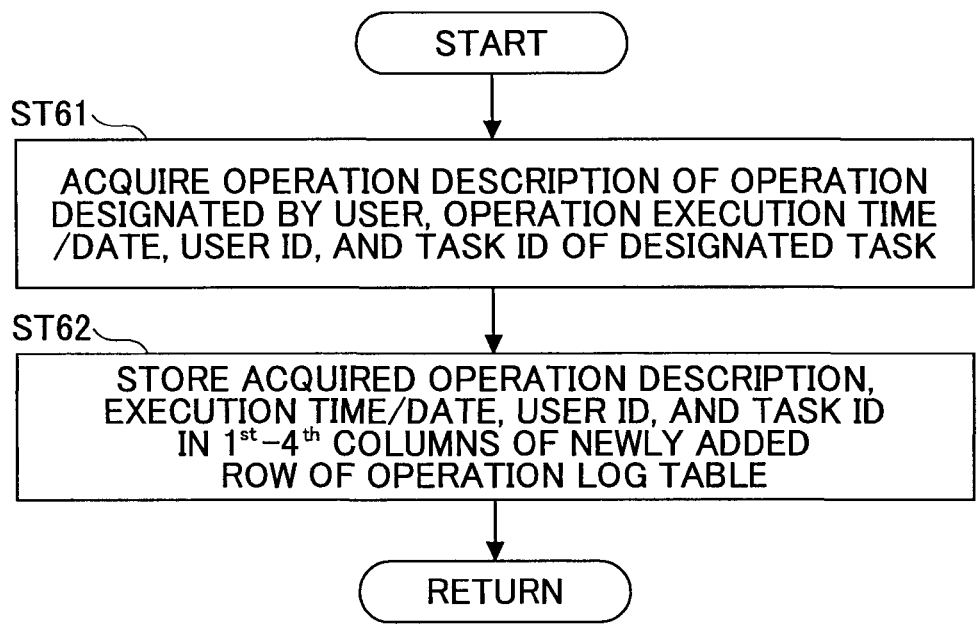
FIG. 26 is a flowchart illustrating a log addition process executed by a log managing unit of the information processing apparatus according to the first embodiment.

FIG. 26 is a flowchart illustrating process steps of a log addition process performed by the log managing unit 115. In performing log addition, the log managing unit 115 acquires the operation description of the operation that has actually been executed by the user, the time/date at which the operation has been executed, the user ID of the user, and the task ID of the task that has been designated by the user (ST61). Then, the log managing unit 115 stores the acquired operation description, time/date information, user ID, and task ID in the first through fourth columns, respectively, of a newly added last row of the operation log table 163 (ST62).

Figure 27:
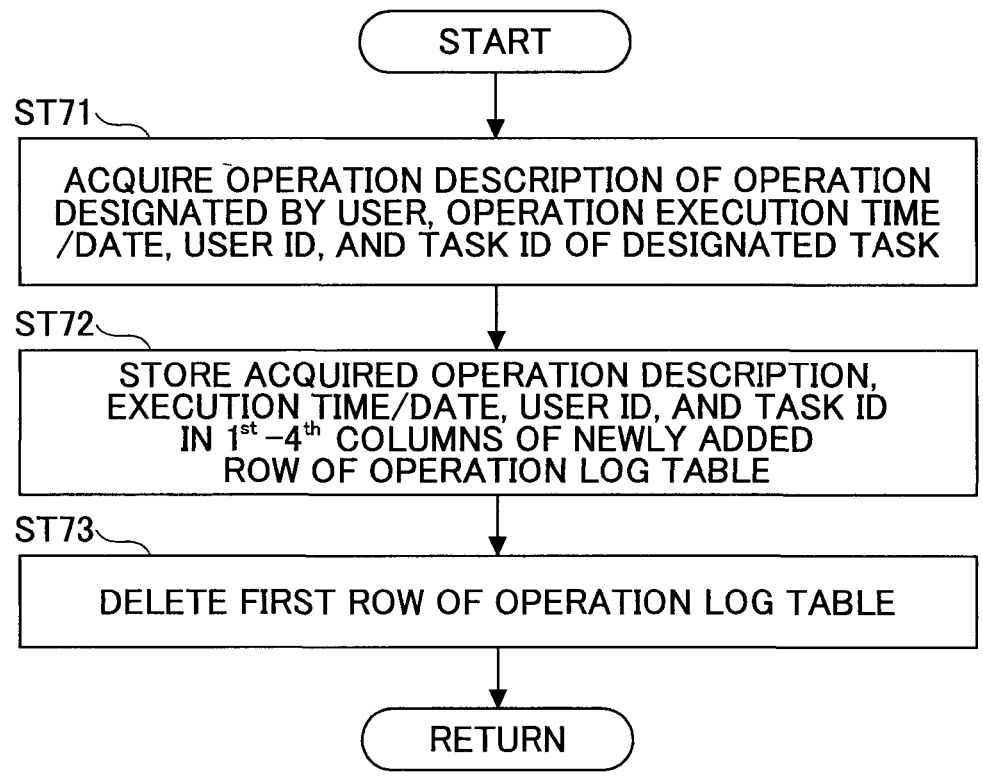
FIG. 27 is a flowchart illustrating a log updating process executed by the log managing unit of the information processing apparatus according to the first embodiment.

FIG. 27 is a flowchart illustrating process steps of a log updating process performed by the log managing unit 115. In performing log updating, the log managing unit 115 acquires the operation description of the operation that has actually been executed by the user, the time/date at which the operation has been executed, the user ID of the user, and the task ID of the task that has been designated by the user (ST71). Then, the log managing unit 115 stores the acquired operation description, time/date information, user ID, and task ID in the first through fourth columns, respectively, of a newly added last row of the operation log table 163 (ST72). Then, the log managing unit 115 deletes the first row of the operation log table 163 to end the present log updating process (ST73).

As can be appreciated from the above descriptions, in the case of executing an operation with respect to a file within the information processing system 10 according to the present embodiment, operations that are likely to be executed are estimated beforehand and such operations are presented to the user as candidate operations. Thus, a user may be able to execute a desired operation without having to go through complicated menu operation procedures, for example. Also, the above estimation is performed based on information pertaining to a 'task' associated with the file and the 'task' corresponds to information closely related to a business activity so that suitable operations with respect to the relevant business activity may be presented as candidate operations.

In the following, a second embodiment of the present invention is described with reference to FIGS. 28 and 29.

Figure 28:
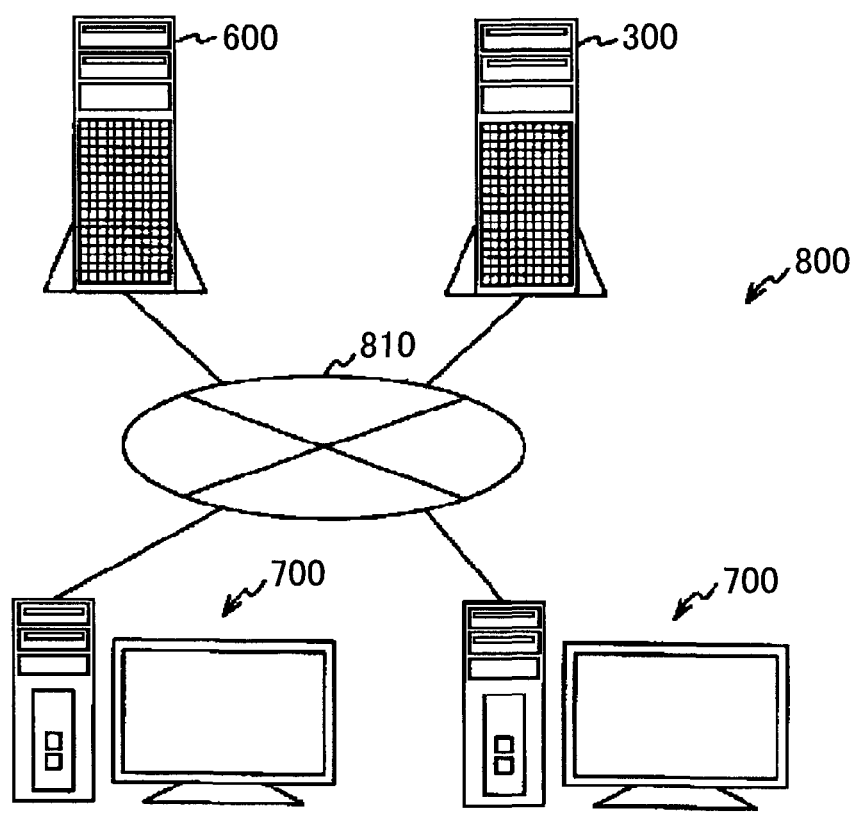
FIG. 28 is a diagram showing a configuration of an information processing system according to a second embodiment of the present invention.

FIG. 28 is a diagram showing a configuration of an information processing system including information processing apparatuses according to the second embodiment. FIG. 29 is a diagram showing detailed configurations of the information processing apparatuses and a database managing server of the system shown in FIG. 28.

The illustrated information processing system 800 of the present embodiment interconnects two personal computers 700, a task information managing server 300, and a database managing server 600 via a network 810. It is noted that the task information server 300 may be identical to that used in the above-described first embodiment.

Figure 29:
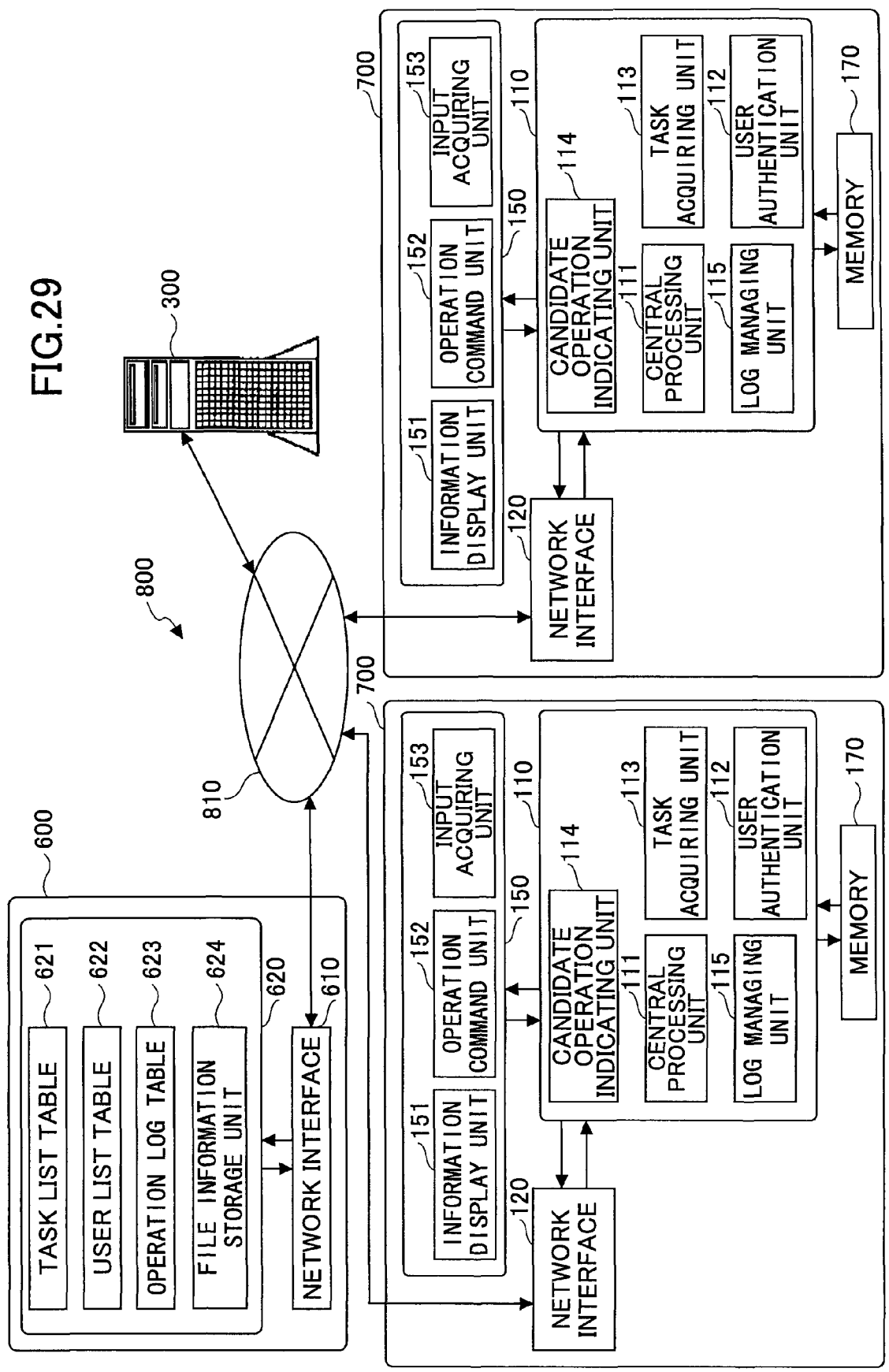
FIG. 29 is a diagram showing a detailed configuration of the information processing system according to the second embodiment.

As is shown in FIG. 29, the personal computer 700 as an information processing apparatus according to the present embodiment includes the functional units of the personal computer 100 shown in FIG. 3 except for the database unit 160. Specifically, according to the present embodiment, a functional unit corresponding to the database unit 160 is arranged in the database managing server 600 while the personal computer 700 includes the processing unit 110, the network interface 120, the man-machine interface unit 150, and the memory 170 of the personal computer 100. It is noted that elements of the present system that are identical to those of the system according to the first embodiment are given the same reference numerals and their descriptions are omitted.

The database managing server 600 includes a network interface 610 and a database unit 620. The database unit 620 includes a task list table 621, a user list table 622, an operation log table 623, and a file information storage table 624. According to the present embodiment, storage units for storing document files, task information, log information on executed operations, and information on the association of individual sets of task information with relevant operations are provided at the database managing server 600 that is connected to the network 810, and the storage units may be referenced, supplemented, or updated via the network interface 610.

As with the first embodiment, in the case of executing an operation with respect to a file within the information processing system 800 according to the second embodiment, operations that are likely to be executed are estimated beforehand and such operations are presented to the user as candidate operations. Thus, a user may be able to execute a desired operation without having to go through complicated menu operation procedures, for example. Also, the above estimation is performed based on information pertaining to a 'task' associated with the file and the 'task' corresponds to information closely related to a business activity so that suitable operations with respect to the relevant business activity may be presented as candidate operations.

Further, in the present embodiment, files, task information, and operation log information are maintained at the database managing server so that files, task information, and operation log information individually stored by plural personal computers may be shared, and the same operations may be performed using any one of the personal computers of the present system.

In the following, a third embodiment of the present invention is described below with reference to FIGS. 30-55.

Figure 30:
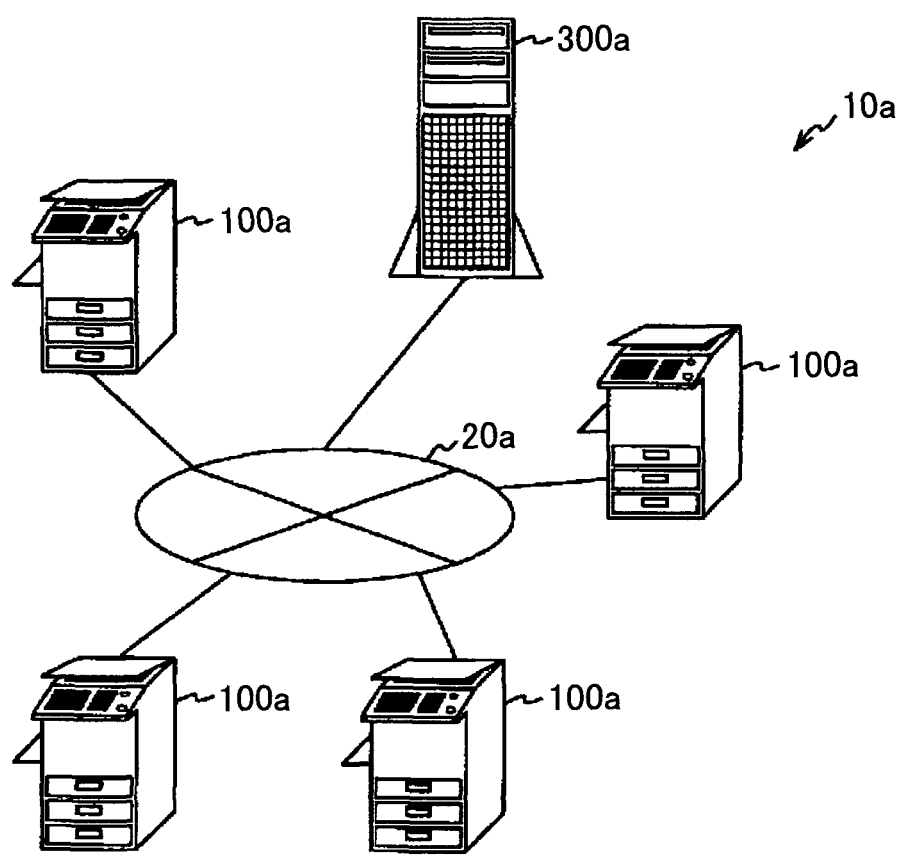
FIG. 30 is a diagram showing a configuration of an image processing apparatus system according to a third embodiment of the present invention.
Figure 31:
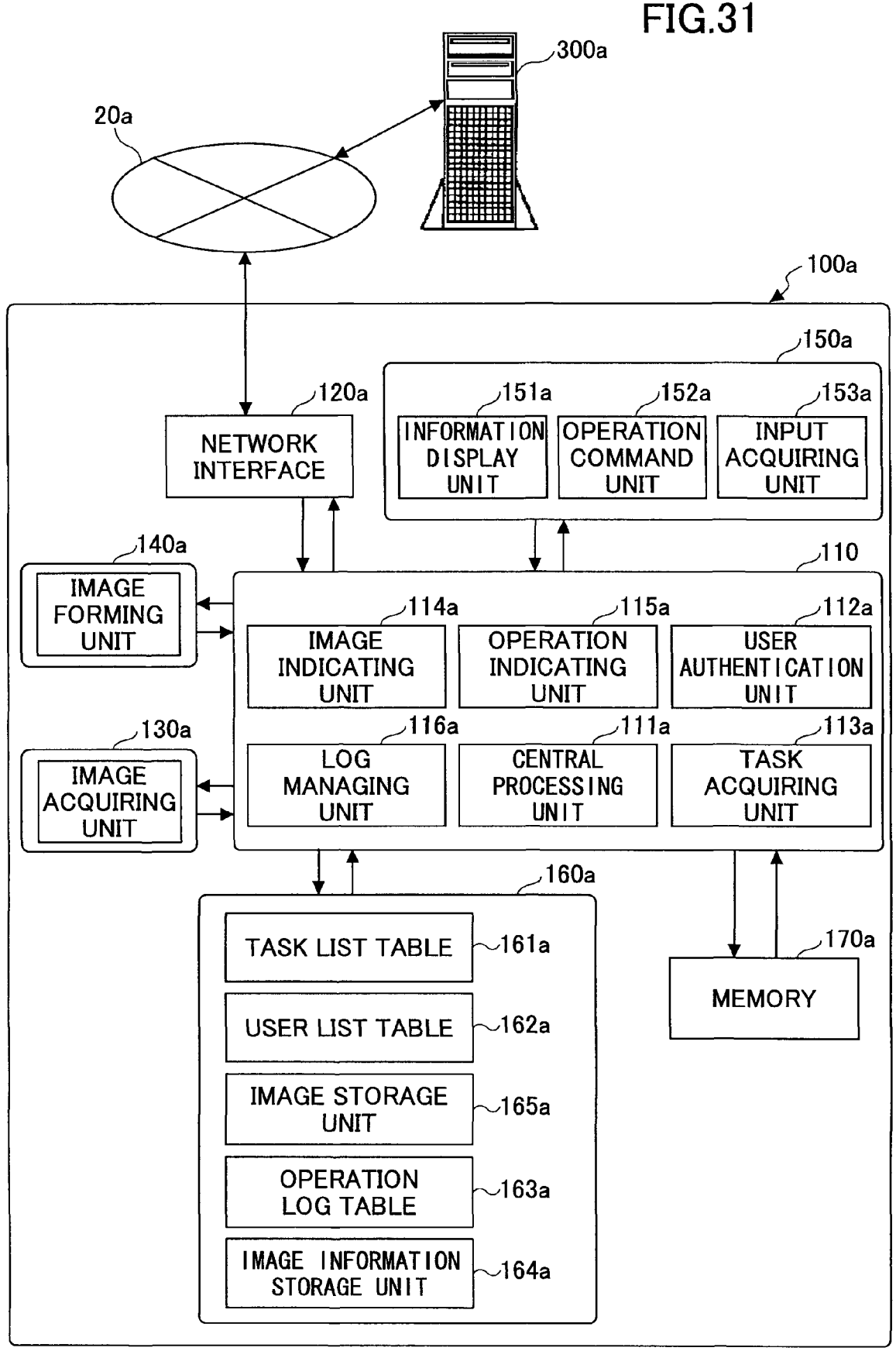
FIG. 31 is a diagram showing a configuration of an image processing apparatus according to the third embodiment.

FIG. 30 is a diagram showing an image processing apparatus system as an information processing system according to the third embodiment of the present invention, and FIG. 31 is a block diagram showing a configuration of an image processing apparatus as an information processing apparatus according to the third embodiment.

As is shown in FIG. 30, image processing apparatuses 100*a* make up an image processing apparatus system 10*a*. Specifically, the image processing apparatus system 10*a* has plural image processing apparatuses 10*a* that are connected via a network 20*a* to a task information managing server 300*a* having a task database unit. The task information managing server 300*a* is configured to manage task information of each of the image processing apparatuses 10*a* connected thereto.

It is noted that the image processing apparatus 10*a* according to the present embodiment corresponds to a multifunction machine having scanner functions, fax functions, copying functions, and storage functions, for example. The image processing apparatus 10*a* according to the present embodiment includes a processing unit 11*a* for performing overall control of the image processing apparatus 100*a* and task operation control, a network interface 120*a*, an image acquiring unit 130*a*, an image forming unit 140*a*, a man-machine interface unit 150*a*, a database unit 160*a*, and a memory 170*a*.

The processing unit 110a includes a central processing unit (CPU) 111a, a user authentication unit 112a that identifies a user ID, a task acquiring unit 113a that acquires task information stored by a user from the task information managing server 300a via the network interface 120a, an image indicating unit 114a that indicates a relevant image based on the acquired task information, an operation indicating unit 115a that indicates one or more operations associated with an image, and a log managing unit 116a that stores information pertaining to executed operations along with relevant task information in a storage unit.

The network interface 120a connects the image processing apparatus 100a to the task information managing server 300a via the network 20a to enable data transmission and reception between the image processing apparatus 100a and the task information managing server 300a. The image acquiring unit 130a includes a scanner that scans a recording medium such as an original document to acquire image data therefrom.

The image forming unit 140a includes a printer that forms an image on a medium such as paper through electrophotographic printing, for example. The man-machine interface unit 150a includes an information display unit 151a for presenting information to a user, an operation command unit 152a such as a touch panel or a button for enabling a user to input commands, and an input acquiring unit 153a that senses the input made by the user via the operation command unit 152a.

The database unit 160a includes a task list table 161a that stores task information pertaining to tasks of a user, a user list table 162a that stores information on a user using the image processing apparatus 100a, an operation log table 163a that stores information on the association between executed operations and task information relevant to the executed operations, an image information storage table 164a as a file information storage unit that stores information on the association between image files and task information relevant to the image files, and an image storage unit 165a that stores images acquired by the image acquiring unit 130a.

In the image processing apparatus system 10a as is described above, the image processing apparatus 100a acquires task information from the task information managing server 300a that is connected thereto via the network 20a.

Figure 32:
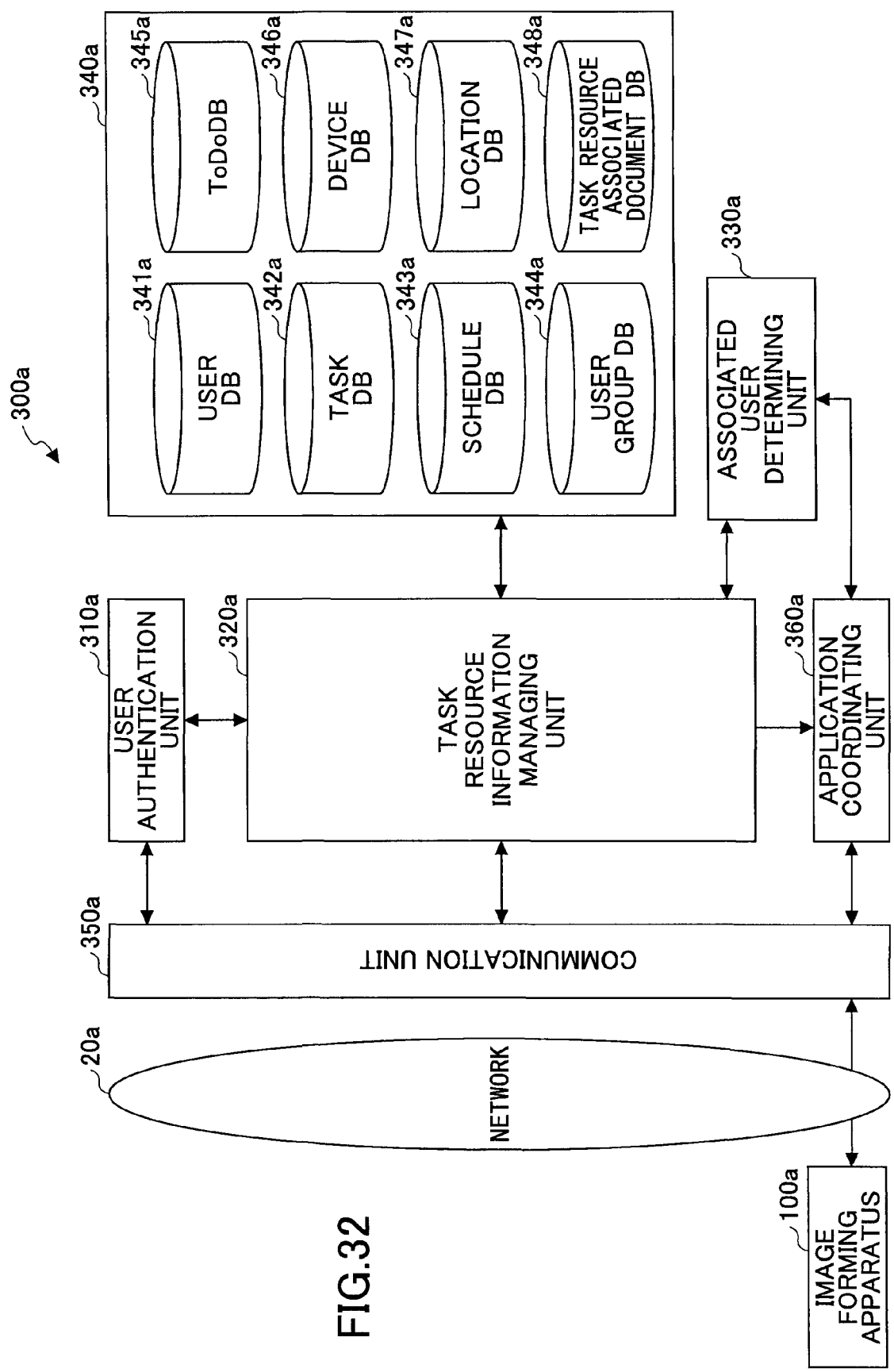
FIG. 32 is a diagram showing a configuration of a task information managing server included in the image processing apparatus system of the third embodiment.

In the following, the task information managing server 300a is described. FIG. 32 is a block diagram showing a configuration of the information managing server 300a. As is shown in this drawing, the task information managing server 300a includes a user authentication unit 310a, a task resource information managing unit 320a, an associated user determining unit 330a, an information managing database unit 340a, a communications unit 350a, and an application coordinating unit 360a.

The user authentication unit 310a performs user authentication on a user attempting to gain access to the task information managing server 300a. The task resource information managing unit 320a manages task resource information and task resource associated document information. The associated user determining unit 330a determines a user associated with a task resource. The information managing database unit 340a stores task information managing information, and includes a user database 341a corresponding to a user storage unit, a task database 342a, a schedule database 343a, a user group database 344a, a To Do database 345a, a device database 346a, a location database 347a, and a task resource associated document database 348a in the illustrated example. Also, the communications unit 350a enables data transmission and reception to/from plural image processing apparatuses 100a connected thereto via the network 20a.

It is noted that in the present embodiment, 'task' refers to a resource related to work or a business activity of a user and may be directed to a user group, a schedule, To Do information, or a project, for example. Also, in the present embodiment, 'information on a task' refers to additional information pertaining to a task such as information on a location, device, user, or time/date associated with the relevant task. Such 'task' and 'information on a task' are collectively referred to as 'task information'.

For example, in the case of addressing a user group as a task, information on the task may include the location of the user group, the device belonging to the user group, members of the user group, and the term or duration of the user group, for example.

In the case of addressing a schedule as a task, information on the task may include the location at which the schedule is to take place, the device used in executing the schedule, the person(s) executing the schedule, and the time/date at which the schedule is to be executed, for example.

In the case of addressing To Do information as a task, information on the task may include the location at which the To Do job item is to be performed, the device used in performing the To Do job item, the person(s) performing the To Do job item, and the term or duration over which the To Do job item is to be performed, for example.

In the case of addressing a project as a task, information on the task may include the location at which the project is to take place, the person(s) involved in the project, the device to be used in the project, and the term or duration of the project, for example.

In the following, the tables stored in the database unit 160a of the image processing apparatus 10a are described.

FIG. 33 is a table illustrating an exemplary configuration of information stored in the task list table 161a.

The illustrated task list table 161a is used for storing task information and has rows of task information entries each pertaining to a particular task. Also, the illustrated task list table 161a has columns of information items representing different categories of information associated with each task. Specifically, the first column stores a task ID assigned to each task which may correspond to a reference number unique to each task information entry, for example.

The second column stores information on a time/date associated with each task. For example, the time/date information may represent the date on which a schedule or a project is to take place and the time at which the schedule or project is to start. It is noted that the time/date information may represent a certain point in time or a certain period of time, for example.

The third column stores information on one or more users associated with each task. For example, the user information may include the user ID of one or more users involved in a relevant schedule or project.

The fourth column stores information on a location associated with each task. For example, the location information may include the name of the location at which a relevant schedule or project is to take place.

The fifth column stores a description (name) of each task. For example, the task description may include the user group name or the names of each member of the user group in the case where the task is directed to a user group, the name of the event that is to take place in the case where the task id directed to a schedule, or the name of a the job to be executed in the case where the task is directed to a To Do list.

Figure 34:
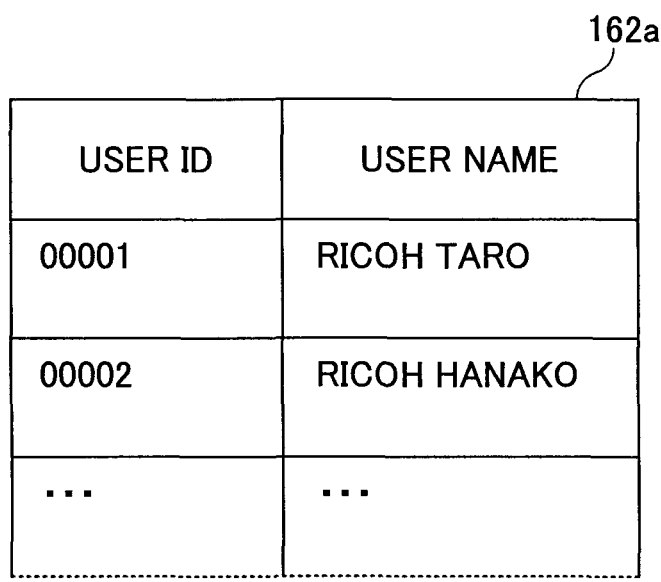
FIG. 34 is a table showing an exemplary configuration of information stored in a user list table of the image processing apparatus according to the third embodiment.

FIG. 34 is a table showing an exemplary configuration of information stored in the user list table 162a.

The illustrated user list table 162a stores a user name of a user in association with a unique reference number assigned to the relevant user. Specifically, the first column of the user list table 162a stores a user ID corresponding to a unique reference number assigned to each user, and the second column of the user list table 162a stores the name of each user.

FIG. 35 is a table showing an exemplary configuration of information stored in the operation log table 163a.

The illustrated operation log table 163a stores log information describing operations that have been executed at the image processing apparatus 100a.

Specifically, the first column of the operation log table 163a stores a description of each operation. For example, the operation description may include a function and execution specification of the function.

The second column of the operation log table 163a stores information on the time/data at which each operation has been executed.

The third column of the operation log table 163a stores the user ID of the user that has executed each operation. It is noted that the user ID stored in the present operation log table 163a corresponds to the user ID stored in the first column of the user list table 162a of FIG. 34.

The fourth column of the operation log table 163a stores a task ID assigned to the task associated with each operation. It is noted that the task ID stored in the present operation log table 163a corresponds to the task ID stored in the first column of the task list table 161a of FIG. 33.

FIG. 36 is a table showing an exemplary configuration of information stored in the image information storage table 164a.

The illustrated image information storage table 164a is used to store information pertaining to scanned images stored in the present system.

Specifically, the first column of the image information storage table 164a stores a document ID corresponding to a reference number that is unique to each scanned image.

The second column of the image information storage table 164a stores a document name corresponding to a user-designated name assigned to each scanned image.

The third column of the image information storage table 164a stores the user ID of a user that has stored each scanned image. It is noted that the user ID stored in the present image information storage table 164a corresponds to the user ID stored in the first column of the user list table 162a of FIG. 34.

The fourth column of the image information storage table 164a stores the task ID of task information associated with each scanned image. It is noted that in the present embodiment, the associated task information for each scanned image is designated by a user.

The fifth column of the image information storage table 164a stores information on the time/date at which each scanned image has been stored.

In the following, process operations of the image processing apparatus 100a according to the present embodiment are described.

Figure 37:
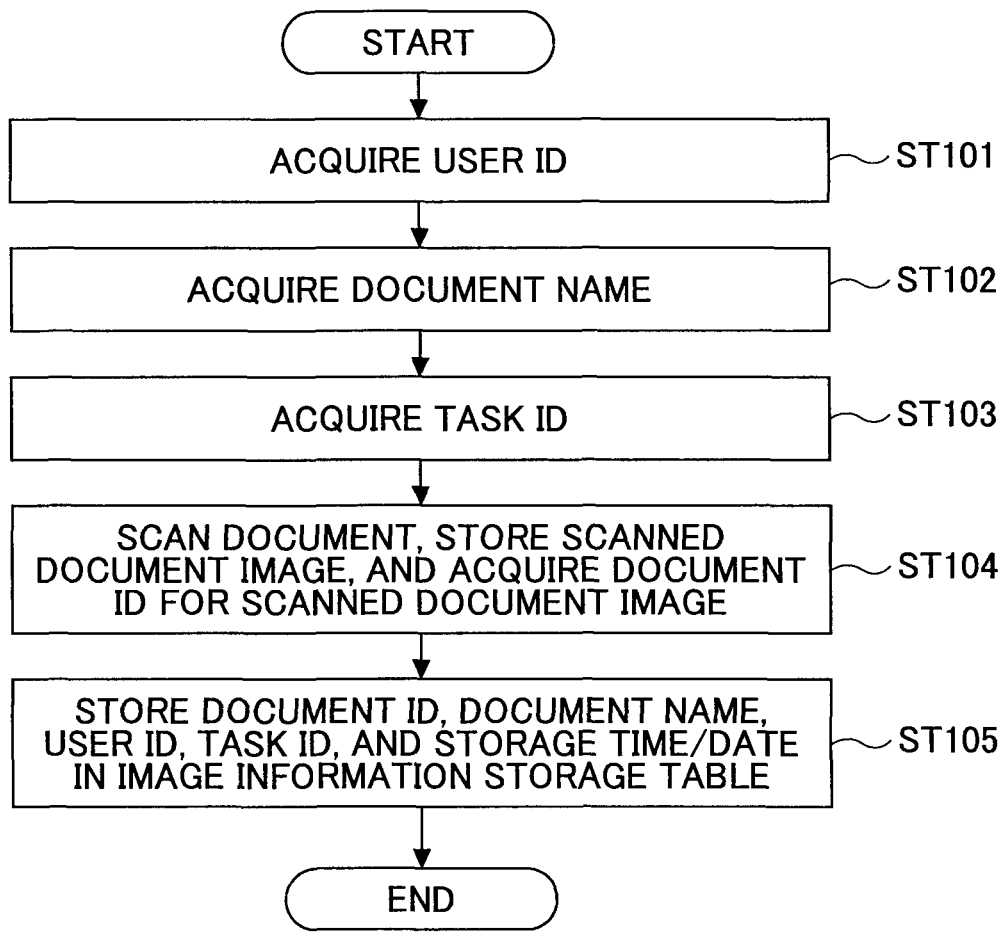
FIG. 37 is a flowchart illustrating process steps for storing an image in the image processing apparatus according to the third embodiment.
Figure 38:
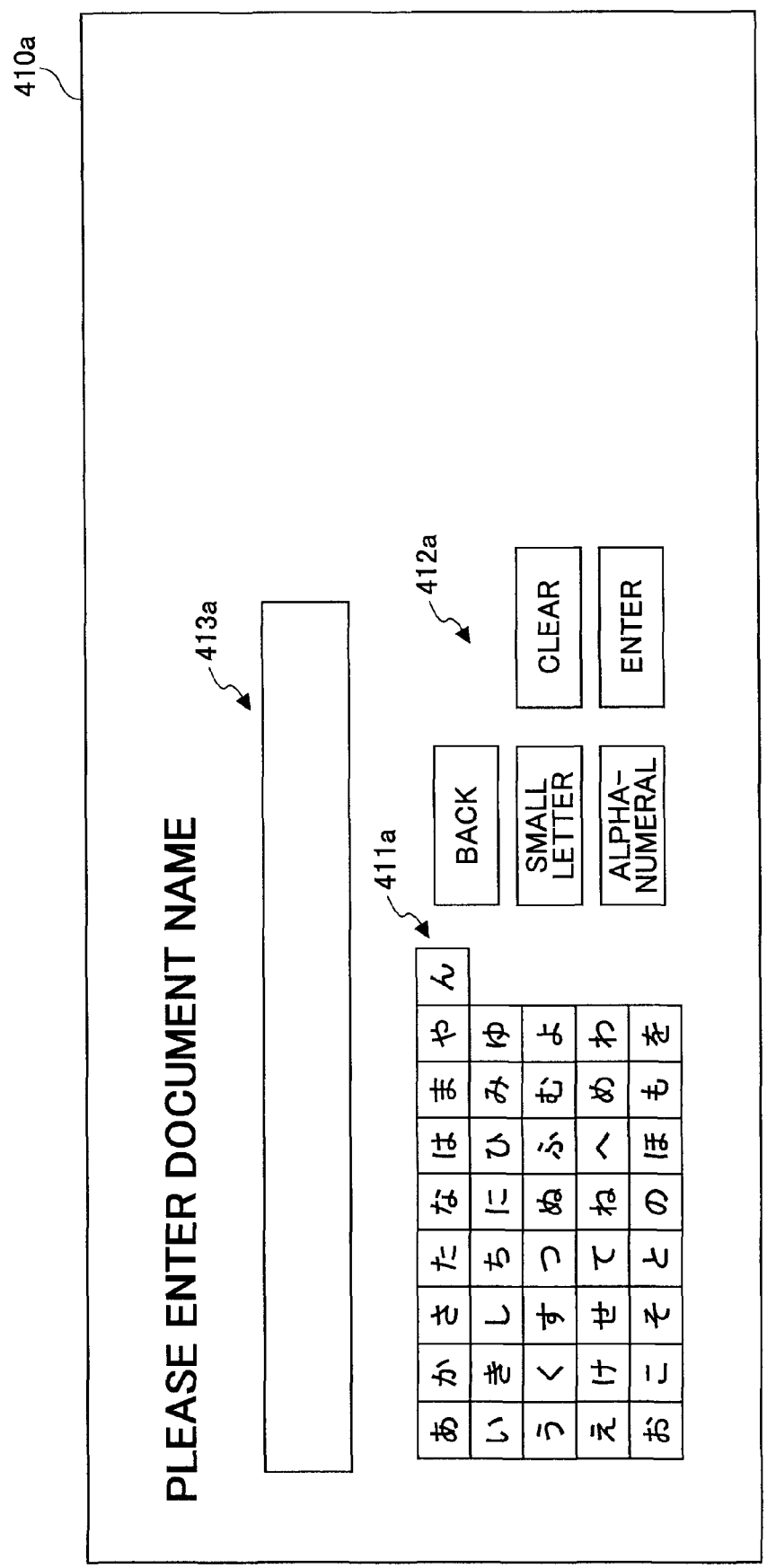
FIG. 38 is a diagram showing an exemplary document name input screen displayed by the image processing apparatus according to the third embodiment.

FIG. 37 is a flowchart illustrating exemplary process steps for storing a file in the image processing apparatus 100a. FIG. 38 is a diagram showing an exemplary document name input screen 410a. The illustrated image storing process may be implemented in a case where the image acquiring unit 130a scans a paper document and stores the scanned image, for example.

In the illustrated image storing process, first, the user authentication unit 112a acquires a user ID of the current user (ST101). It is noted that such user ID acquiring step may be performed using a conventionally known method such as reading information from a magnetic card. The operations of the user authentication unit 112a are described in greater detail below with reference to FIG. 48.

Then, the document name input screen 410a as is shown in FIG. 38 is displayed to prompt the user to input a document name via the operation command unit 152a and the input acquiring unit 153a acquires the document name input by the user (ST102). For example, the user may input a document name in an input column 413a by pressing input keys 411a and command keys 412a displayed on the input screen 410a.

Then, the task acquiring unit 113a acquires a task ID of a task designated by the user by referring to the task list table 161a (ST103). In the case where information on the task designated by the user is not stored in the task list table 161a, a new set of task information including a new task ID for the designated task, the task name, and additional information such as the time/date, location, and/or user associated with the task is stored in the last row of the task list table 161a. It is noted that detailed operations of the task acquiring unit 113a are described below with reference to FIG. 40.

When a paper document is set to the image acquiring unit 130a and a scan execution command is input via the operation command unit 152a, the image acquiring unit 130a scans the paper document, converts the scanned image into an electronic file, stores the electronic image file in the image storage unit 165a, and acquires a pointer that points to the stored image as a document ID of the image (ST104). Then, the log managing unit 116a stores the user ID, the document name, and the document ID of the stored image acquired in the above-described process steps in the image information storage table 164a (ST105).

It is noted that the log managing unit 116a stores information in the image information storage table 164a in a manner such that a document ID of an image and its corresponding document name are associated with a user ID of a user having stored the image, a task ID of a task associated with the image, and the time/date at which the image has been stored. Specifically, the log managing unit 116a creates a new row to be added as the last row of the image information storage table 164, and stores the acquired document ID, document name, user ID, task ID, and the image storage time/date in the first through fifth columns of the newly created row.

Figure 39:
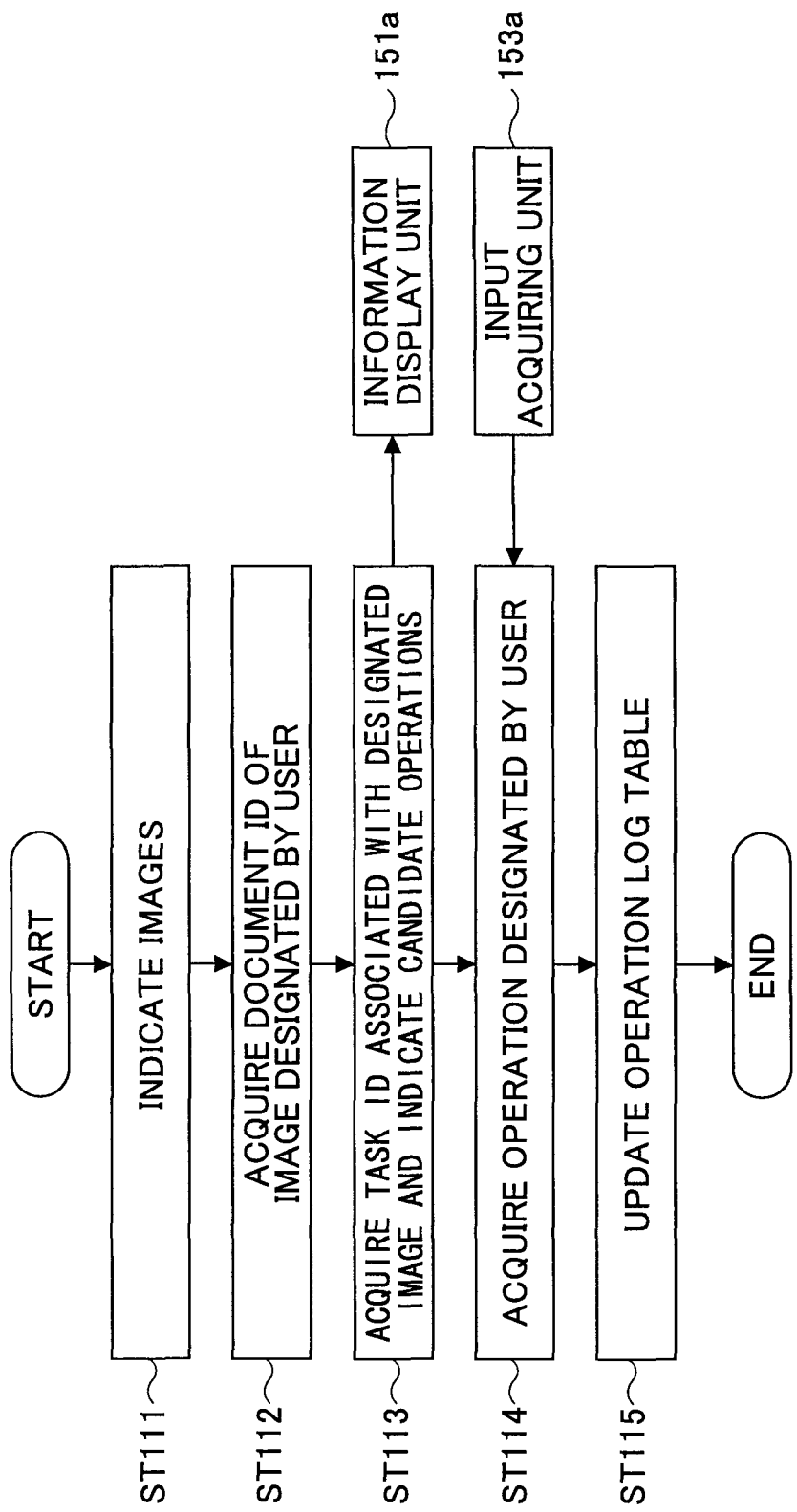
FIG. 39 is a flowchart illustrating process steps for executing an operation on an image at the image processing apparatus according to the third embodiment.

FIG. 39 is a flowchart illustrating process steps for executing an operation on an image.

In the illustrated process, first, the image indicating unit 114a displays plural images on the information display unit 151a (ST111). It is noted that detailed operations of the image indicating unit 114a are described below with reference to FIG. 52. When a user selects one of the displayed images using the operation command unit 152a, the input acquiring unit 153a acquires the document ID of the selected image (ST112). Then, based on the document ID acquired in step ST112, the operation indicating unit 115a refers to the image information storage table 164a, acquires a task ID associated with this document ID, and displays candidate operations associated with the acquired task ID on the information display unit 151a (ST113).

It is noted that in a case where a task ID is not stored in association with the document ID acquired in step ST112 in the image information storage table 164a, a similar document may be searched from the image information storage table 164a and a task ID associated with the similar document may be acquired as the task ID for the acquired document ID.

For example, a similar document for a given document may be searched in the following manner.

First, a document having a similar document name stored in the second column of the image information storage table 164a may be regarded as a candidate document. For example, a similar document name may be determined based on the number of character strings that a document name has in common with that of the given document. Also, a document having the same user ID(s) stored in the third column of the image information storage table 164a may be regarded as a candidate document. When plural documents with similar document names or the same user ID information exist, the document with the closest registration time/date stored in the fifth column of the image information storage table 164a may be regarded as the candidate document.

Figure 50:
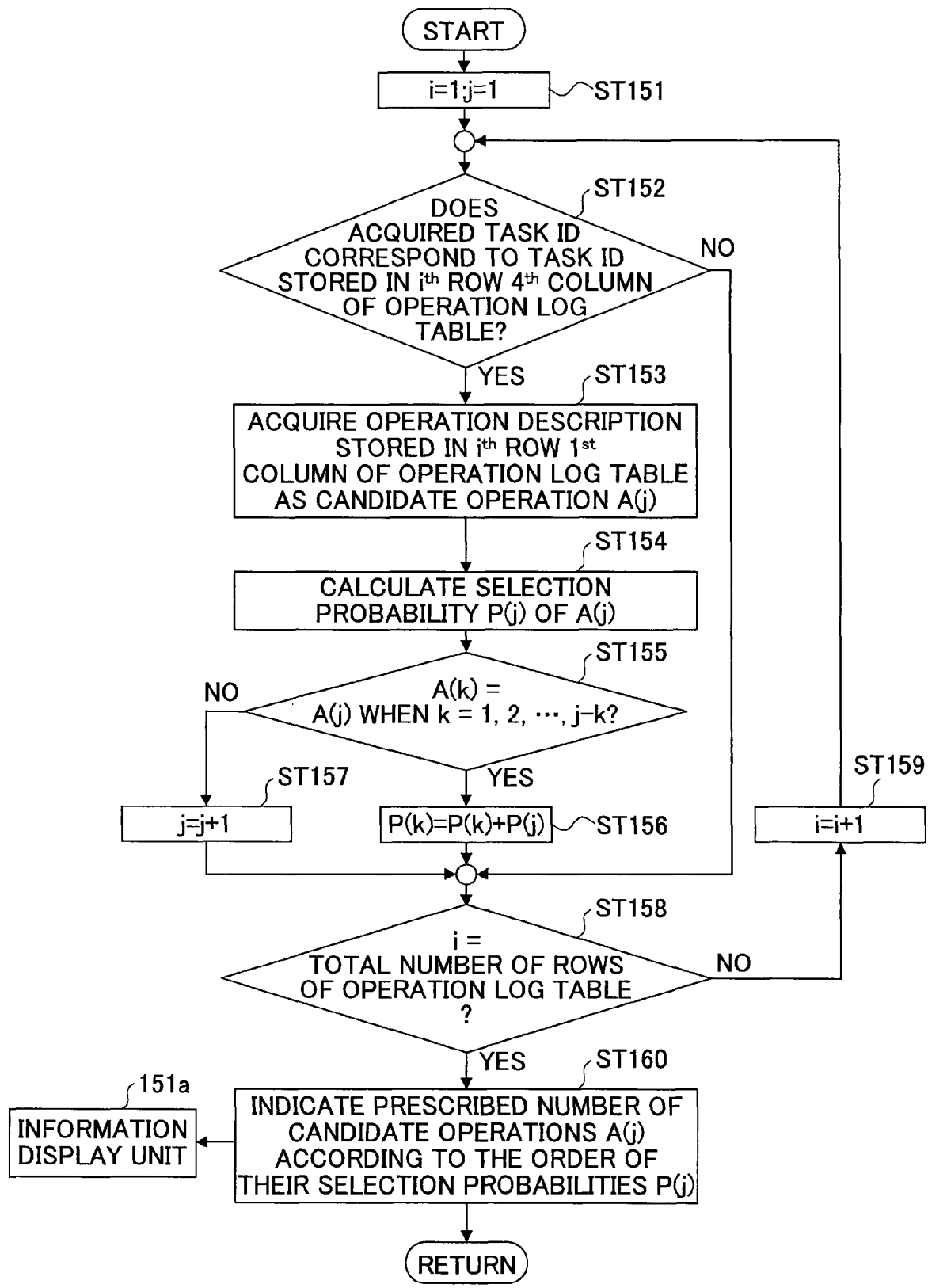
FIG. 50 is a flowchart illustrating a candidate operation indicating process executed by an operation indicating unit of the image processing apparatus according to the third embodiment.

It is noted that detailed operations of the operation indicating unit 114a for indicating candidate operations are described below with reference to FIG. 50.

Then, the input acquiring unit 153a acquires an operation selected by the user (ST114) so that the selected operation may be executed.

After the requested operation is executed, the log managing unit 115a adds information or updates the operation log table 163a (ST115). It is noted that detailed operations of the log managing unit 115a are described below with reference to FIGS. 54 and 55.

Figure 40:
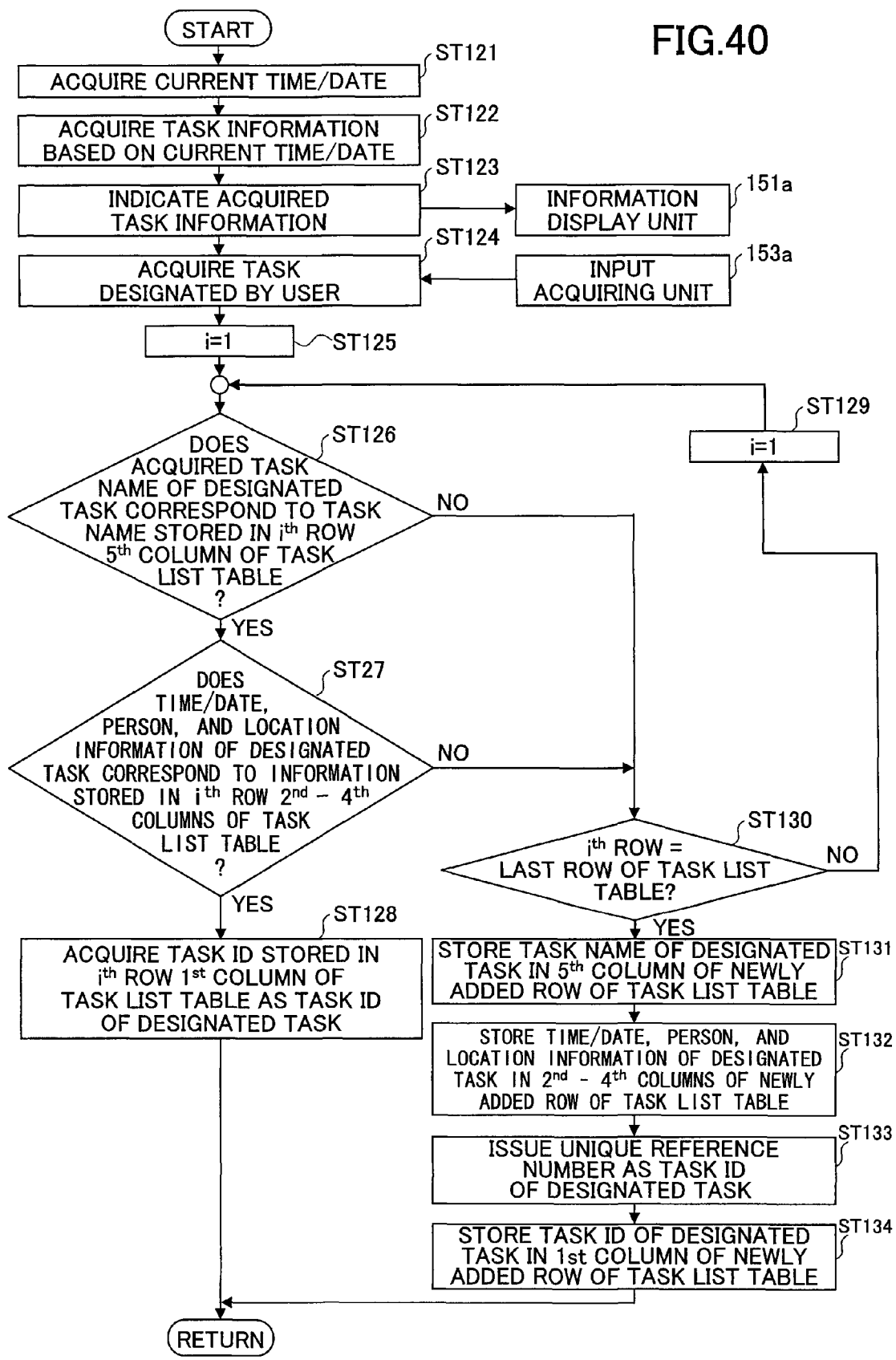
FIG. 40 is a flowchart illustrating a process executed by a task acquiring unit of the image processing apparatus according to the third embodiment.

FIG. 40 is a flowchart illustrating exemplary operations of the task acquiring unit 113a. FIG. 41 is a table showing an exemplary configuration of information stored in a task table.

The task acquiring unit 113a refers to a system clock that is managed by the operating system of the image processing apparatus 100a to acquire the current time/date (ST121). Then, the task acquiring unit 113a accesses the information managing database unit 340a of the task information managing server 300a, acquires tasks and their corresponding time/dates based on the current date, and stores the acquired tasks (ST122). The task acquiring unit 113a may acquire a predetermined number (e.g., five) of tasks with times/dates that are closest to the current time/date. It is noted that the number of tasks to be acquired by the task acquiring unit 113a at one time may be determined by the number of tasks that may be displayed on a display screen at one time, for example. FIG. 41 shows an exemplary task table 420a that may be used in determining the type of tasks to be acquired. Then, the acquired tasks are displayed on the information display unit 151a (ST123), and the input acquiring unit 153a acquires a task designated by the user (ST124).

In the following, procedures for acquiring task information from the task information managing server 300a are described in detail. To acquire task information, the image processing apparatus 100a transmits a user ID, time/date information, and the type of the task to be acquired to the communications unit 350a of the task information managing server 300a via the network 20a using HTTP. In turn, the communications unit 350a of the task information managing server 300a acquires corresponding task information from the information managing database unit 340a which corresponding task information can be determined based on the user ID, the time/date information, and the type of task transmitted from the information processing apparatus 100a.

In this case, the following process operations are performed within the task information managing server 300a.

First, the task table 420a shown in FIG. 41 that is stored in the task information managing server 300a is referenced, and the type of task to be acquired is determined (first step).

Then, the time/date range of the tasks to be acquired is determined based on the time/date information acquired from the information processing apparatus 100a (second step). For example, the time/date range of the tasks to be acquired may be within one month before/after the acquired time/date.

Then, the information managing database unit 340a of the task information managing server 300a is accessed to acquire a list of tasks associated with the acquired user ID which tasks correspond to the task type determined in the first step and are within the time/date range determined in the second step.

Then, the communications unit 350a transmits the acquired list to the information processing apparatus 100a in XML format using HTTP. In turn, the list is received by the network interface 120a of the image processing apparatus 100a. In this way, the process of transmitting a list from the task information managing server 300a to the image processing apparatus 100a is completed.

FIG. 42 is a diagram showing an exemplary task type designation screen 430a. The user may designate the type of task to be acquired via this task type designation screen 430a. Specifically, the task type designation may be performed by selecting one of selection buttons 431a-435a displayed on the task type designation screen 430a. In response to a task type designation by the user, the image processing unit 100a acquires the designated type of task and displays a corresponding screen on the information display unit 151a according to the designated task type.

FIGS. 43-47 are diagrams showing exemplary screens displayed on the information display unit 151a in response to a task designation.

When 'schedule' is designated as the type of task to be acquired, a schedule designation screen 440a shown in FIG. 43 may be displayed on the information display unit 151a, for example. Specifically, a predetermined number of schedule information entries set at times/dates after the acquired time/date are listed in chronological order with the schedule closest to the acquired time/date being indicated at the top, for example. It is noted that the number of schedule information entries to be displayed may be determined based on the size of the screen, for example.

The schedule information may include the time/date of the schedule, the name of the schedule, the person(s) involved in the schedule, and the location of the schedule, for example. It is noted that the time/date of the schedule may represent one point in time or a certain time period.

In the present example, individual schedules may be designated by selecting corresponding selection buttons 441a-445a. Also, schedules preceding the schedules currently being displayed may be indicated by selecting a 'previous' button 446a, and schedules coming after the schedules currently being displayed may be indicated by selecting a 'next' button 447a.

When 'To Do' is designated as the type of task to be acquired, a 'To Do' designation screen 450a such as that shown in FIG. 44 may be displayed on the information display unit 151a. Specifically, a predetermined number of To Do information entries set at times/dates after the acquired time/date may be listed in chronological order with the To Do information entry set at a time/date closest to the acquired time/date being indicated at the top, for example. It is noted that the number of To Do information entries to be displayed may be determined according to the size of the screen, for example.

The To Do information may include the time/date related to the To Do entry, the name of the To Do entry, the person(s) involved in the To Do entry, and the location related to the To Do entry, for example. It is noted that the time/date related to the To Do entry may represent a point in time or a time period.

In the present example, individual To Do entries may be designated by selecting corresponding selection buttons 451a-455a. Also, To Do entries set at times/dates before those of the currently displayed To Do entries may be displayed by selecting a 'previous' button 456a, and To Do entries set at times/dates after those of the currently displayed To Do entries may be displayed by selecting a 'next' button 457a.

When 'project' is designated as the type of task to be acquired, a project designation screen 460a such as that shown in FIG. 45 may be displayed on the information display unit 151a. Specifically, a predetermined number of project information entries set at dates/times after the acquired time/date may be listed in chronological order with the project set at a time/date closest to the acquired time/date being indicated at the top, for example. It is noted that the number of project information entries to be displayed may be determined according to the size of the screen, for example.

The project information may include the time/date of the relevant project, the name of the project, the person(s) involved in the project, and the location of the project, for example. It is noted that the time/date of the project may represent a point in time or a time period.

In the present example, individual projects may be designated by selecting corresponding selection buttons 461a-465a. Also, project information entries set at times/dates before those of the currently displayed project information entries may be displayed by selecting a 'previous' button 466a, and project information entries set at times/dates after those of the currently displayed project information entries may be displayed by selecting a 'next' button 467a.

When 'user group' is designated as the type of task to be acquired, a user group designation screen 470a such as that shown in FIG. 46 is displayed on the information display unit 151a. Specifically, a predetermined number of user group information entries set to times/dates after the acquired time/date are listed in chronological order with the user group information entry set to a time/date closest to the acquired time/date being indicated at the top, for example. It is noted that the number of user group information entries to be displayed may be determined according to the size of the screen, for example.

The user group information may include a time/date related to the user group, the name of the user group, the members of the user group, and a location related to the user group, for example. It is noted that the time/date related to the user group may represent a point in time or a time period.

In the present example, individual user groups may be designated by selecting corresponding selection buttons 471a-475a. Also, user group information entries set at times/dates before those of the currently displayed user group information entries may be indicated by selecting a 'previous' button 746a, and user group information entries set at times/dates after those of the currently displayed user group information entries may be indicated by selecting a 'next' button 477a.

Also, the information display unit 151a may display a task designation screen 480a such as that shown in FIG. 47 that indicates tasks regardless of their type. The illustrated task selection screen 480a indicates information on the type of task of each task entry in addition to the display items included in the above-described designation screens 440a-470a.

The individual tasks displayed on the task designation screen 480a may be designated by selecting corresponding selection buttons 481a-485a. Also, tasks set at times/dates before those of the currently displayed tasks may be indicated by selecting a 'previous' button 486a, and tasks set at times/dates after those of the currently displayed tasks may be indicated by selecting a 'next' button 487a.

Referring back to FIG. 40, the user designates one of the task information entries displayed on the above-described designation screens via the operation command unit 152a, the input acquiring unit 153a acquires the name of the designated task and other relevant information pertaining to the designated task, and the task acquiring unit 113a acquires the task name and relevant information from the input acquiring unit 153a (ST124). The task acquiring unit 113a determines whether the acquired task name and relevant information are stored in the task list table 161a and acquires a corresponding task ID of the designated task if the acquired task name and relevant information are stored in the task list table 161a. If the acquired task name and relevant information are not stored in the task list table 161a, the acquired task name and relevant information are stored in a newly added last row of the task list table 161a, a task ID that is different from any of the task IDs stored in the task list table 161a is acquired as a new task ID, and the new task ID is also stored in the newly added last row of the task list table 161a.

In the following, the above process is described in greater detail.

First, an initial value is set to i=1 (ST125), and a determination is made as to whether the task name stored in the $i^{th}$ row fifth column of the task list table 161a corresponds to the acquired task name of the designated task (ST126). If the task names correspond, a determination is made as to whether the information stored in the $i^{th}$ row second through fourth columns of the task list table 161a corresponds to the time/date, person, and location information of the designated task (ST127). If the information items correspond, the task ID stored in the $i^{th}$ row first column of the task list table 161a is acquired as the task ID of the designated task (ST128).

On the other hand, if the task name and relevant information of the designated task do not correspond to the task information stored in the $i^{th}$ row of the task list table 161a (ST126 No, or ST127 No), a determination is made as to whether the $i^{th}$ row corresponds to the last row of information stored in the task list table 161a (ST130), and if the $i^{th}$ row is not the last row, the value of 'i' is incremented by one (ST129) and the process goes back to step ST126. If the $i^{th}$ row corresponds to the last row of the task list table 161a, a new row is added at the end of the task list table 161a after the $i^{th}$ row, and the task name of the designated task is stored in the fifth column of this newly added row (ST131). Then, the time/date, person, and location information of the designated task is stored in the second through fourth columns of this newly added row (ST132), a reference number that does not correspond to any of the reference numbers stored in the first column of the task list table 161a is issued as the task ID of the designated task (ST133), and the newly issued task ID of the designated task is stored in the first column of the newly added row of the task list table 161a (ST134). In this way, a new task ID may be created for a task that is not stored in the task list table 161a, the new task ID and other information associated with the task may be stored in a newly added row attached at the end of the task list table 161a, and the task acquiring unit 113a may acquire this new task ID as the task ID of the designated task.

It is noted that in the above example, a determination is made as to whether a task to be acquired corresponds to a task stored in the task list table 161a based on whether the combination of the task name and relevant information (time/date, person, and location information) of the task to be acquired corresponds that of a task entry of the task list table 161a. However, other combinations of information items may be used for determining the correspondence such as those listed below:

person and time/date information
location and time/date information

Figure 48:
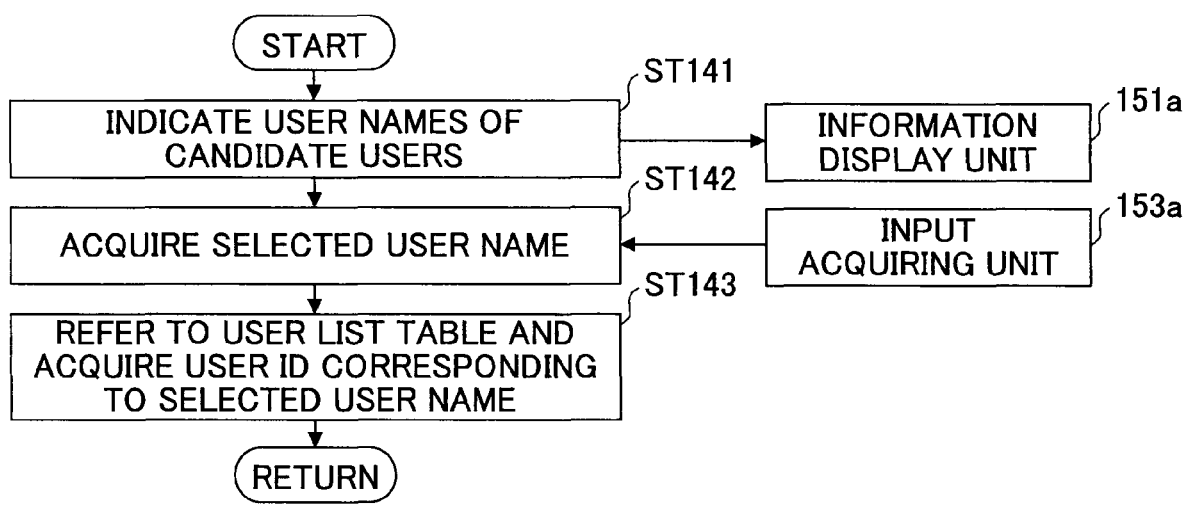
FIG. 48 is a flowchart illustrating a user authentication process executed by a user authentication unit of the image processing apparatus according to the third embodiment.
Figure 49:
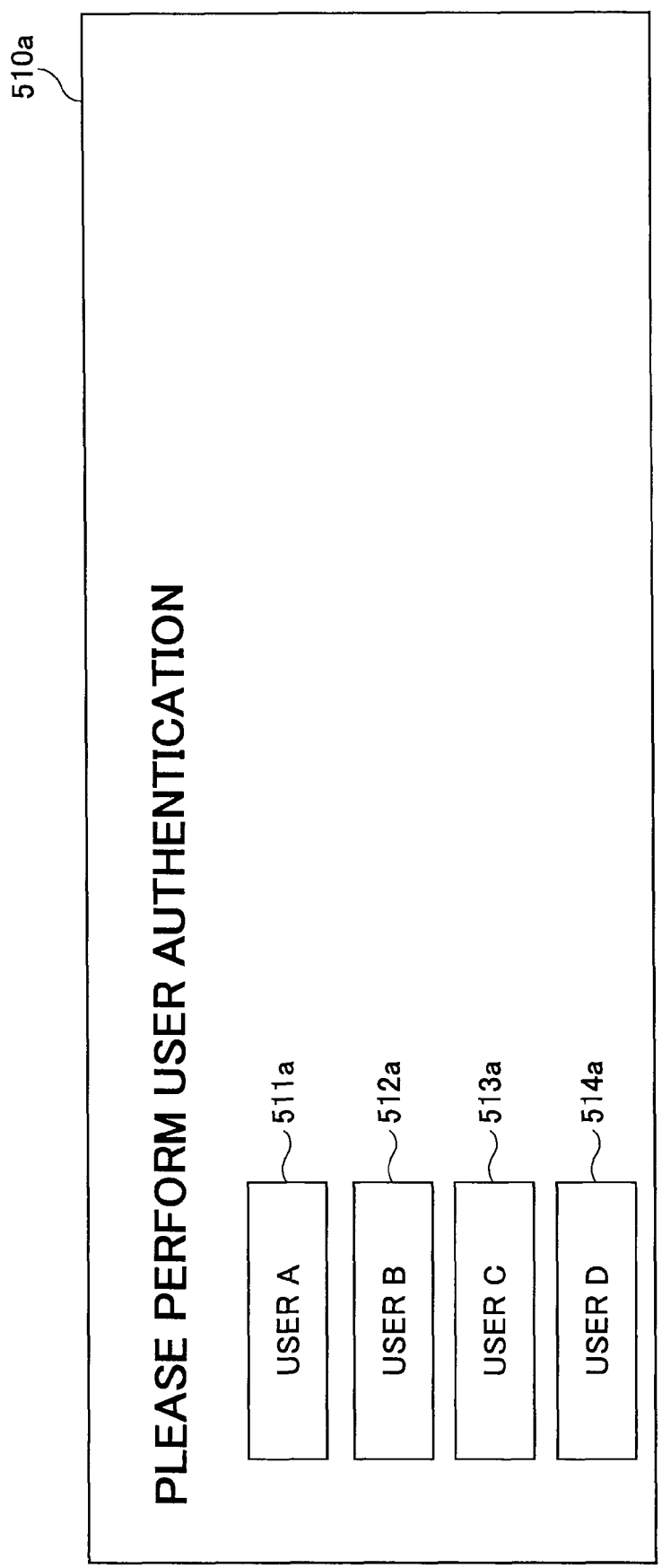
FIG. 49 is a diagram showing an exemplary user authentication screen displayed by the image processing apparatus according to the third embodiment.

In the following, an exemplary user authentication process performed by the user authentication unit 112a is described. FIG. 48 is a flowchart illustrating process steps performed by the user authentication unit 112a, and FIG. 49 is a diagram showing an exemplary user authentication screen 510a.

In the present example, upon performing user authentication, a list of candidate users that are likely to be the current user of the image processing apparatus 100a is displayed on the information display unit 151a (ST141). As is shown in FIG. 49, the user authentication screen 510a displays user buttons 511a-514a that may be used to designate the current user. It is noted that the user buttons 511a-514a may indicate corresponding user names as in the present example or other user information such as user IDs. When the current user selectively presses one of the user buttons 511a-514a, the input acquiring unit 153a acquires a corresponding user name associated with the selected user button (ST142). In turn, the user authentication unit 112a refers to the user list table 162a to acquire a corresponding user ID (ST143). Then, the user authentication unit 112a may request the current user to input a password as is necessary for performing user authentication. In another example, a magnetic card may be used for acquiring information pertaining to the user such as the user name, the user ID, and password. In this case, information such as the user name, the user ID, and password may be registered in the magnetic card, and the information may be read by an information reading device when the magnetic card is presented thereto in the specified manner, for example.

Next, a process of indicating candidate operations is described. FIG. 50 is a flowchart illustrating process steps of an exemplary candidate operations indicating process.

In the present example, operations stored in the operation log table 163a that are associated with the task ID acquired in the above-described task acquiring process are referenced, their probabilities of being selected by the user are calculated, and the operations are listed in order according to their calculated probabilities.

Specifically, initial values are set to i=1 and j=1 (ST151). Then, the task ID stored in the $i^{th}$ row fourth column of the operation log table 163a is compared with the acquired task ID (ST152). If the task IDs correspond (ST152 Yes), the following process steps are performed.

The operation described in the $i^{th}$ row first column of the operation log table 163a is regarded as candidate operation A(j) (ST153). It is noted that in one embodiment, the above determination step ST152 may involve determining whether the user ID acquired by the user authentication unit 112a corresponds to the user ID stored in the $i^{th}$ row third column of the operation log table 163a in addition to determining whether the task IDs correspond as is described above.

Then, the selection probability P(j) of the candidate operation A(j) is calculated (ST154). It is noted that although the selection probability P(j) may be a given constant number, in the present example, the current time/date and the time/date stored in the $i^{th}$ row second column of the operation log table 163a are compared to calculate P(j)=exp(−difference in time/date). If a selection probability is already calculated for an operation, identical to the candidate operation A(j), the selection probability P(j) is added to the previously calculated selection probability. Specifically, with respect to each of the cases where k=1, 2, . . . , and j−1, a determination is made as to whether A(j)=A(k) (ST155), and if it is determined that A(j)=A(k) when k corresponds to one of the above values (ST155 Yes), the selection probability of the relevant operation is calculated as P(k)=P(k)+P(j) (ST156). If there is no case where A(j)=A(k) with respect to any of the values of k (ST155 No), the value of j is incremented by one (i.e., j=j+1) (ST157). Then, the value of i is incremented by one (i.e., i=i+1) (ST159). The process steps ST153-ST157 are repeated until the value of i reaches the total number of rows included in the operation log table 163a (ST158, Yes). Then, a predetermined number of the candidate operations A(j) are indicated in order according to their calculated selection probabilities P(j) on an image access operation selection screen 520a that is displayed on the information display unit 151a (ST160).

Figure 51:
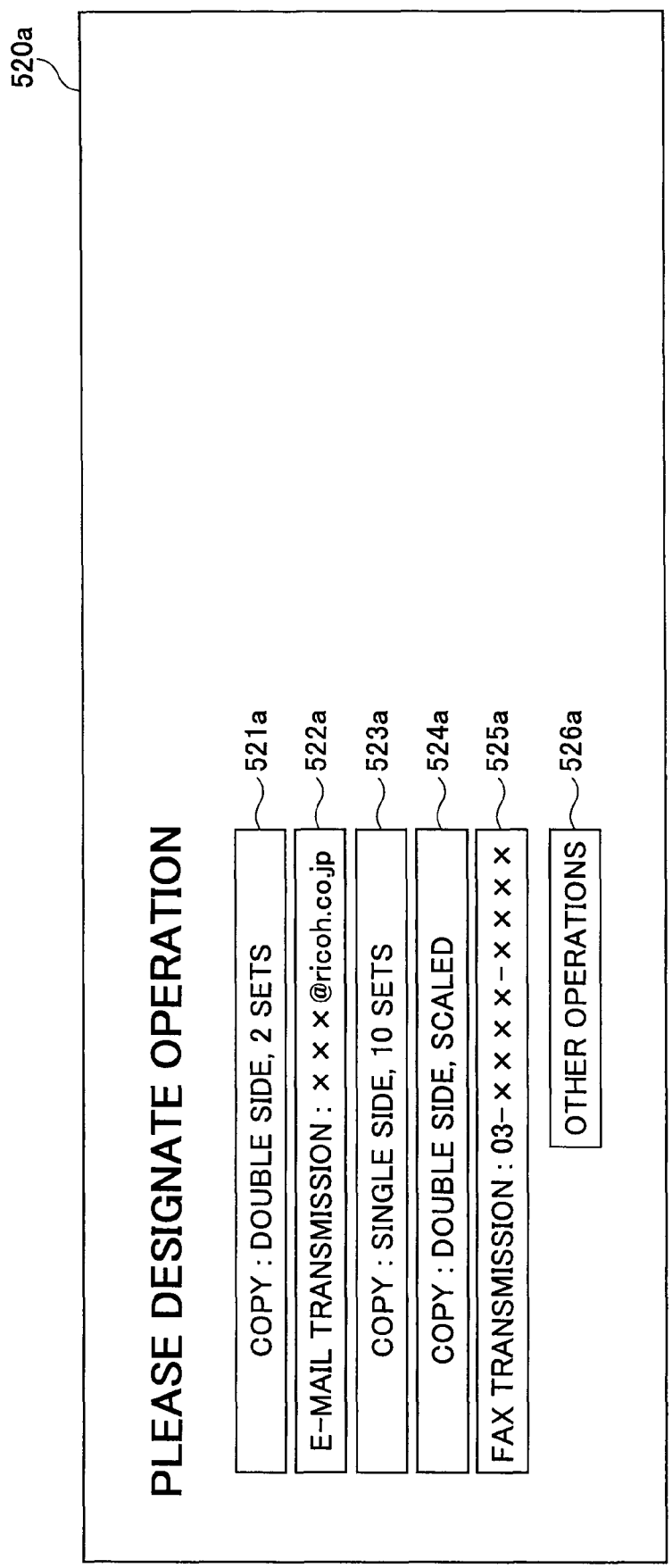
FIG. 51 is a diagram showing an exemplary image access operation selection screen displayed by the image processing apparatus according to the third embodiment.

FIG. 51 is a diagram showing an exemplary image access operation selection screen 520a. In the illustrated example, the image access operation selection screen 520a displays a 'copy: double side, two sets' button 521a, an 'e-mail transmission' button 522a, a 'copy: single side, ten sets' button 523a, a 'copy: double side, scaled' button 524a, a 'fax transmission' button 525a, and an 'other operations' button 526a as candidate operation selection buttons. Accordingly, the user may select a desired operation from the displayed candidate operations by pressing one of the buttons 521a-526a.

Figure 52:
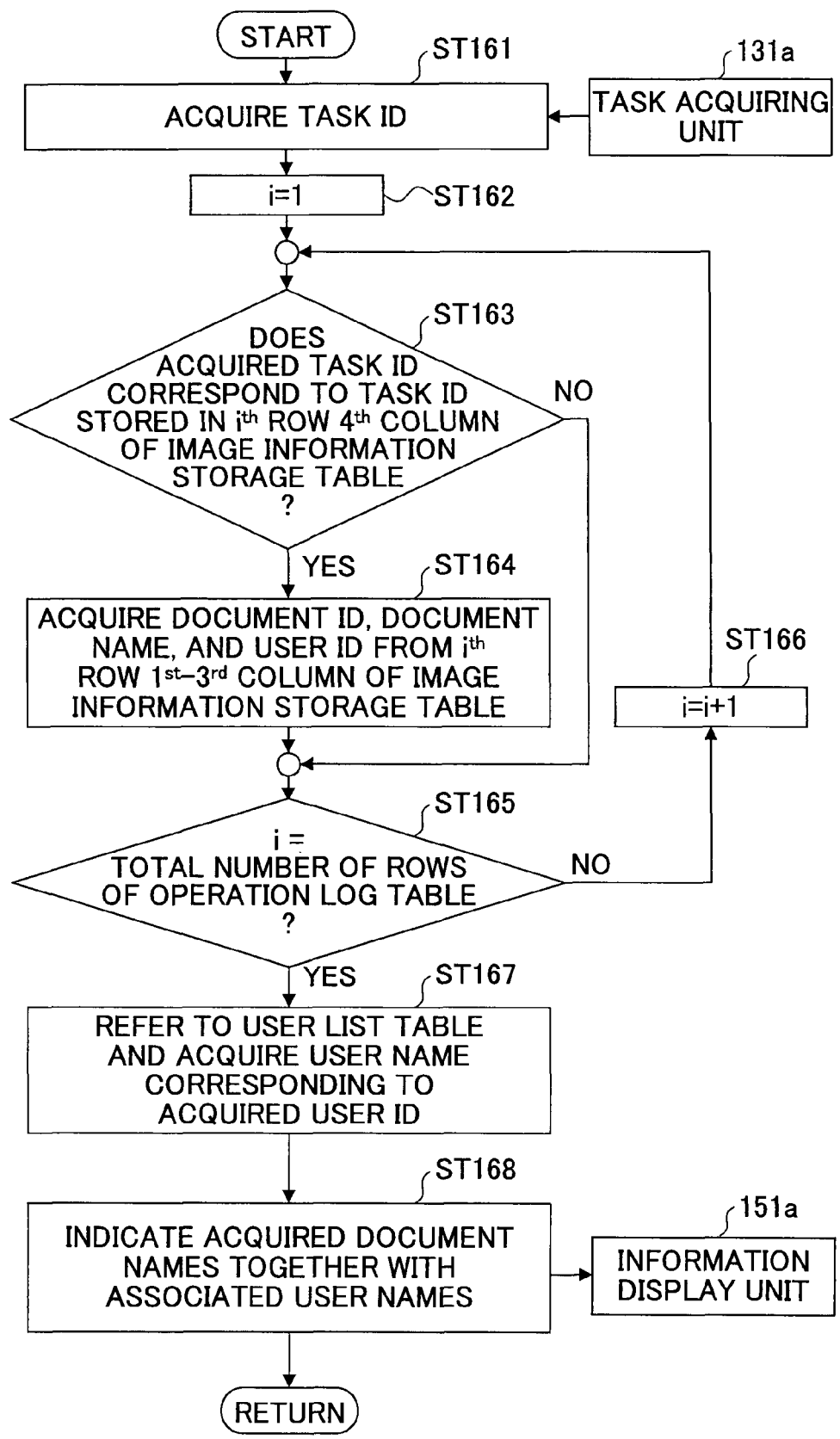
FIG. 52 is a flowchart illustrating an image indicating process executed by an image indicating unit of the image processing apparatus according to the third embodiment.

FIG. 52 is a flowchart illustrating an image indicating process performed by the image indicating unit 114a.

According to the present example, when an image indicating process is started, the task acquiring unit 113a acquires a task ID of a task designated by a user (ST161). Then, 'i' is set to an initial value i=1 (ST162), and the following operations are performed with respect to each row of the image information storage table 164a.

Specifically, a determination is made as to whether the task ID stored in the $i^{th}$ row fourth column of the image information storage table 164a corresponds to the task ID acquired in step ST161 (ST163). If the task IDs correspond, the document ID, document name, and user ID stored in the $i^{th}$ row first through third columns of the image information storage table 164a are acquired (ST164). Then a determination is made as to whether the value of 'i' corresponds to the total number of rows included in the image information storage table 164a (ST165). If the value of 'i' does not correspond to the total number of rows of the image information storage table 164a; namely, if the $i^{th}$ row is not the last row of the image information storage table 164a (ST165, No), the value of 'i' is incremented by one (i=i+1), and the process steps ST163-ST165 are repeated.

When it is determined that the value of 'i' corresponds to the total number of rows included in the image information storage table 164a; namely, when the process steps ST163-ST165 have performed with respect to each row of the image information storage table 164a (ST165, Yes), the user list table 162a is referenced to acquire corresponding user names of the user IDs acquired in step ST164 (ST167). Then, an accessing image selection screen indicating the acquired document names together with their associated user names is displayed on the information display unit 151a (ST168).

Figure 53:
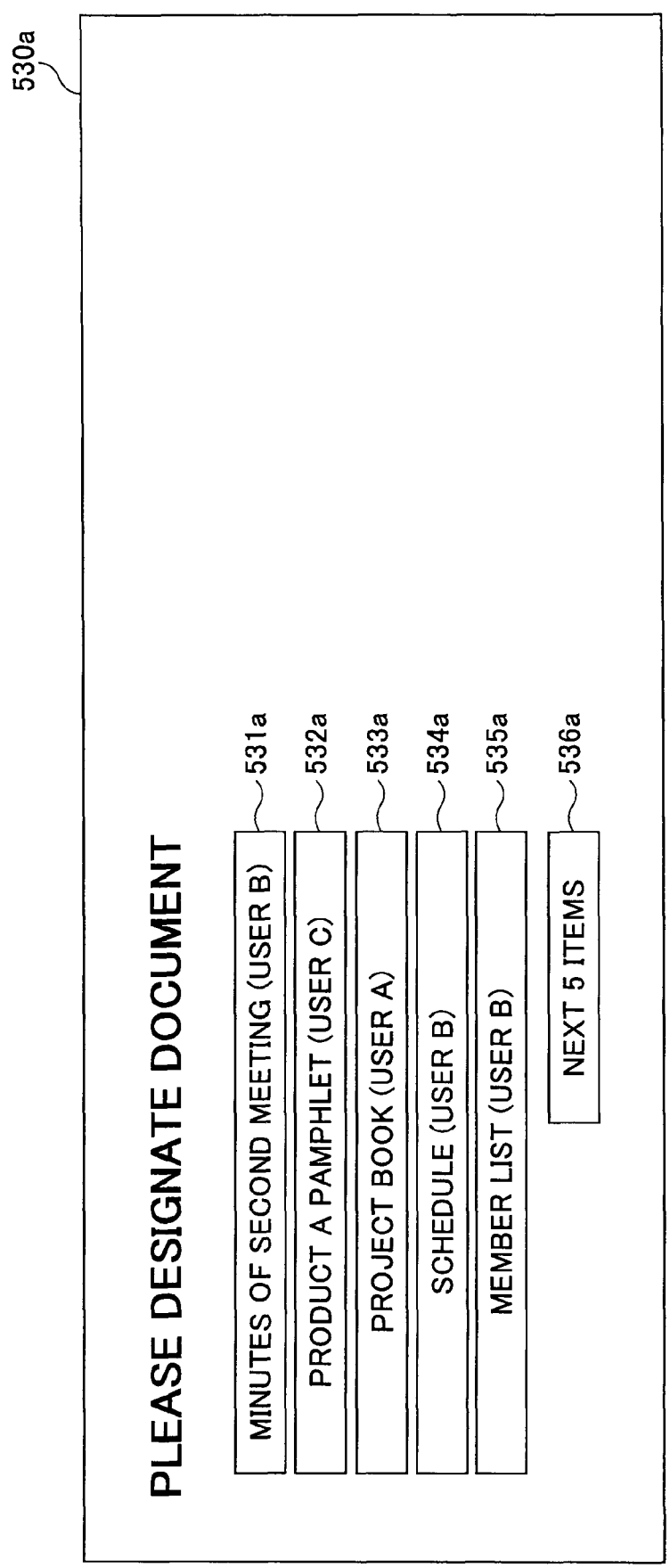
FIG. 53 is a diagram showing an accessing image selection screen displayed by the image processing apparatus according to the third embodiment.

FIG. 53 is a diagram showing an exemplary accessing image selection screen 530a. The illustrated accessing image selection screen 530a displays buttons 531a-535a indicating the document names of five different document images that may be accessed, and a button 536a for displaying the next five document images to be accessed. In this way, the user may select a desired document via the accessing image selection screen 530a.

In the following, processes performed by the log managing unit 116a are described.

The log managing unit 116a may perform two types of processes, namely, 'log addition' and 'log updating'. Specifically, the log managing unit 116a performs log updating when the operation log table 163a already includes a prescribed number of rows (log entries), and the log managing unit 116*a* performs log addition when the number of rows of the operation log table 163*a* is still less than the prescribed number.

FIG. 54 is a flowchart illustrating process steps of a log addition process performed by the log managing unit 116*a*. In performing log addition, the log managing unit 116*a* acquires the operation description of the operation that has actually been executed by the user, the time/date at which the operation has been executed, the user ID of the user, and the task ID of the task that has been designated by the user (ST171). Then, the log managing unit 116*a* stores the acquired operation description, time/date information, user ID, and task ID in the first through fourth columns, respectively, of a newly added last row of the operation log table 163*a* (ST172).

FIG. 55 is a flowchart illustrating process steps of a log updating process performed by the log managing unit 116*a*. In performing log updating, the log managing unit 116*a* acquires the operation description of the operation that has actually been executed by the user, the time/date at which the operation has been executed, the user ID of the user, and the task ID of the task that has been designated by the user (ST181). Then, the log managing unit 116*a* stores the acquired operation description, time/date information, user ID, and task ID in the first through fourth columns, respectively, of a newly added last row of the operation log table 163*a* (ST182). Then, the log managing unit 116*a* deletes the first row of the operation log table 163*a* to end the present log updating process (ST183).

As can be appreciated from the above descriptions, in the case of executing an operation on an image within the image processing apparatus system 10*a* according to the present embodiment, operations that are likely to be executed are estimated beforehand and such operations are presented to the user as candidate operations. Thus, a user may be able to execute a desired operation without having to go through complicated menu operation procedures, for example. Also, the above estimation is performed based on information pertaining to a 'task' associated with the image and the 'task' corresponds to information closely related to a business activity so that suitable operations with respect to the relevant business activity may be presented as candidate operations.

In the following, a fourth embodiment of the present invention is described with reference to FIGS. 56 and 57.

Figure 56:
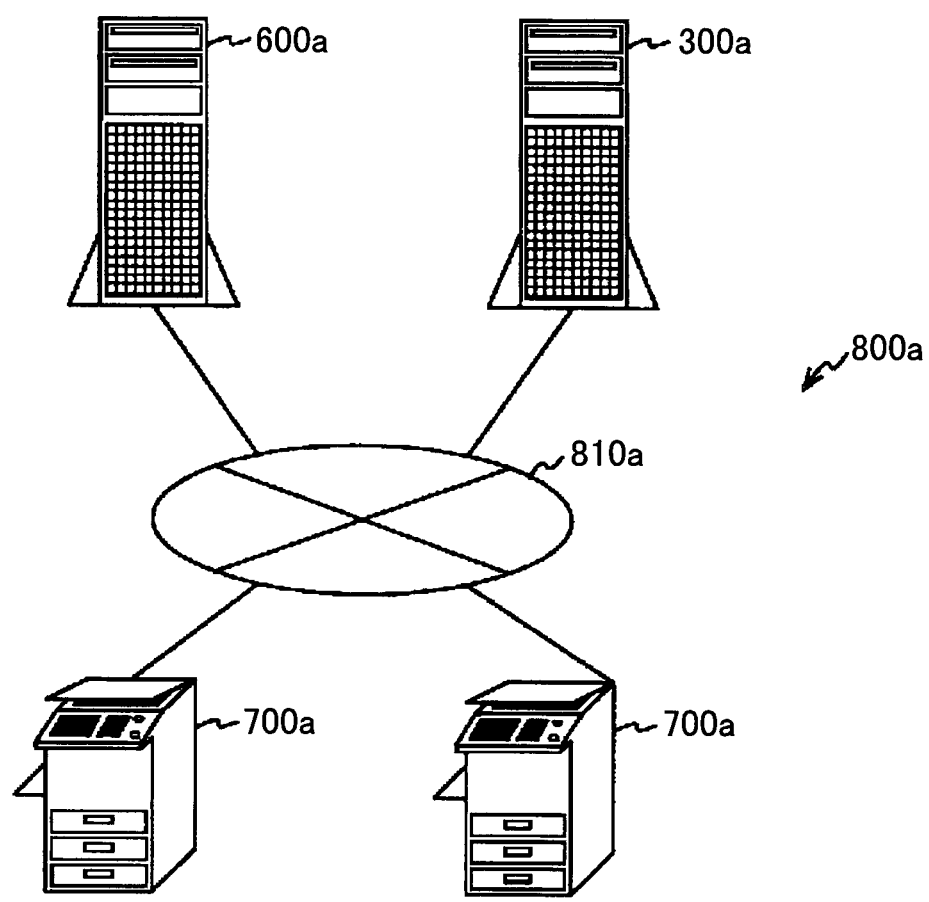
FIG. 56 is a diagram showing a configuration of an image processing apparatus system according to a fourth embodiment of the present invention.

FIG. 56 is a diagram showing a configuration of an image processing apparatus system including image processing apparatuses according to the fourth embodiment. FIG. 57 is a diagram showing detailed configurations of the image processing apparatuses and a database managing server of the image processing apparatus system shown in FIG. 56.

The illustrated image processing apparatus system 800*a* as an information processing system of the present embodiment interconnects two image processing apparatuses 700*a*, a task information managing server 300*a*, and a database managing server 600*a* via a network 810*a*. It is noted that the task information server 300*a* may be identical to that used in the above-described image processing apparatus system 10*a* according to the third embodiment of the present invention.

Figure 57:
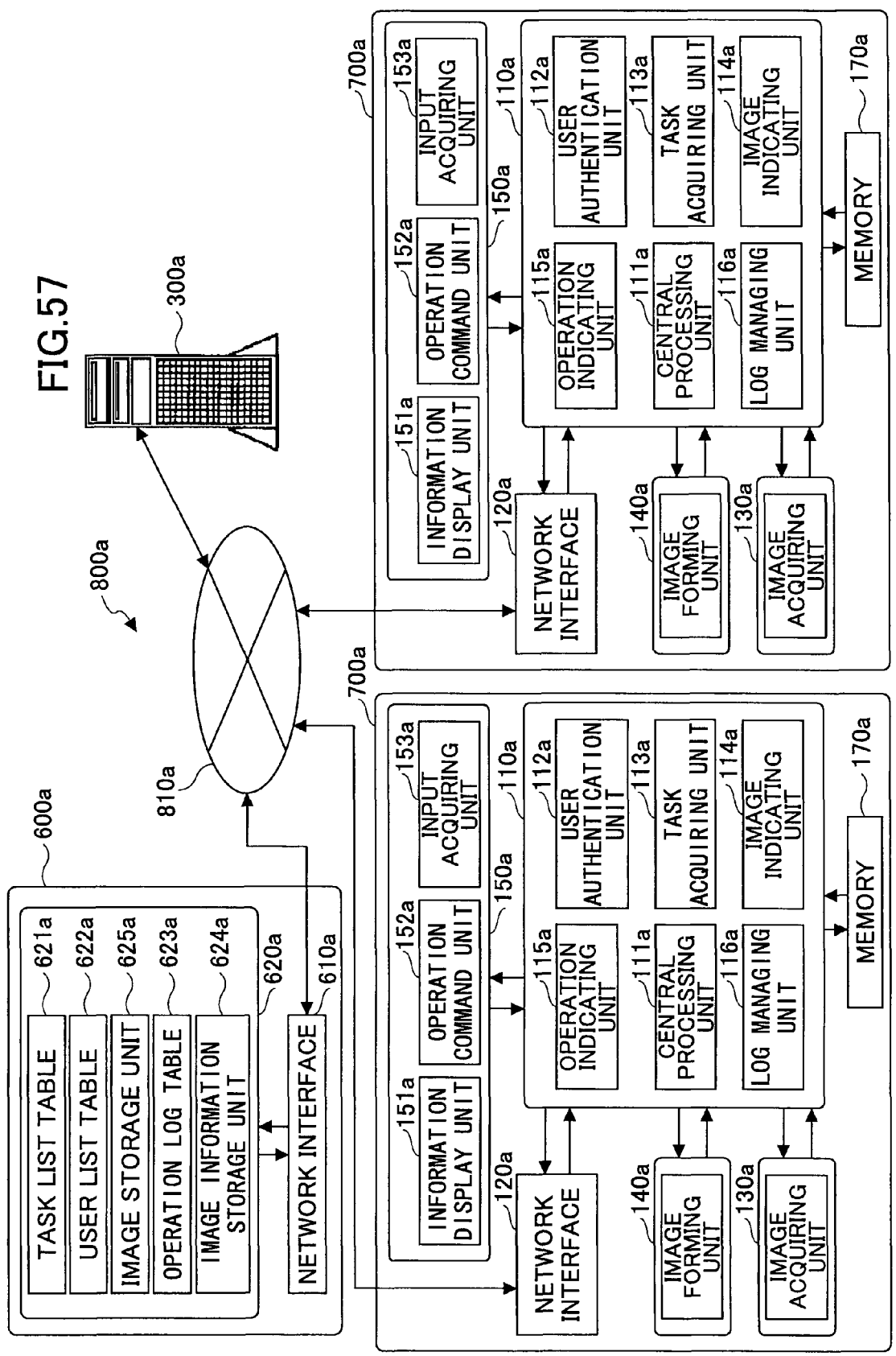
FIG. 57 is a diagram showing a detailed configuration of the image processing apparatus system shown in FIG. 56.

As is shown in FIG. 57, the image processing apparatus 700*a* as an information processing apparatus according to the present embodiment includes the units included in the image processing apparatus 100*a* shown in FIG. 31 except for the database unit 160. Specifically, according to the present embodiment, a unit having functions substantially identical to the functions of the database unit 160 of the image processing apparatus 100*a* is arranged in the database managing server 600*a* while the image processing apparatus 700*a* includes the processing unit 110*a*, the network interface 120*a*, the image acquiring unit 130*a*, the image forming unit 140*a*, the man-machine interface unit 150*a*, and the memory 170*a*. It is noted that component elements of the present image processing apparatus system that are identical to those of the image processing apparatus system 10*a* according to the third embodiment are given the same reference numerals and their descriptions are omitted.

The database managing server 600*a* includes a network interface 610*a* and a database unit 620*a*. The database unit 620*a* includes a task list table 621*a*, a user list table 622*a*, an operation log table 623*a*, an image information storage table 624*a*, and an image storage unit 625*a*. According to the present embodiment, storage units for storing document files, task information, log information on executed operations, and information on the association of individual sets of task information with relevant operations are provided at the database managing server 600*a* that is connected to the network 810*a*, and the storage units may be referenced, supplemented, or updated via the network interface 610*a*.

As with the third embodiment, in the case of executing an operation on an image within the image processing system 800*a* according to the fourth embodiment, operations that are likely to be executed are estimated beforehand and such operations are presented to the user as candidate operations. Thus, a user may be able to execute a desired operation without having to go through complicated menu operation procedures, for example. Also, the above estimation is performed based on information pertaining to a 'task' associated with the image and the 'task' corresponds to information closely related to a business activity so that suitable operations with respect to the relevant business activity may be presented as candidate operations.

Further, in the present embodiment, images, image information, task information, and operation log information are maintained at the database managing server 600*a* so that images, image information, task information, and operation log information individually stored within plural image processing apparatuses 700*a* may be shared, and the same operations may be performed using any one of the image processing apparatuses 700*a* included in the image processing apparatus system 800*a*.

It is noted that embodiments within the scope of the present invention include an information processing apparatus, and information processing method, an information processing program, and computer-readable medium containing a computer program. The information processing program may be embodied in any computer-readable medium for carrying or having computer-executable instructions or data structures stored thereon. Such a computer-readable medium can be any available medium which can be accessed by a general purpose or a special purpose computer. By way of example, and not limitation, such a computer-readable medium can comprise a physical storage medium such as a RAM, a ROM, an EEPROM, a CD-ROM, other optical disk storage devices, other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, a special purpose computer, or a processing device to perform a certain function or a group of functions.

Although the present invention has been described above with respect to certain preferred embodiments, the present invention is not limited to these specifically disclosed embodiments, and variations and modifications may be made without departing from the scope of the present invention.

The present application is based on and claims the benefit of the earlier filing date of Japanese Patent Application No. 2007-071663 filed on Mar. 19, 2007, and Japanese Patent Application No. 2007-071664 filed on Mar. 19, 2007, the entire contents of which are hereby incorporated by reference.

What is claimed is:

1. An information processing apparatus comprising:
a user authentication unit that identifies a current user;
a task acquiring unit that acquires task information of a relevant task associated with a document file to be processed by the current user;
an operation log storage unit that stores operation log information indicating executed operations and, for each specific operation of the executed operations, a particular task associated with the specific operation; and
a file information storage unit that stores file information of the document file to be processed in association with the task information of the relevant task, wherein
the task is a resource related to work or a business activity of the user and has a task ID associated with the task, and the document file has a document ID associated with the document file, and
in the stored file information of the document file, the document ID of the document file is associated with a document title of the document file, the user ID of a particular user who stored the document file, the task ID of the relevant task, and the time/date at which the document file was stored, and wherein
the information processing apparatus further comprises:
an operation command unit for designating the document file to be processed; and
a candidate operation indicating unit that determines, when the document file to be processed has been designated, one or more candidate operations, by referring to the file information stored in the file information storage unit to determine one or more task IDs associated with the document ID of the designated document file, and referring to the operation log information stored in the operation log storage unit to determine one or more logged operations associated with the one or more task IDs.

2. The information processing apparatus as claimed in claim 1, further comprising:
a user storage unit storing a list of user information that is referenced by the user authentication unit; and
a task storage unit storing a list of task information that is referenced by the task acquiring unit.

3. The information processing apparatus as claimed in claim 1, wherein
the task acquiring unit acquires task information of a plurality of tasks associated with the current user, indicates the tasks for selection, and determines a selected one of the indicated tasks as the relevant task associated with the file to be processed.

4. The information processing apparatus as claimed in claim 1, wherein
the task information includes at least one of schedule information, To Do information, project information, and user group information.

5. The information processing apparatus as claimed in claim 1, further comprising:
a candidate operation indicating unit that refers to the file information storage unit and the operation log storage unit, acquires operation information of one or more operations associated with the relevant task based on the association between the file information, the task information, and the operation log information, and indicates the one or more operations as candidate operations to be executed on the file to be processed.

6. The information processing apparatus as claimed in claim 5, wherein
the operation log storage unit stores time/date information in association with the task information; and
the operation candidate indicating unit acquires current time/date information, and indicates the candidate operations in order according to a proximity of the time/date information stored in the operation log storage unit with respect to the current time/date information.

7. The information processing apparatus as claimed in claim 5, wherein
the operation log storage unit stores user information in association with the task information; and
the operation candidate indicating unit determines whether the user information stored in the operation log storage unit corresponds to user information of the current user and indicates the candidate operations according to an outcome of the determination.

8. An information processing method of an information processing apparatus, the method comprising:
a user authenticating step of identifying a current user of the information processing apparatus;
a task information acquiring step of acquiring, by the information processing apparatus, task information of a relevant task associated with a document file to be processed by the current user;
an operation log storing step of storing operation log information indicating executed operations and, for each specific operation of the executed operations, a particular task associated with the specific operation; and
a file information storing step of storing file information of the document file to be processed, by the information processing apparatus, in association with the task information of the relevant task, wherein
the task is a resource related to work or a business activity of the user and has a task ID associated with the task, and the document file has a document ID associated with the document file, and
in the stored file information of the document file, the document ID of the document file is associated with a document title of the document file, the user ID of a particular user who stored the document file, the task ID of the relevant task, and the time/date at which the document file was stored, and wherein
the information processing method further comprises:
designating, by the information processing apparatus, the document file to be processed; and
determining, by the information processing apparatus, when the document file to be processed has been designated, one or more candidate operations, by referring to the file information stored in the file information storage unit to determine one or more task IDs associated with the document ID of the designated document file, and referring to the operation log information stored in the operation log storage unit to determine one or more logged operations associated with the one or more task IDs.

9. The information processing method as claimed in claim 8, further comprising:
a user information storing step of storing a list of user information that is referenced in the user authenticating step; and a task information storing step of storing a list of task information that is referenced in the task acquiring step.

10. The information processing method as claimed in claim 8, wherein
the task acquiring step includes acquiring task information of a plurality of tasks associated with the current user, indicating the tasks for selection, and determining a selected one of the indicated tasks as the relevant task associated with the file to be processed.

11. The information processing method as claimed in claim 8, wherein
the task information includes at least one of schedule information, To Do information, project information, and user group information.

12. The information processing method as claimed in claim 8, further comprising:
a candidate operation indicating step of acquiring operation information of one or more operations associated with the relevant task based on the association between the file information, the task information, and the operation log information, and indicating the one or more operations as candidate operations to be executed on the file to be processed.

13. The information processing method as claimed in claim 12, wherein
the operation log storing step includes storing time/date information in association with the task information; and
the operation candidate indicating step includes acquiring current time/date information, and indicating the candidate operations in order according to a proximity of the time/date information stored in the operation log storage unit with respect to the current time/date information.

14. The information processing method as claimed in claim 12, wherein
the operation log storing step includes storing user information in association with the task information; and
the operation candidate indicating step includes determining whether the user information stored in the operation log storing step corresponds to user information of the current user and indicates the candidate operations according to an outcome of the determination.

15. The information processing apparatus as claimed in claim 1,
wherein the candidate operation indicating unit indicates the candidate operations on a display unit.

16. The information processing apparatus as claimed in claim 15, further comprising:
a document file processing unit that performs a selected document file processing operation selected from the candidate operations displayed on the display unit.

* * * * *